United States Patent
Tokiwa et al.

(10) Patent No.: US 10,986,277 B2
(45) Date of Patent: *Apr. 20, 2021

(54) CAMERA, SETTING DISPLAY METHOD FOR CAMERA, AND SETTING DISPLAY PROGRAM FOR CAMERA

(71) Applicant: FUJIFILM Corporation, Tokyo (JP)

(72) Inventors: Kentaro Tokiwa, Saitama (JP); Hirofumi Horii, Saitama (JP); Yuichi Fujimura, Saitama (JP); Takeshi Misawa, Saitama (JP); Atsushi Misawa, Saitama (JP)

(73) Assignee: FULIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,830

(22) Filed: Jun. 17, 2020

(65) Prior Publication Data

US 2020/0314350 A1    Oct. 1, 2020

Related U.S. Application Data

(63) Continuation of application No. 16/217,772, filed on Dec. 12, 2018, now Pat. No. 10,728,458, which is a
(Continued)

(30) Foreign Application Priority Data

Jun. 28, 2016   (JP) .............................. JP2016-127359

(51) Int. Cl.
*H04N 5/222* (2006.01)
*H04N 5/232* (2006.01)
(Continued)

(52) U.S. Cl.
CPC ......... *H04N 5/232939* (2018.08); *G03B 7/00* (2013.01); *G03B 17/02* (2013.01);
(Continued)

(58) Field of Classification Search
CPC ......... H04N 5/23293; H04N 5/232933; H04N 5/232935; H04N 5/232939;
(Continued)

(56) References Cited

U.S. PATENT DOCUMENTS 5,745,809 A     4/1998  Kawahata
10,728,458 B2 *  7/2020  Tokiwa .................... G03B 7/00
(Continued)

FOREIGN PATENT DOCUMENTS

CN    201184953 Y    1/2009
JP    7-191397 A    7/1995
(Continued)

OTHER PUBLICATIONS

Chinese Office Action and Search Report for corresponding Chinese Application No. 201780040144.1, dated Jun. 16, 2020, with an English translation.
(Continued)

*Primary Examiner* — Kelly L Jerabek
(74) *Attorney, Agent, or Firm* — Birch, Stewart, Kolasch & Birch, LLP

(57) ABSTRACT

A first operation dial and a second operation dial are provided around a sub-display. Set contents of a camera, an image picture of the first operation dial, and an image picture of the second operation dial are displayed on the sub-display. In a state in which the first operation dial and the second operation dial are not operated, the set contents of the camera are displayed to be large on the sub-display, and only parts of the image picture of the first operation dial and the image picture of the second operation dial are displayed at an edge. In a case where the first operation dial or the second operation dial are operated, an image picture of the operated operation dial appears from the edge and is displayed such that a dial plate portion can be visually recognized.

20 Claims, 53 Drawing Sheets

Related U.S. Application Data continuation of application No. PCT/JP2017/020189, filed on May 31, 2017.

(51) Int. Cl.
| | | |
|---|---|---|
| *G03B 7/00* | (2021.01) | |
| *G03B 17/02* | (2021.01) | |
| *H04N 5/225* | (2006.01) | |
| *G03B 17/18* | (2021.01) | |
| *G06F 3/0362* | (2013.01) | |

(52) U.S. Cl.
CPC ........... *G03B 17/18* (2013.01); *G06F 3/0362* (2013.01); *H04N 5/225* (2013.01); *H04N 5/2251* (2013.01); *H04N 5/232* (2013.01); *H04N 5/23216* (2013.01); *H04N 5/23293* (2013.01); *H04N 5/232933* (2018.08); *H04N 5/23212* (2013.01)

(58) Field of Classification Search
CPC ............. H04N 5/23216; H04N 5/2251; H04N 5/2252; G06F 3/0362
See application file for complete search history.

(56) References Cited

U.S. PATENT DOCUMENTS

| | | |
|---|---|---|
| 2007/0003269 A1 | 1/2007 | Ueda et al. |
| 2010/0149401 A1 | 6/2010 | Misawa |
| 2015/0109510 A1 | 4/2015 | Fujita et al. |
| 2016/0127638 A1 | 5/2016 | Guo et al. |
| 2017/0257559 A1* | 9/2017 | Stricker .............. G06F 3/04883 |
| 2019/0014248 A1 | 1/2019 | Takao et al. |
| 2019/0079372 A1 | 3/2019 | Misawa et al. |
| 2019/0094659 A1 | 3/2019 | Misawa et al. |
| 2019/0149723 A1 | 5/2019 | Misawa et al. |

FOREIGN PATENT DOCUMENTS

| | | |
|---|---|---|
| JP | 7-306435 A | 11/1995 |
| JP | 8-76225 A | 3/1996 |
| JP | 2007-41540 A | 2/2007 |
| WO | WO 2014/002659 A1 | 1/2014 |

OTHER PUBLICATIONS

German Office Action for corresponding German Application No. 112017003231.8, dated Oct. 7, 2019, with English translation.

International Preliminary Report on Patentability (Form PCT/IPEA/409) for International Application No. PCT/JP2017/020189, dated Feb. 1, 2018, with English translation.

International Search Report and Written Opinion of the International Searching Authority (forms PCT/ISA/210 and PCT/ISA/237) for International Application No. PCT/JP2017/020189 dated Aug. 29, 2017, with English Translation of the Search Report.

Notice of Allowance dated Apr. 17, 2020 in copending U.S. Appl. No. 16/217,772.

Office Action dated Feb. 3, 2020 in copending U.S. Appl. No. 16/217,772.

* cited by examiner

CAMERA, SETTING DISPLAY METHOD FOR CAMERA, AND SETTING DISPLAY PROGRAM FOR CAMERA

CROSS-REFERENCE TO RELATED APPLICATIONS

This application is a Continuation of U.S. patent application Ser. No. 16/217,772, filed Dec. 12, 2018, which is a Continuation of PCT International Application No. PCT/JP2017/020189 filed on May 31, 2017, which claims priority under 35 U.S.C § 119(a) to Japanese Patent Application No. 2016-127359 filed on Jun. 28, 2016. Each of the above application(s) is hereby expressly incorporated by reference, in its entirety, into the present application.

BACKGROUND OF THE INVENTION

1. Field of the Invention

The present invention relates to a camera comprising a plurality of operation dials, a setting display method for the camera, and a setting display program for the camera.

2. Description of the Related Art

There is a camera in which various settings are performed by combining a rotary operation dial and a display device with each other.

For example, JP1996-076225A (JP-H08-076225A) has proposed a camera in which an operation dial is disposed on a lower part of a display device, and display contents on the display device are switched to each other in response to a rotational operation on the operation dial such that various settings are performed.

SUMMARY OF THE INVENTION

However, in the technique disclosed in JP1996-076225A (JP-H08-076225A), since the operation dial and the display device are combined with each other on a one-to-one basis so as to be used, in a camera comprising a plurality of operation dials, a display device is required to be provided for each operation dial, and thus there is a problem in that the camera becomes large-sized.

A single display device may be used in common to a plurality of operation dials, but, in this case, a relationship between information displayed on the display device and an operation dial is unclear, and thus there is a problem in that an operability is reduced.

The present invention has been made in consideration of the circumstances, and an object thereof is to provide a camera with a favorable operability, a setting display method for the camera, and a setting display program for the camera.

Means for solving the problems are as follows.

(1) A camera comprising:
a display unit;
an operation dial that are disposed around the display unit;
another operation dial; and
a system controller that controls display on the display unit,
wherein the system controller displays image pictures of the operation dials to overlap each other on the display, and displays preferentially an image picture of an operation dial operated last in the operation dials.

According to this aspect, the image pictures of the operation dials are displayed to overlap each other in an operation order. In this case, an operation dial operated last is displayed at the uppermost position.

Consequently, it is possible to realize more operable display. In other words, information which is supposed to be most necessary can be preferentially displayed, and thus it is possible to provide a camera with a more favorable operability.

DESCRIPTION OF THE PREFERRED EMBODIMENTS

Hereinafter, preferred embodiments of the present invention will be described in detail with reference to the accompanying drawings.

First Embodiment

[Exterior Configuration]

Figure 1:
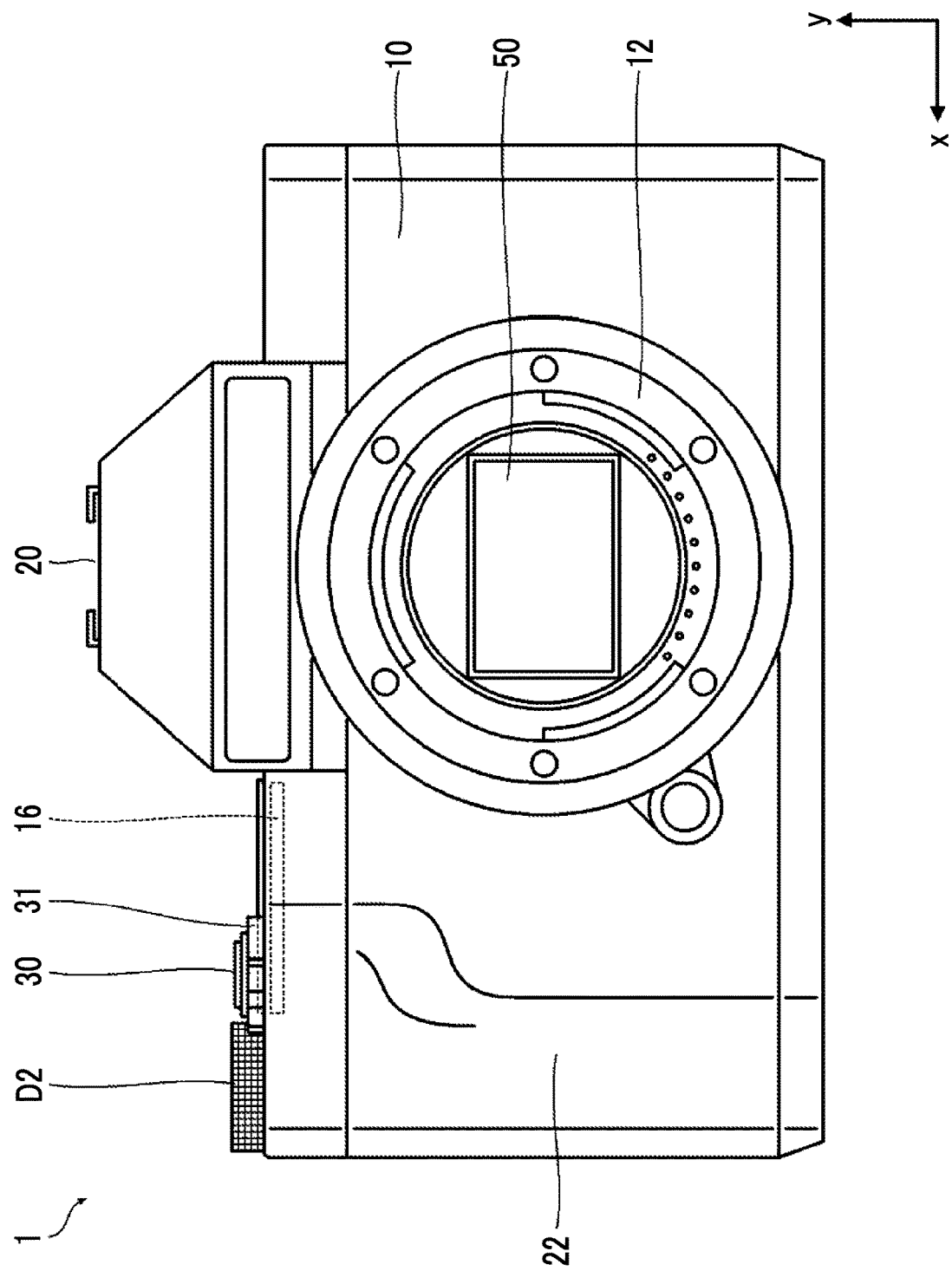
FIG. 1 is a front view illustrating an example of a digital camera to which the present invention is applied.
Figure 2:
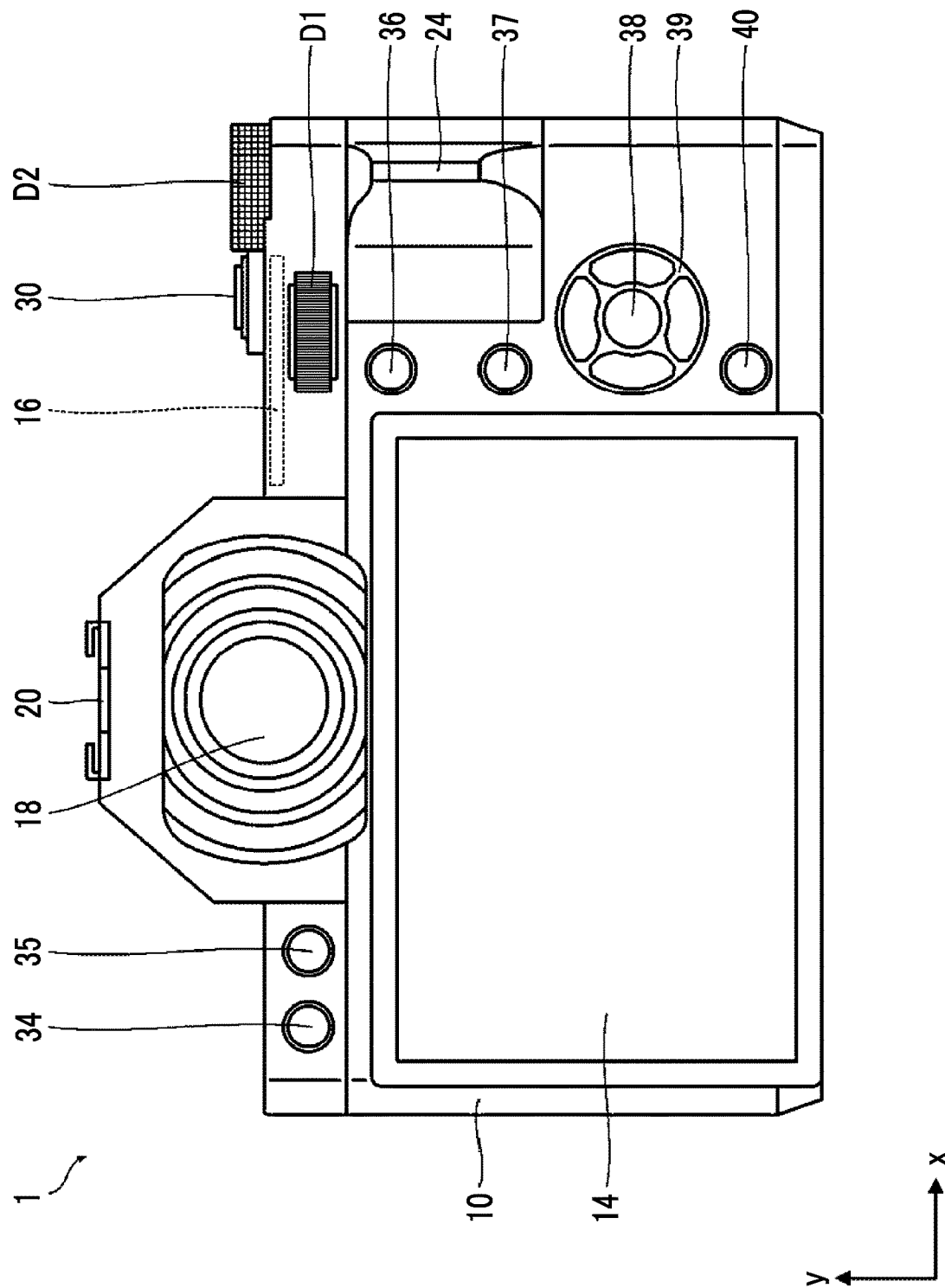
FIG. 2 is a rear view illustrating an example of the digital camera to which the present invention is applied.
Figure 3:
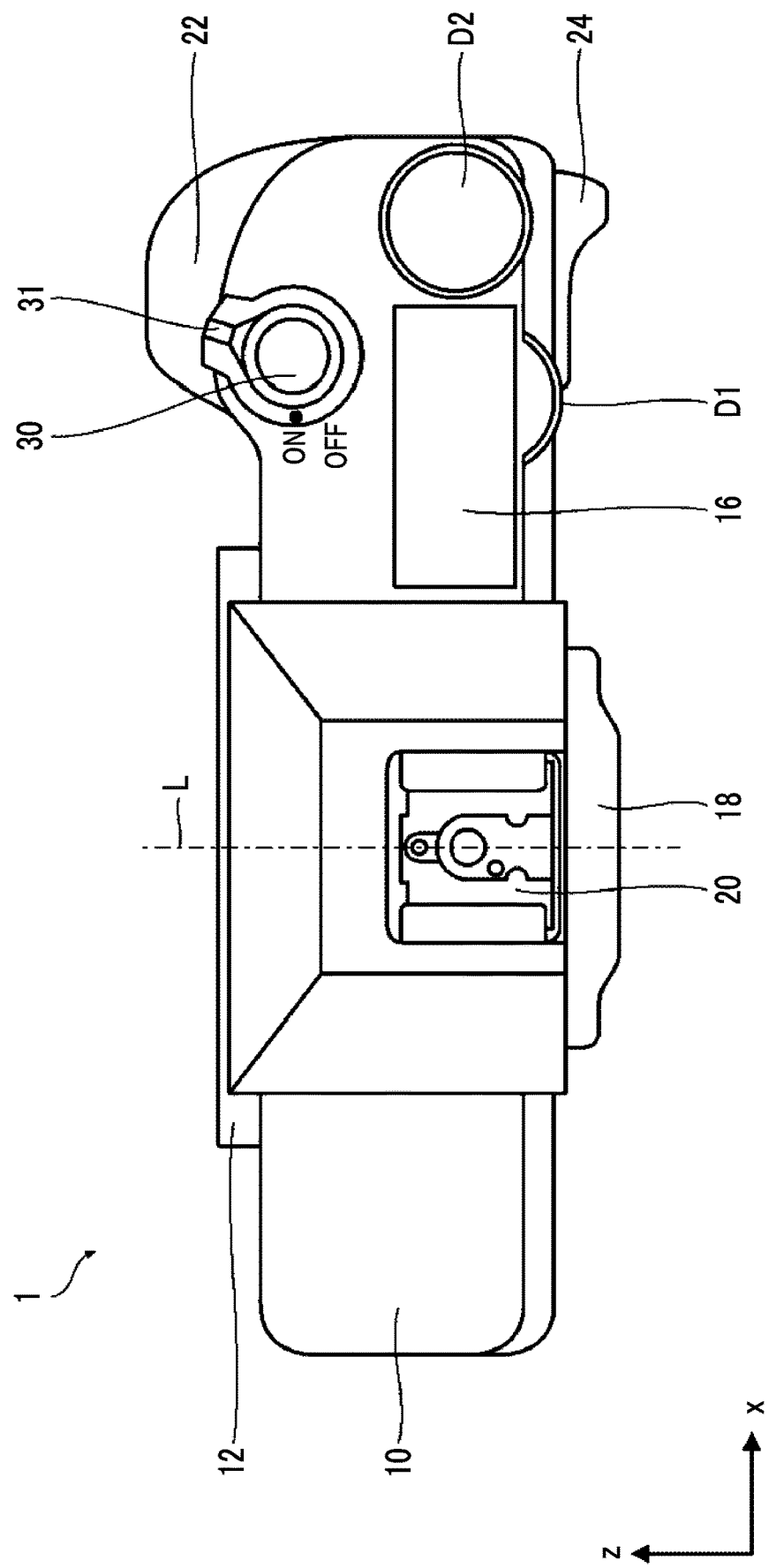
FIG. 3 is a plan view illustrating an example of the digital camera to which the present invention is applied.

FIGS. 1, 2, and 3 are respectively a front view, a rear view, and a plan view illustrating an example of a digital camera to which the present invention is applied.

In the present specification, a direction (a z direction in FIG. 3) parallel to an optical axis L is referred to as a front-and-rear direction, and a subject side is referred to as a front side. On a plane orthogonal to the optical axis L, a direction parallel to a long side of an image sensor 50 (an x direction in FIG. 1) is referred to as a horizontal direction or a leftward-and-rightward direction, and a direction parallel to a short side of the image sensor 50 (a y direction in FIG. 1) is referred to as a vertical direction or an upward-and-downward direction.

A digital camera 1 of the present embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding light, which is incident from a lens, to an optical finder, and is also referred to as a mirrorless digital camera.

Figure 4:
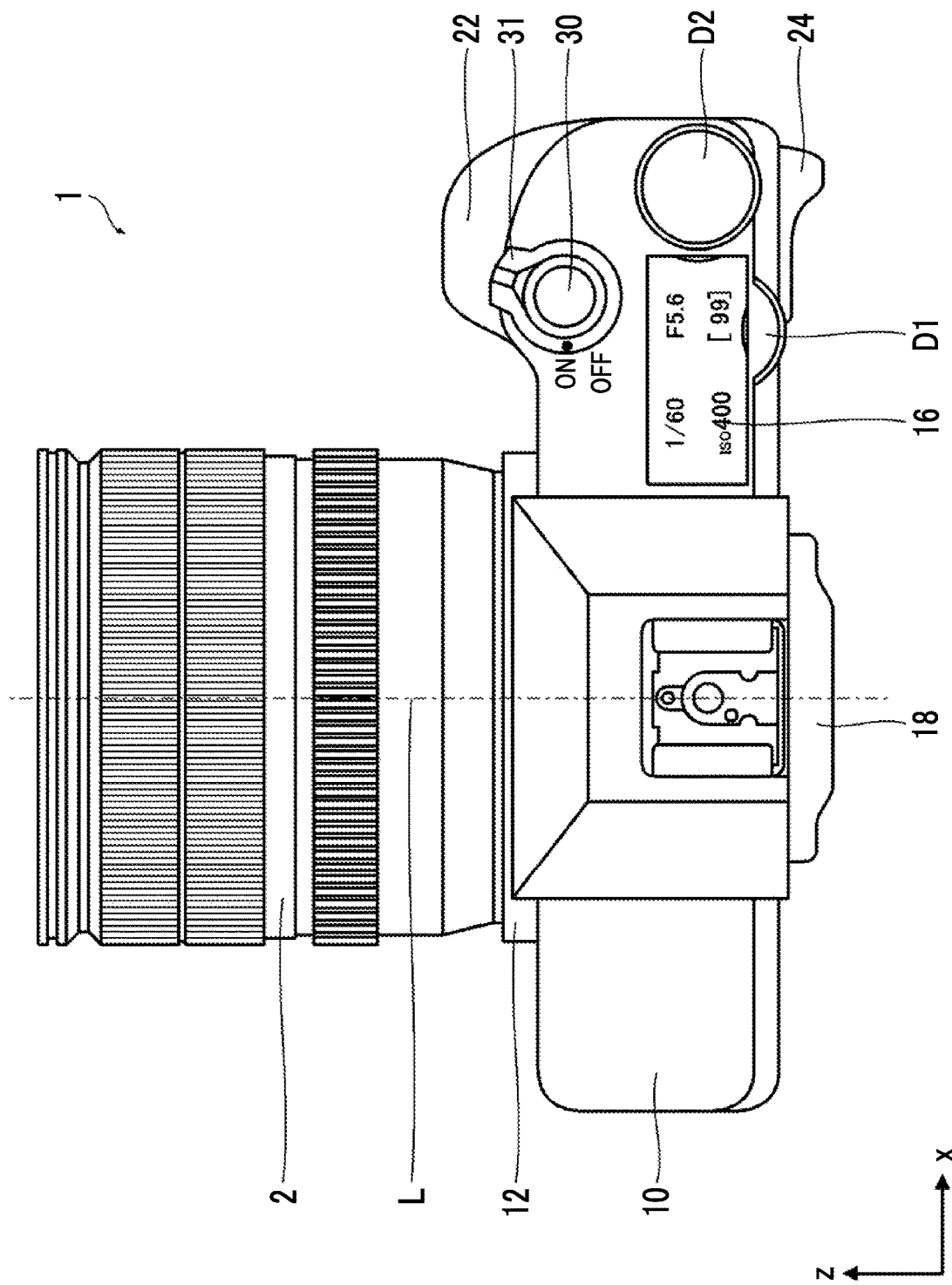
FIG. 4 is a plan view of the digital camera on which a lens is mounted.

FIG. 4 is a plan view of the digital camera on which a lens is mounted. As illustrated in FIG. 4, the digital camera 1 of the present embodiment is used in a state in which a lens 2 is mounted on a camera body 10.

As illustrated in FIGS. 1 to 4, the camera body 10 comprises a lens mount 12, a main display 14, a sub-display 16, an electronic view finder 18, a hot shoe 20, and the like. As operation members, a shutter button 30, a power supply lever 31, a reproduction button 34, an erase button 35, an AF lock button 36, an AE lock button 37, a menu/OK button 38, a selector button 39, a display/back button 40, a first operation dial D1, a second operation dial D2, and the like may be provided.

<<Camera Body>>

The camera body 10 has the shape of a rectangular box that is thin in the front-and-rear direction. One (left in FIG. 1) end portion of the camera body 10 is configured as a grip portion. A user performs a release operation in a state of holding the grip portion. The grip portion comprises a grip 22 on the front surface side, and a thumb rest 24 on the rear surface side.

<<Lens Mount>>

The lens mount 12 is a mounting portion for the lens 2. As illustrated in FIG. 1, the lens mount 12 is provided on the front surface of the camera body 10. The lens 2 is attachably and detachably mounted on the lens mount 12. The lens mount 12 is configured in a bayonet type.

<<Main Display>>

The main display 14 is generally a display used to display an image. As illustrated in FIG. 2, the main display 14 is provided on the rear surface of the camera body 10. The main display 14 is configured with, for example, a color liquid crystal display (LCD).

As described above, the main display 14 is generally used to display an image. A displayed image includes not only a captured image but also a live view image. A live view is a function of displaying an image recognized by the image sensor in a real time. An angle of view, a focus state, or the like can be checked on the main display by performing the live view.

The main display 14 is also used as a graphical user interface (GUI). In other words, in a case where various settings are performed, a setting screen is displayed on the main display 14, and the various settings are performed on the setting screen.

<<Sub-Display>>

The sub-display 16 is an example of a display unit. The sub-display 16 is configured with a small-screen display device compared with the main display 14. As illustrated in FIG. 3, the sub-display 16 is provided on a top surface of the camera body 10. Particularly, in the digital camera 1 of the present embodiment, the sub-display 16 is provided on the top surface of the camera body 10 on the grip portion side. The sub-display 16 is configured with, for example, a reflective LCD comprising an illumination lamp. The sub-display 16 has a rectangular display surface, and a short side thereof is disposed in parallel to the optical axis L. More specifically, the short side thereof is disposed along the front-and-rear direction (z direction), and a long side thereof is disposed along the horizontal direction (x direction).

Set contents of the digital camera 1, and the like are displayed on the sub-display 16. Image pictures of the first operation dial D1 and the second operation dial D2 are displayed on the sub-display 16 in conjunction with operations on the first operation dial D1 and the second operation dial D2. This will be described later.

<<Electronic View Finder>>

The electronic view finder (EVF) 18 is an electronic finder having an LCD built thereinto. As illustrated in FIG. 2, the electronic view finder 18 is provided on the upper part (so-called warship portion) of the camera body 10, and includes an eyepiece portion on the rear surface thereof.

<<Hot Shoe>>

The hot shoe 20 is an attachment portion of an external flash. As illustrated in FIG. 3, the hot shoe 20 is provided on the top surface of the camera body 10.

<<Operation Members>>

The camera body 10 comprises the shutter button 30, the power supply lever 31, the reproduction button 34, the erase button 35, the AF lock button 36, the AE lock button 37, the menu/OK button 38, the selector button 39, the display/back button 40, the first operation dial D1, and the second operation dial D2 as operation members.

<Shutter Button>

The shutter button 30 is provided on the top surface (upper surface) of the camera body 10, and is disposed on the grip portion side. The shutter button 30 is configured with a so-called two-stage switch that has a half-pressed stage and a fully-pressed stage. In a case in which the shutter button 30 is half pressed, imaging preparation, that is, AE and AF are performed, and, in a case where the shutter button 30 is fully pressed, main imaging, that is, imaging for recording is performed. The AE stands for automatic exposure, and is a function in which the camera automatically measures the brightness of a subject, and determines appropriate exposure. The AF stands for automatic focus, and is a function in which the camera automatically measures a distance from a subject, and performs focusing.

<Power Supply Lever>

The power supply lever 31 is disposed coaxially with the shutter button 30. The power supply lever 31 is configured with a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

<Reproduction Button>

The reproduction button 34 is a button which is used to switch a mode of the digital camera 1 to a reproduction mode. The reproduction button 34 is provided on the rear surface of the camera body 10, and is disposed over the main display 14. In a case where the reproduction button 34 is pressed in a state in which a mode of the digital camera 1 is set to an imaging mode, the mode of the digital camera 1 is switched to the reproduction mode. In a case where the reproduction mode is set, an image captured last is displayed on the main display 14.

A function of switching the reproduction mode to the imaging mode is allocated to the shutter button 30. In a case where the shutter button 30 is pressed in a state in which the reproduction mode is set, the mode of the digital camera 1 is switched to the imaging mode.

<Erase Button>

The erase button 35 is a button used to instruct a captured image picture displayed on the main display 14 to be erased. The erase button 35 is provided on the rear surface of the camera body 10, and is disposed over the main display 14. In a case where the erase button 35 is pressed in a state in which a captured image picture is displayed on the main display 14, a screen for checking erasure is displayed on the main display 14. In a case where erasure is instructed to be performed according to display on the main display 14, a captured image picture which is being reproduced is erased from a memory card.

<AF Lock Button>

The AF lock button 36 is a button used to instruct a focus to be locked. As illustrated in FIG. 2, the AF lock button 36 is provided on the rear surface of the camera body 10, and is disposed near the thumb rest 24. In a case where the AF lock button 36 is pressed, a focus is locked.

<AE Lock Button>

The AE lock button 37 is a button used to instruct exposure to be locked. As illustrated in FIG. 2, the AE lock button 37 is provided on the rear surface of the camera body 10, and is disposed near the thumb rest 24. In a case where the AE lock button 37 is pressed, exposure is locked.

<Menu/OK Button>

The menu/OK button 38 is a button used to call a menu screen on the main display 14. The menu/OK button 38 is a button used to determine a selection item, a check item, or the like displayed on the main display 14. The menu/OK button 38 is provided on the rear surface of the camera body 10. In a case where the menu/OK button 38 is pressed in a state in which the imaging mode or the reproduction mode is set, a menu screen is displayed on the main display 14.

<Selector Button>

The selector buttons 39 are configured with four buttons which are arranged on an identical circle with respect to the menu/OK button 38. A function according to a set situation of the digital camera 1 is allocated to each button. For example, in a case where the digital camera 1 is set to the reproduction mode, in FIG. 2, a one-frame feed function is allocated to a rightward button, and a one-frame return function is allocated to a leftward button. A zoom-in function is allocated to an upward button, and a zoom-out function is allocated to a downward button. In a case where the digital camera 1 is set to the imaging mode, in FIG. 2, a function of calling a white balance setting screen is allocated to the rightward button, and a function of calling a self timer setting screen is allocated to the leftward button. A function of calling an AF mode setting screen is allocated to the upward button, and a function of calling a consecutive shot mode setting screen is allocated to the downward button. In a case where various setting screens are called on the main display 14, the selector button 39 functions as a button for moving a cursor in each direction on the screen.

<Display/Back Button>

The display/back button 40 is a button used to give an instruction for switching a display form of the main display 14. The display/back button 40 is a button used to instruct display on the main display 14 to be returned to a previous state. The display/back button 40 is provided on the rear surface of the camera body 10. In a case where the display/back button 40 is pressed in a state in which the reproduction mode or the imaging mode is set, a display form of the main display 14 is switched. For example, in a case where the display/back button 40 is pressed in a state in which the reproduction mode is set, an imaging condition or a histogram for an image picture displayed on the main display 14 is displayed to overlap the image picture. For example, in a case where the display/back button 40 is pressed in a state in which the imaging mode is set, various pieces of information such as an imaging condition or a histogram are displayed to overlap a live view image picture. In a case where the display/back button 40 is pressed in a state in which various setting screens are displayed on the main display 14, display on the main display 14 is returned to a previous state. Consequently, a selection item or a check item may be canceled.

<First Operation Dial and Second Operation Dial>

The first operation dial D1 and the second operation dial D2 are examples of a plurality of operation dials. Various functions are allocated to the first operation dial D1 and the second operation dial D2 according to setting states of the digital camera 1. This will be described later.

The first operation dial D1 and the second operation dial D2 are disposed around the sub-display 16 which is a display unit. Specifically, as illustrated in FIG. 3, in a plan view, the first operation dial D1 is disposed on the rear side of the sub-display 16, and the second operation dial D2 is disposed on the right side thereof. Both of the buttons are disposed at positions where the buttons can be operated with the thumb of the hand holding the grip portion.

(1) First Operation Dial

Figure 5:
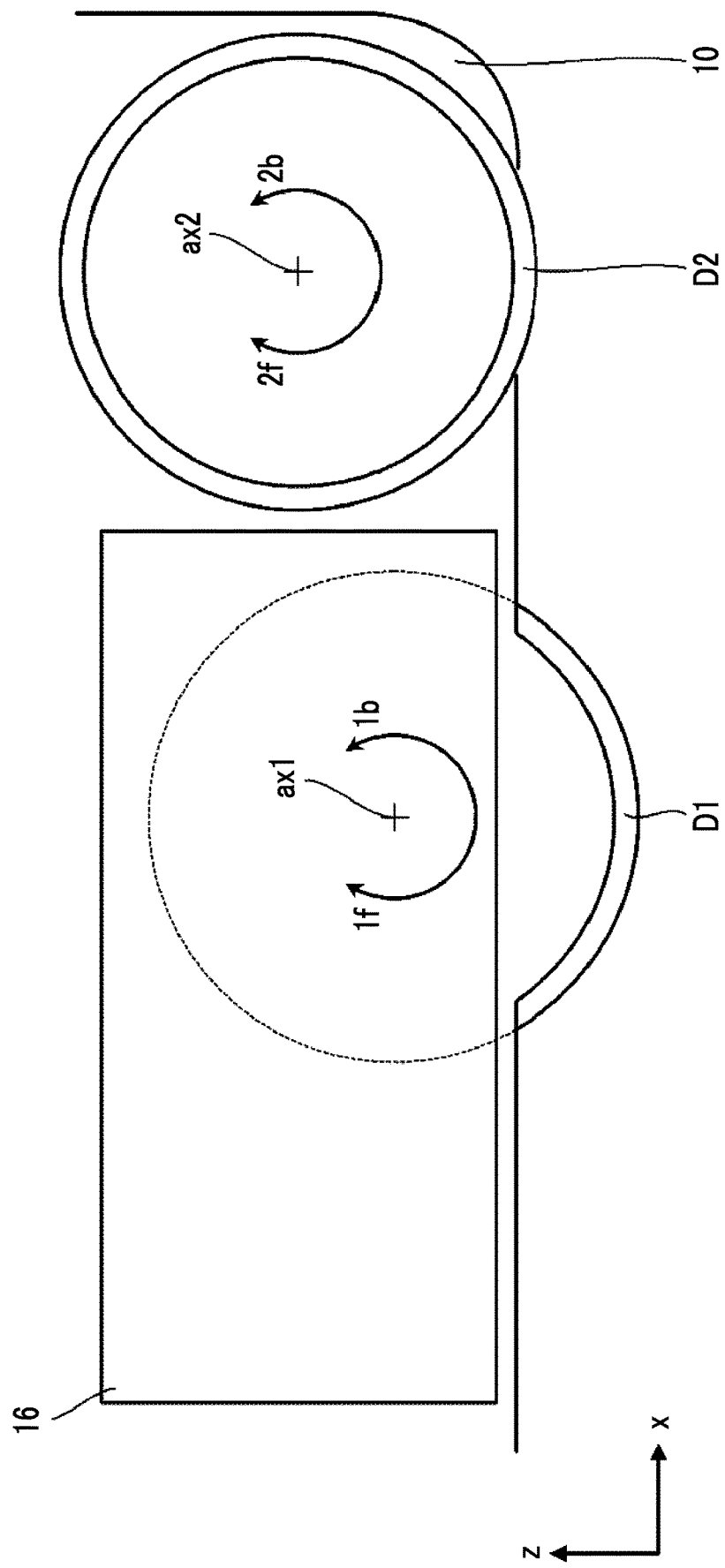
FIG. 5 is an enlarged plan view of a portion in which a first operation dial and a second operation dial are disposed.

FIG. 5 is an enlarged plan view of the portion where the first operation dial and the second operation dial are disposed.

The first operation dial D1 is an example of a first operation dial. The first operation dial D1 is provided to be buried in the camera body 10, and a part of an outer circumference thereof is disposed to be exposed from the rear surface (outer surface) of the camera body 10. A position where a part of the first operation dial D1 is exposed is the rear side of the sub-display 16 in a plan view as illustrated in FIG. 5.

The first operation dial D1 has a rotation axis ax1 orthogonal to the display surface of the sub-display 16. The first operation dial D1 is provided to be operable in a normal rotation direction and a reverse rotation direction centering on the rotation axis ax1. In other words, as illustrated in FIG. 5, the first operation dial D1 is provided to be rotatably operable in both of a clockwise rotation direction 1f and a counterclockwise rotation direction 1b centering on the rotation axis ax1.

The first operation dial D1 has a click mechanism, and is configured to undergo click stop at a predetermined angle interval. The click stop is a function of stopping rotation according to a click feeling. Such a type of click mechanism is a well-known technique, and a description of a detailed configuration thereof will be omitted.

(2) Second Operation Dial

As illustrated in FIG. 5, the second operation dial D2 is disposed on the top surface (upper surface) of the camera body 10. In a plan view, the second operation dial D2 is disposed on the right side of the sub-display 16.

The second operation dial D2 has a rotation axis ax2 orthogonal to the display surface of the sub-display 16. The second operation dial D2 is provided to be operable in a normal rotation direction and a reverse rotation direction centering on the rotation axis ax2. In other words, as illustrated in FIG. 5, the second operation dial D2 is provided to be rotatably operable in both of a clockwise rotation direction 2f and a counterclockwise rotation direction 2b centering on the rotation axis ax2.

The second operation dial D2 also has a click mechanism, and is configured to undergo click stop at a predetermined angle interval.

[Control System]

Figure 6:
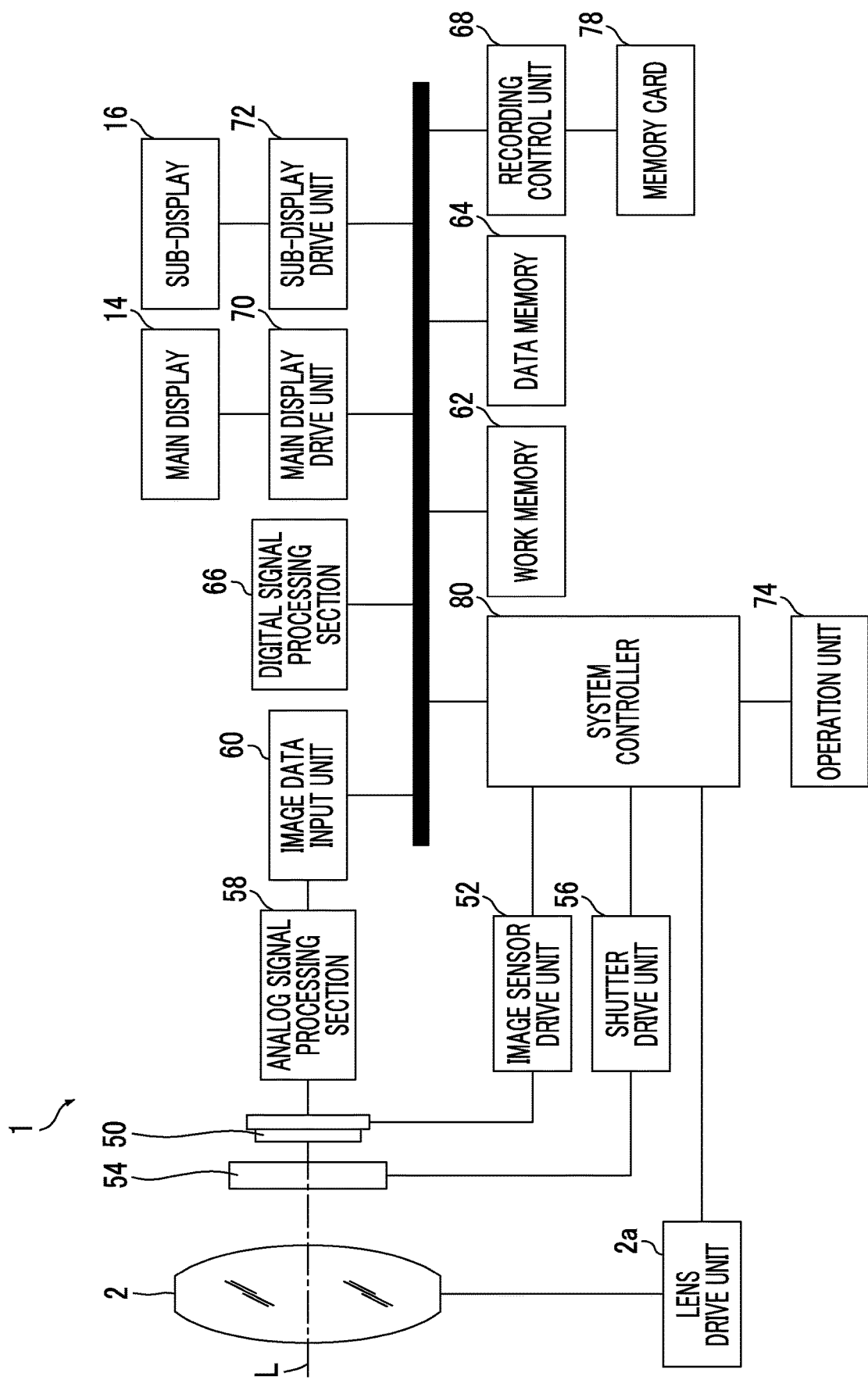
FIG. 6 is a block diagram illustrating the schematic configuration of a control system of the digital camera.

FIG. 6 is a block diagram illustrating the schematic configuration of a control system of the digital camera.

The digital camera 1 includes the image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main display drive unit 70, a sub-display drive unit 72, an operation unit 74, a system controller 80, and the like.

The image sensor 50 converts an optical image of a subject, which is formed through the lens 2, into electrical signals and outputs the electrical signals. A well-known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is configured with a square type focal-plane shutter, and is disposed directly in front of the image sensor 50. FIG. 1 illustrates a state in which the shutter is fully opened.

The shutter drive unit 56 drives the shutter 54 according to a command output from the system controller 80.

The analog signal processing section 58 receives the signals output from the image sensor 50, and performs required signal processes, such as a correlated double sampling process and an amplification process. The analog signal processing section 58 converts analog image signals, which have been subjected to required signal processes, into digital image signals and outputs the digital image signals.

The image data input unit 60 receives the digital image signals, which are output from the analog signal processing section 58, according to a command output from the system controller 80. Received data regarding one image is stored in the work memory 62.

The work memory 62 is used as a memory for work. The data memory 64 is configured with a non-volatile memory such as an electrically erasable programmable read only memory (EEPROM), and data required for control and the like are stored in the data memory 64.

The digital signal processing section 66 performs required signal processes such as a demosaicing process, white balance correction, gamma correction, and outline correction, on the image data received in the work memory 62, and generates predetermined image data configured with luminance data (Y data) and color difference data (Cr and Cb data).

The recording control unit 68 has access to the memory card 78 and reads and writes data according to a command output from the system controller 80. Image data which is obtained through imaging is recorded in the memory card 78.

The main display drive unit 70 drives the main display 14 according to a command output from the system controller 80.

The sub-display drive unit 72 drives the sub-display 16 according to a command output from the system controller 80.

The operation unit 74 includes the shutter button 30, the power supply lever 31, the mode dial 32, the reproduction button 34, the erase button 35, the AF lock button 36, the AE lock button 37, the menu/OK button 38, the selector button 39, the display/back button 40, the first operation dial D1, and the second operation dial D2, and outputs a signal corresponding to an operation on each operation member to the system controller 80.

The system controller 80 is a control unit which controls an operation of each unit of the digital camera 1. The system controller 80 is configured with a microcomputer. That is, the microcomputer functions as the system controller 80 by executing a predetermined control program, and functions as a control unit which controls an operation of each unit of the digital camera 1.

The system controller 80 also functions as a control unit for the lens 2. The system controller 80 controls an operation of the lens 2 via a lens drive unit 2a provided for the lens 2. The lens 2 comprises a stop, a focus lens, and the like. The lens drive unit 2a comprises a stop drive unit which drives the stop, a focus lens drive unit which drives the focus lens, and the like.

[Display on Sub-Display]

As described above, set contents of the digital camera 1 and image pictures of the first operation dial D1 and the second operation dial D2 are displayed on the sub-display 16.

The set contents of the digital camera 1 are various pieces of information which are set during imaging. For example, the set contents include information such as a sensitivity, an F number, and a shutter speed which are set. In a case of a camera in which selection of an imaging mode, selection of a light metering method, selection of an AF method, selection of white balance, selection of an image size, selection of image quality, the number of images which can be captured, selection of a flash mode, whether or not consecutive shot is performed, whether or not a self timer is set, and the like are possible, such setting information is included in the set contents of the camera.

In the present embodiment, information such as each of a shutter speed, an F number, a sensitivity, and the number of images which can be captured is displayed on the sub-display 16 as a set content of the camera.

On the other hand, an image picture of the operation dial is an image indicating the operation dial. The image picture of the operation dial is configured with an image shaping an exterior of a general rotary operation dial comprising a dial plate. Particularly, in the present embodiment, the image picture of each operation dial is configured with an image in which a disc-shaped operation dial comprising a dial plate on its top surface is viewed from the top, and is configured with a circular graphic. A specific example of the image picture of the operation dial will be described later.

<<Display Form>>

Display on the sub-display 16 has different display forms in a case where the first operation dial D1 and the second operation dial D2 are being operated and in a case where the first operation dial D1 and the second operation dial D2 are not operated.

In a case where the first operation dial D1 and the second operation dial D2 are not operated, a set content of the camera is generally displayed on the sub-display 16. Only parts of the image pictures of the first operation dial D1 and the second operation dial D2 are displayed at an edge part of the sub-display 16.

On the other hand, in a case where at least one of the first operation dial D1 or the second operation dial D2 is operated, the image picture of the operated operation dial appears, and the set content of the camera is displayed in a state of being retreated to a margin region.

In other words, the image picture of each operation dial is displayed to be advanced and retreated between the edge part and a display region of the sub-display 16 in response to an operation on each operation dial.

Hereinafter, with reference to the drawings, specific display forms will be described.

<During Non-Operation>

Figure 7:
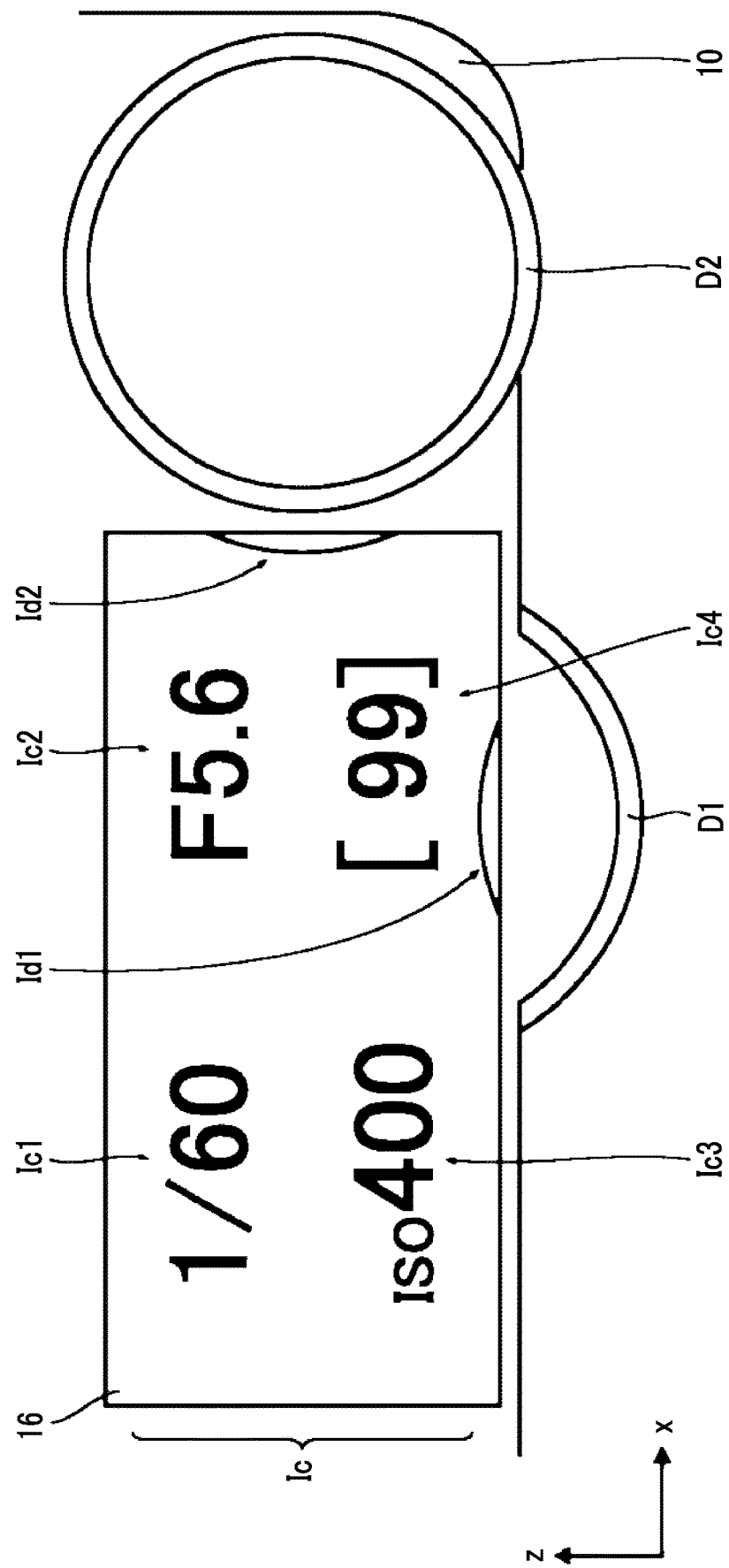
FIG. 7 is a plan view illustrating an example of display on a sub-display during a non-operation.

FIG. 7 is a plan view illustrating an example of display on the sub-display during a non-operation.

As illustrated in FIG. 7, in a case where the first operation dial D1 and the second operation dial D2 are not operated, set contents Ic of the camera are displayed to be enlarged on the sub-display 16.

As described above, the set contents Ic of the camera include information Ic1 regarding a shutter speed, information Ic2 regarding an F number, information Ic3 regarding a sensitivity, and information Ic4 regarding the number of images which can be captured. Each piece of information is displayed in the display region of the sub-display 16 with a predefined size and a predefined layout.

As illustrated in FIG. 7, in a case where the first operation dial D1 and the second operation dial D2 are not operated, a part of an image picture Id1 of the first operation dial D1 and a part of an image picture Id2 of the second operation dial D2 are displayed from the edge part of the sub-display 16. In other words, parts of outer circumferences of the image pictures Id1 and Id2 are displayed to protrude from the edge part of the sub-display 16 to the display region.

Figure 8:
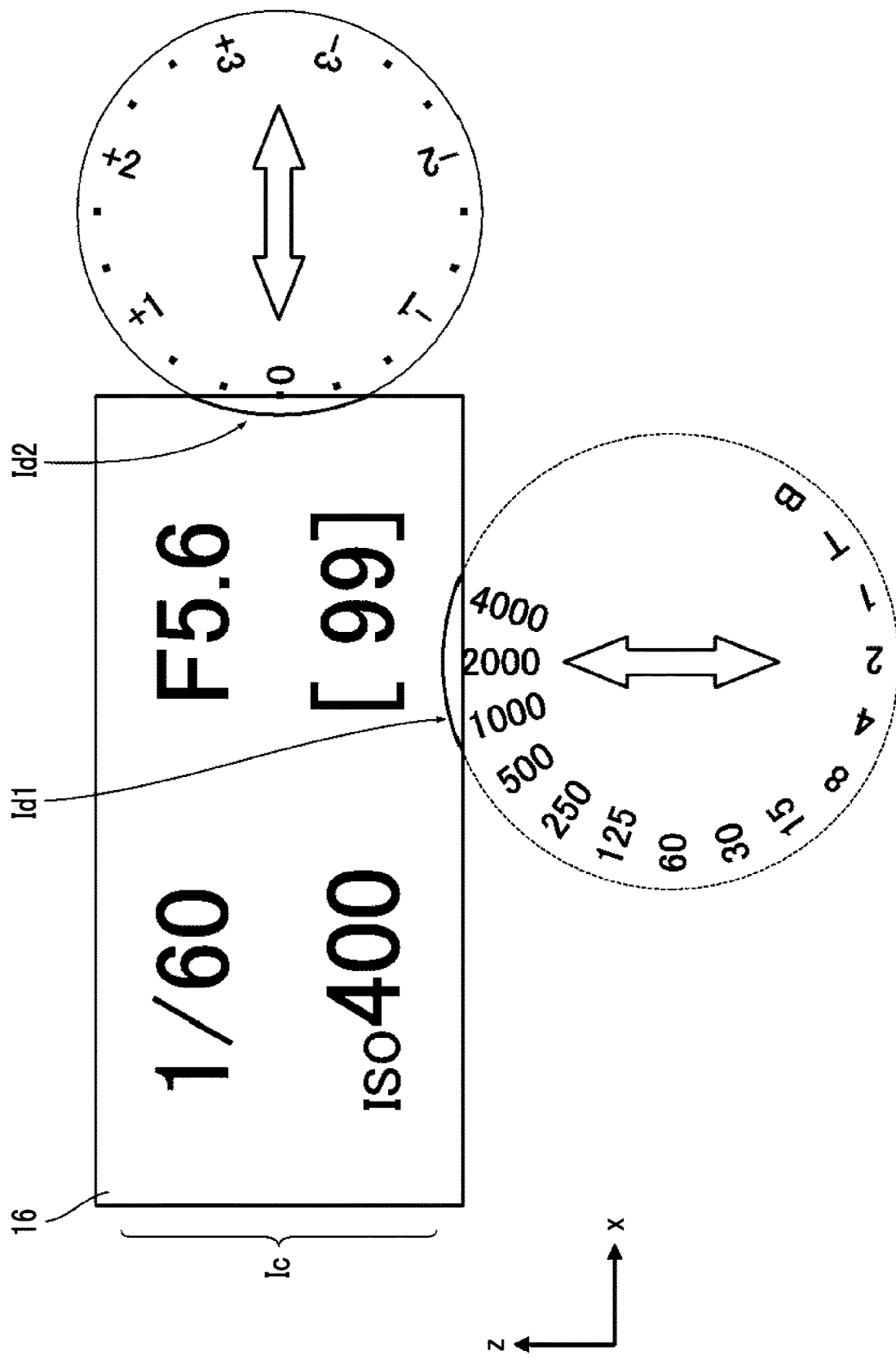
FIG. 8 is a conceptual diagram of display of image pictures of the first operation dial and the second operation dial during a non-operation.

FIG. 8 is a conceptual diagram illustrating display of the image pictures of the first operation dial and the second operation dial during a non-operation.

As illustrated in FIG. 8, in a case where the first operation dial D1 and the second operation dial D2 are not operated, the majority of the image picture Id1 of the first operation dial D1 and the image picture Id2 of the second operation dial D2 are hidden out of the display region, and only parts of the outer circumferences thereof are displayed from the edge part of the sub-display 16. Portions indicated by dashed line in FIG. 8 are hidden portions of the image pictures Id1 and Id2. A display layout of the sub-display 16 during a non-operation will be referred to as a "layout during a non-operation".

<During Operation>

(1) In Case where First Operation Dial D1 is Operated

Figure 9:
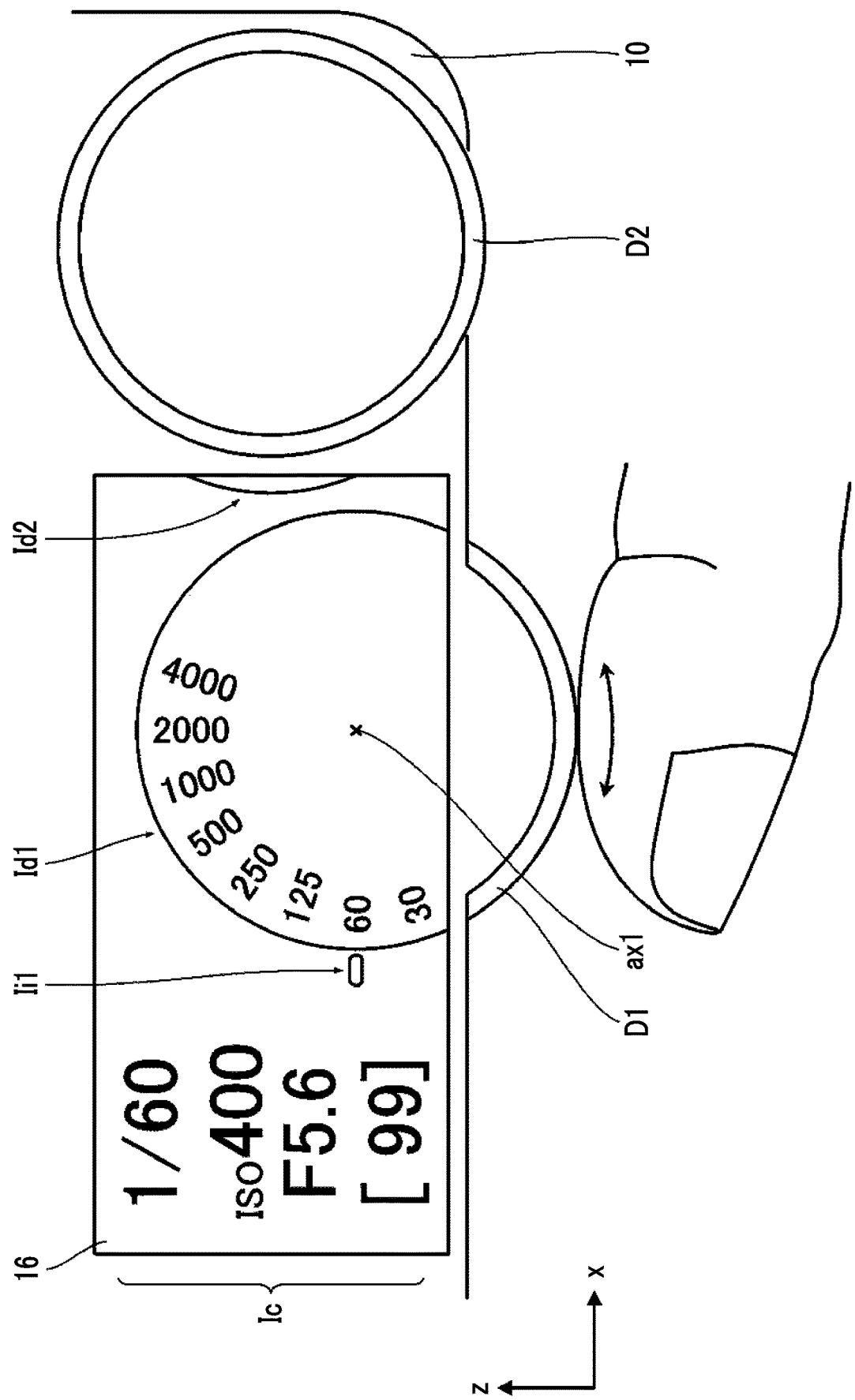
FIG. 9 is a plan view illustrating an example of display on the sub-display in a case where the first operation dial is rotationally operated.

FIG. 9 is a plan view illustrating an example of display on the sub-display in a case where the first operation dial D1 is rotationally operated.

As illustrated in FIG. 9, in a case where the first operation dial D1 is rotationally operated, the hidden image picture Id1 of the first operation dial D1 is advanced and appears from the edge part of the sub-display 16 to the display region thereof.

Here, the image picture Id1 of the first operation dial D1 has the same outer diameter as that of the actual first operation dial D1 (including the substantially same outer diameter), and, in a case where the image picture Id1 is displayed to be advanced from the edge part of the sub-display 16 to the display region thereof, the image picture Id1 is located on the same axis as the rotation axis ax1 of the actual first operation dial D1.

As a result, as illustrated in FIG. 9, in a case where the image picture Id1 of the first operation dial D1 is displayed in the display region of the sub-display 16, the hidden portion of the actual first operation dial D1 is displayed to be complemented by the image picture Id1. In this case, the image picture Id1 of the first operation dial D1 displayed on the sub-display 16 is an image having a circular arc outer shape to which a part of the first operation dial D1 exposed from the camera body 10 extends.

As mentioned above, since the hidden portion of the actual first operation dial D1 is displayed to be complemented by the image picture Id1, the relevance between the actual first operation dial D1 and the image picture Id1 thereof can be clarified.

The set contents Ic of the camera are displayed to be deviated to the margin region in conjunction with appearing of the image picture Id1 of the first operation dial D1. The margin region is a portion in which the image picture of the operation dial is not displayed in the display region of the sub-display 16. In other words, the margin region is a portion in which nothing is displayed and is left in a case where the image picture of the operation dial is displayed.

In a case where the set contents Ic of the camera are displayed in the margin region, sizes and layouts of the set contents Ic of the camera are changed as necessary. In the example illustrated in FIG. 9, both of the sizes and the layouts are changed, and then the set contents Ic of the camera are displayed in the margin region.

A display layout of the sub-display 16 in a case where the first operation dial D1 is rotationally operated will be referred to as a "first layout during an operation".

(2) In Case where Second Operation Dial D2 is Operated

Figure 10:
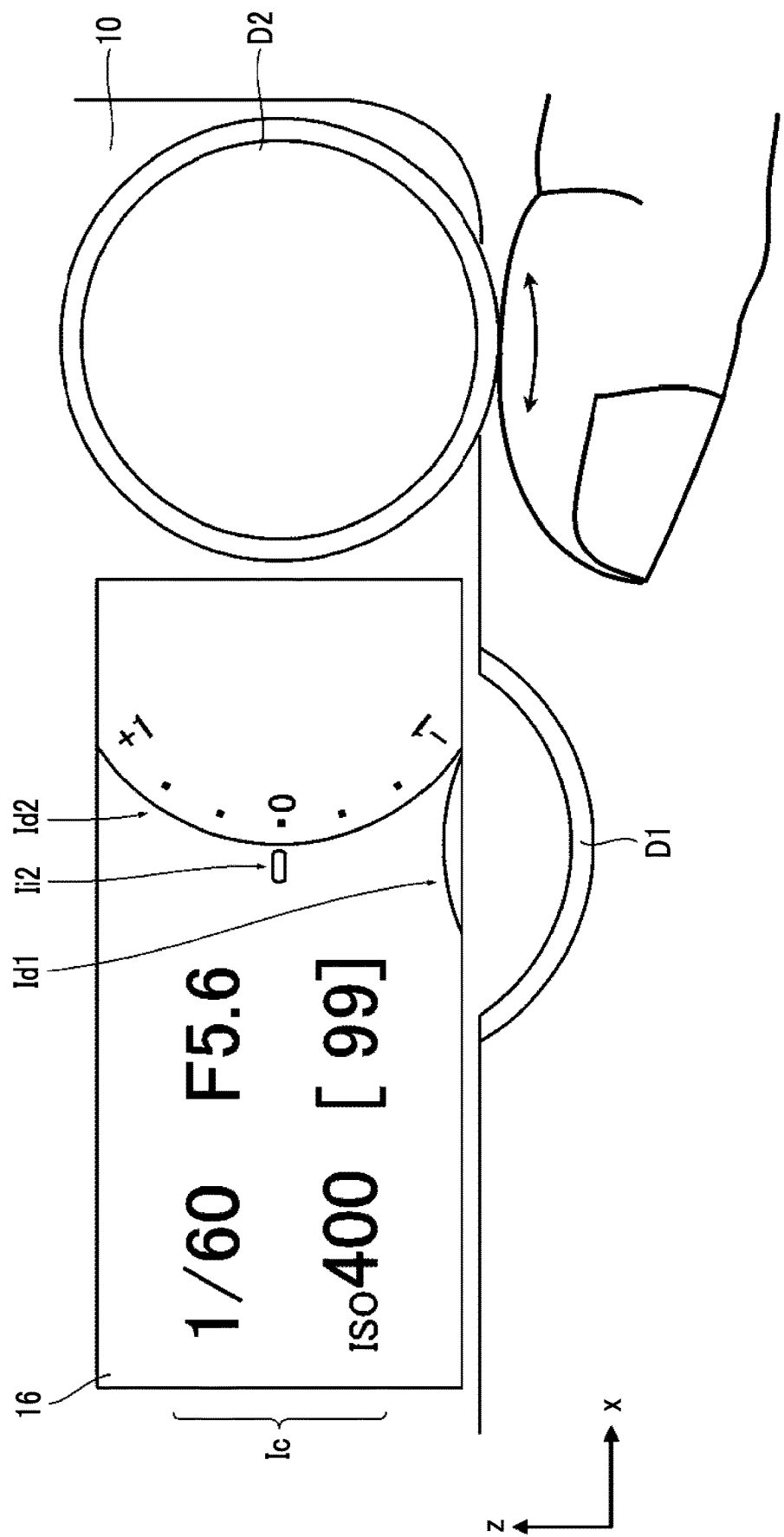
FIG. 10 is a plan view illustrating an example of display on the sub-display in a case where the second operation dial is rotationally operated.

FIG. 10 is a plan view illustrating an example of display on the sub-display in a case where the second operation dial D2 is rotationally operated.

As illustrated in FIG. 10, in a case where the second operation dial D2 is rotationally operated, the hidden image picture Id2 of the second operation dial D2 appears from the edge part, and an image of a dial plate portion on which settings are displayed is displayed to be visually recognized.

The set contents Ic of the camera are displayed to be deviated to the margin region in conjunction with appearing of the image picture Id2 of the second operation dial D2. In this case, the sizes of the set contents Ic of the camera are changed and displayed.

A display layout of the sub-display 16 in a case where the second operation dial D2 is rotationally operated will be referred to as a "second layout during an operation".

(3) Direction in which Image Picture Appears

As described above, in a case where the operation dial is rotationally operated, the image picture of the rotationally operated operation dial appears from the edge part, and the image of the dial plate portion on which the settings are displayed is displayed to be visually recognized. In other words, the image picture of the operation dial is displayed to be advanced from the edge part to the display region of the sub-display 16. Consequently, the image picture of the operation dial is displayed on the sub-display 16 in a state in which the image of the dial plate portion on which the settings are displayed can be visually recognized.

A direction in which the image picture of the operation dial appears is a direction in which each operation dial is disposed with respect to the sub-display 16.

Therefore, the image picture Id1 of the first operation dial D1 is advanced from and retreated in the direction in which the first operation dial D1 is disposed with respect to the sub-display 16, and thus appears from or disappears to the edge part. This direction is a direction orthogonal to the edge part where the image picture Id1 of the first operation dial D1 is displayed.

Therefore, the image picture Id2 of the second operation dial D2 is advanced from and retreated in the direction in which the second operation dial D2 is disposed with respect to the sub-display 16, and thus appears from or disappears to the edge part. This direction is a direction orthogonal to the edge part where the image picture Id2 of the second operation dial D2 is displayed.

In the digital camera 1 of the present embodiment, the first operation dial D1 is disposed on the rear side of the sub-display 16, and the second operation dial D2 is disposed on the right side of the sub-display 16.

Therefore, the image picture Id1 of the first operation dial D1 is advanced from and retreated in the front-and-rear direction (z direction), and thus appears or disappears between the edge part on the rear side to the display region. More specifically, the image picture Id1 of the first operation dial D1 is advanced from and retreated in the front-and-rear direction (z direction) with respect to the position where the first operation dial D1 is disposed, and appears or disappears between the edge part on the rear side and the display region.

The image picture Id2 of the second operation dial D2 is advanced from and retreated in the horizontal direction (x direction), and appears or disappears between the edge part on the right side and the display region. More specifically, the image picture Id2 of the second operation dial D2 is advanced from and retreated in the horizontal direction (x direction) with respect to the position where the second operation dial D2 is disposed, and appears or disappears between the edge part on the right side and the display region.

In a case where a position where an image picture is displayed when the operation dial is operated is referred to as a "display position", the display position is set to a position where display of at least the dial plate can be visually recognized. Particularly, the display position is set to a position where information set with the operation dial can be visually recognized. Since the display position is a position where information set with the operation dial can be visually recognized, the entire image picture is not necessarily required to be displayed. A part of the image picture may be hidden.

On the other hand, in a case where a position where an image picture is displayed when the image picture is retreated is referred to as a "retreat position", the retreat position is set to a position where at least a part of the outer circumference of the image picture of the operation dial is displayed to remain at the edge of the sub-display 16. In the retreat position, the image picture of each operation dial is set in a state in which the presence thereof can be recognized on the display surface of the sub-display 16 but a set value cannot be viewed. Particularly, in this example, the retreat position is set to a position where display of the dial plate portion cannot be viewed.

<<Specific Example of Image Picture of Operation Dial>>

The image picture of each operation dial is configured with an image corresponding to an allocated function.

In the digital camera 1 of the present embodiment, (1) a function of setting an exposure correction value, (2) a function of setting a shutter speed, (3) a function of setting a sensitivity, (4) a function of setting an F number may be allocated to the first operation dial D1 and the second operation dial D2.

Even in a case where several functions are allocated thereto, outer shapes of image pictures of an operation dial are the same as each other and have a circular shape, and images of an inner portion of the circle, that is, an image of the dial plate portion may be changed depending on an allocated function. Hereinafter, a description will be made of an example of an image picture for each allocated function.

<Basic Display Form>

Figure 11:
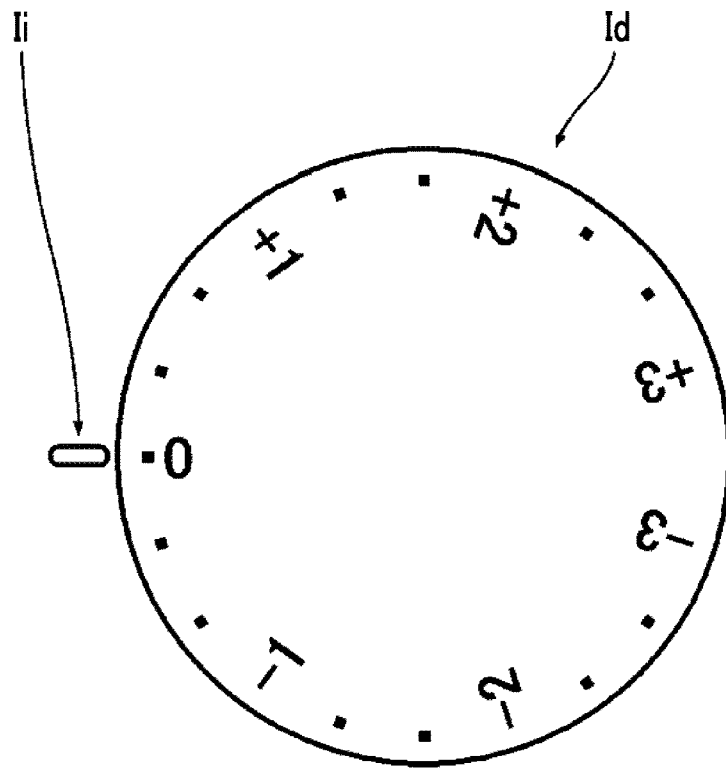
FIG. 11 is a diagram illustrating an example of an image picture of an operation dial in a case where a function of setting an exposure correction value is allocated thereto.

(1) Image Picture in Case where Function of Setting Exposure Correction Value is Allocated FIG. 11 is a diagram illustrating an example of an image picture of an operation dial in a case where the function of setting an exposure correction value is allocated.

As illustrated in FIG. 11, in a case where the function of setting an exposure correction value is allocated, an image picture Id of an operation dial is configured with an image in which a general exposure correction dial is viewed from the top. Specifically, as illustrated in FIG. 11, the image picture is configured with an image in which settable exposure correction values are displayed at a predetermined pitch on an identical circumference in a dial plate portion inside the circle.

FIG. 11 illustrates an example of the image picture Id in a case where an exposure correction value is set with a step width of ⅓ step between −3 and +3. In this case, intermediate values (between ±0 and +1, between +1 and +2, between +2 and +3, between ±0 and −1, between −1 and −2, and between −2 and −3) are displayed with dots (•).

(2) Image Picture in Case where Function of Setting Shutter Speed is Allocated

Figure 12:
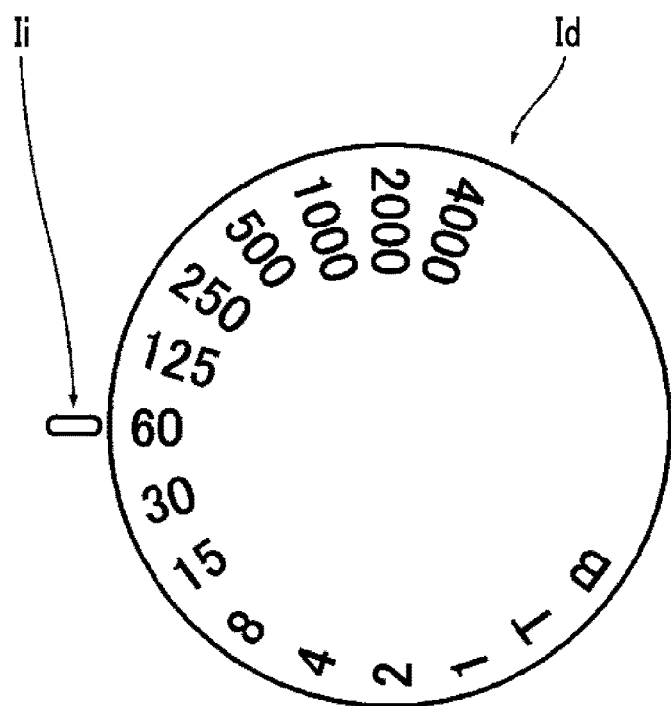
FIG. 12 is a diagram illustrating an example of an image picture of the operation dial in a case where a function of setting a shutter speed is allocated thereto.

FIG. 12 is a diagram illustrating an example of an image picture of an operation dial in a case where the function of setting a shutter speed is allocated.

As illustrated in FIG. 12, in a case where the function of setting a shutter speed is allocated, an image picture Id of an operation dial is configured with an image in which a general shutter speed dial is viewed from the top. Specifically, as illustrated in FIG. 12, the image picture is configured with an image in which settable shutter speeds are displayed at a predetermined pitch on an identical circumference in a dial plate portion.

FIG. 12 illustrates an example of the image picture Id in a case where a shutter speed is set with a step width of one step between 1 second and ¼₀₀₀ seconds.

Generally, a shutter speed is displayed in an inverse number in a shutter speed dial. In other words, for example, in a case where a shutter speed is ¹⁄₆₀ seconds, "60" is displayed on a dial plate. Similarly, in a case where a shutter speed is ¹⁄₄₀₀₀ seconds, "4000" is displayed on the dial plate.

In the example illustrated in FIG. 12, "B" indicates a bulb imaging mode, and "T" indicates a time imaging mode. The bulb imaging mode is a mode in which the shutter is opened while the shutter button 30 is pressed, and the shutter is closed when the shutter button 30 is released. The time imaging mode is a mode in which an exposure time is designated by a user. This mode is generally used for exposure for a long period of time.

(3) Image Picture in Case where Function of Setting Sensitivity is Allocated

Figure 13:
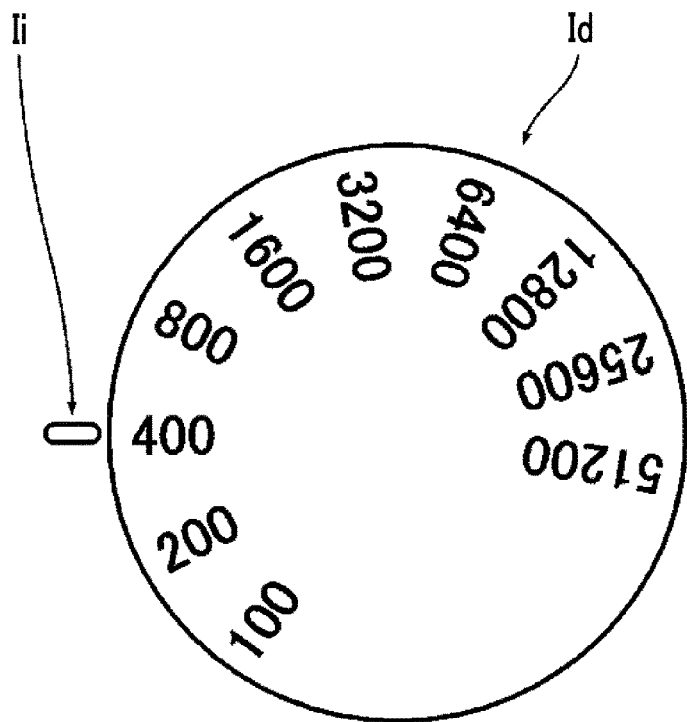
FIG. 13 is a diagram illustrating an example of an image picture of the operation dial in a case where a function of setting a sensitivity is allocated thereto.

FIG. 13 is a diagram illustrating an example of an image picture of an operation dial in a case where the function of setting a sensitivity is allocated.

As illustrated in FIG. 13, in a case where the function of setting a sensitivity is allocated, an image picture Id of an operation dial is configured with an image in which a general shutter speed dial is viewed from the top. Specifically, the image picture is configured with an image in which settable sensitivities are displayed at a predetermined pitch on an identical circumference in a dial plate portion.

FIG. 13 illustrates an example of the image picture Id in a case where an ISO sensitivity is set with a step width of one step between ISO100 and ISO51200 (ISO: International Organization for Standardization).

(4) Image Picture in Case where Function of Setting F Number is Allocated

Figure 14:
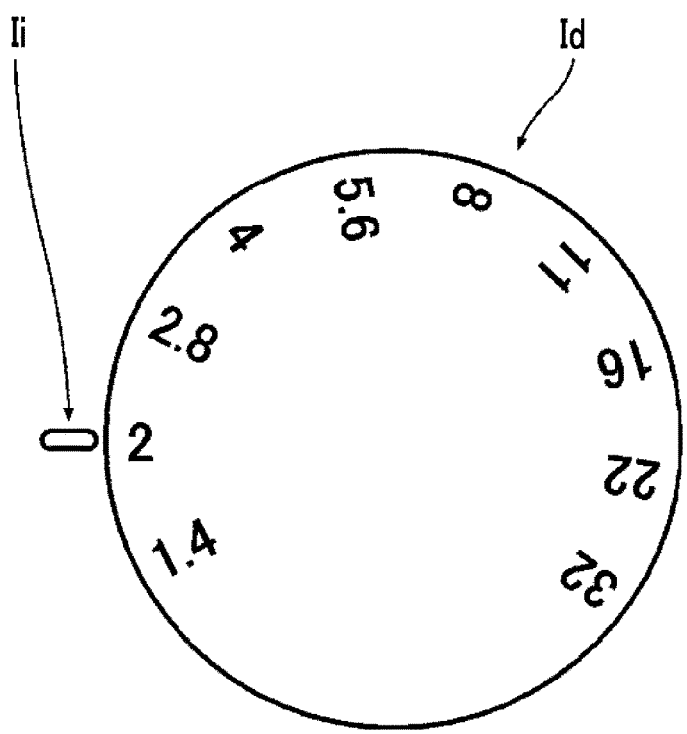
FIG. 14 is a diagram illustrating an example of an image picture of the operation dial in a case where a function of setting an F number is allocated thereto.

FIG. 14 is a diagram illustrating an example of an image picture of an operation dial in a case where the function of setting an F number is allocated.

As illustrated in FIG. 14, in a case where the function of setting an F number is allocated, an image picture Id of an operation dial is configured with an image in which settable F numbers are displayed at a predetermined pitch on an identical circumference in a dial plate portion.

FIG. 14 illustrates an example of the image picture Id in a case where an F number is set with a step width of one step between F1.4 and F32 seconds. The settable F numbers are uniquely determined according to an imaging lens to be used.

<Indicator of Operation Dial>

As illustrated in FIGS. 9 and 10, in a case where the first operation dial D1 and the second operation dial D2 are operated, and thus the image pictures Id1 and Id2 thereof are displayed on the sub-display 16, image pictures Ii1 and Ii2 of indicators are displayed on the sub-display 16.

The indicator indicates the current set value. In this example, the image pictures Ii1 and Ii2 of the indicators are configured with bar-shaped graphics.

The image pictures Ii1 and Ii2 of the indicators are displayed at predetermined positions near the outer circumferential portion with respect to the image pictures of the respective operation dials. Specifically, as illustrated in FIG. 9, the image picture Ii1 of the indicator for the image picture Id1 of the first operation dial D1 is displayed at the position of nine o'clock with respect to the image picture Id1 of the first operation dial D1. As illustrated in FIG. 10, the image picture Ii2 of the indicator for the image picture Id2 of the second operation dial D2 is displayed at the position of nine o'clock with respect to the image picture Id2 of the second operation dial D2.

In the image picture of each operation dial, the currently set value is displayed at a position indicated by the image picture of the indicator. In other words, an image of the dial plate is configured such that the currently set value is located at the position indicated by the image picture of the indicator. For example, in a case where the function of setting an exposure correction value is allocated to the operation dial, and the exposure correction value is set to 0, as illustrated in FIG. 11, the image of the dial plate is configured such that 0 is located at a position indicated by the image picture Ii of the indicator. For example, in a case where the function of setting a shutter speed is allocated to the operation dial, and the shutter speed is set to 1/60 seconds, as illustrated in FIG. 12, the image of the dial plate is configured such that 60 is located at a position indicated by the image picture Ii of the indicator.

The image picture of each operation dial appearing from the edge part is displayed on the sub-display 16 in a state in which at least a portion indicated by the image picture of the indicator can be visually recognized. In the digital camera 1 of the present embodiment, the image picture of the indicator is displayed at the position of nine o'clock with respect to the image picture of each operation dial, and thus the image picture of each operation dial is displayed in a state in which at least an image of the dial plate at the position of nine o'clock can be visually recognized.

<Display Form During Rotational Operation>

In a case where the operation dial is rotationally operated in a state in which the image picture of each operation dial is displayed on the sub-display 16, the image picture which is being displayed is rotationally displayed in conjunction with the operation. For example, in a case where the first operation dial D1 is rotationally operated in a state in which the image picture Id1 of the first operation dial D1 appears in the display region of the sub-display 16, the image picture Id1 of the first operation dial D1 which is being displayed is rotated in the same direction as the operated direction with the center of the image picture as an axis.

Here, in a case where the actual operation dial is rotated by one click, the image picture is rotated by one item. For example, in a case where the actual operation dial is rotated clockwise by one click, the image picture is rotated clockwise by one item. In other words, the image picture is rotated such that setting is performed to be moved up or down by one item every click.

[Function Allocated to Operation Dial]

A function allocated to each operation dial is set by a user. The user calls a predetermined setting screen on the main display 14, and sets a function to be allocated to each operation dial.

As described above, in the digital camera 1 of the present embodiment, functions allocated to the first operation dial D1 and the second operation dial D2 include (1) the function of setting an exposure correction value, (2) the function of setting a shutter speed, (3) the function of setting a sensitivity, (4) the function of setting an F number. The user selects some functions, and allocates the functions to the first operation dial D1 and the second operation dial D2.

<<Control System Related to Display on Sub-Display>>

Figure 15:
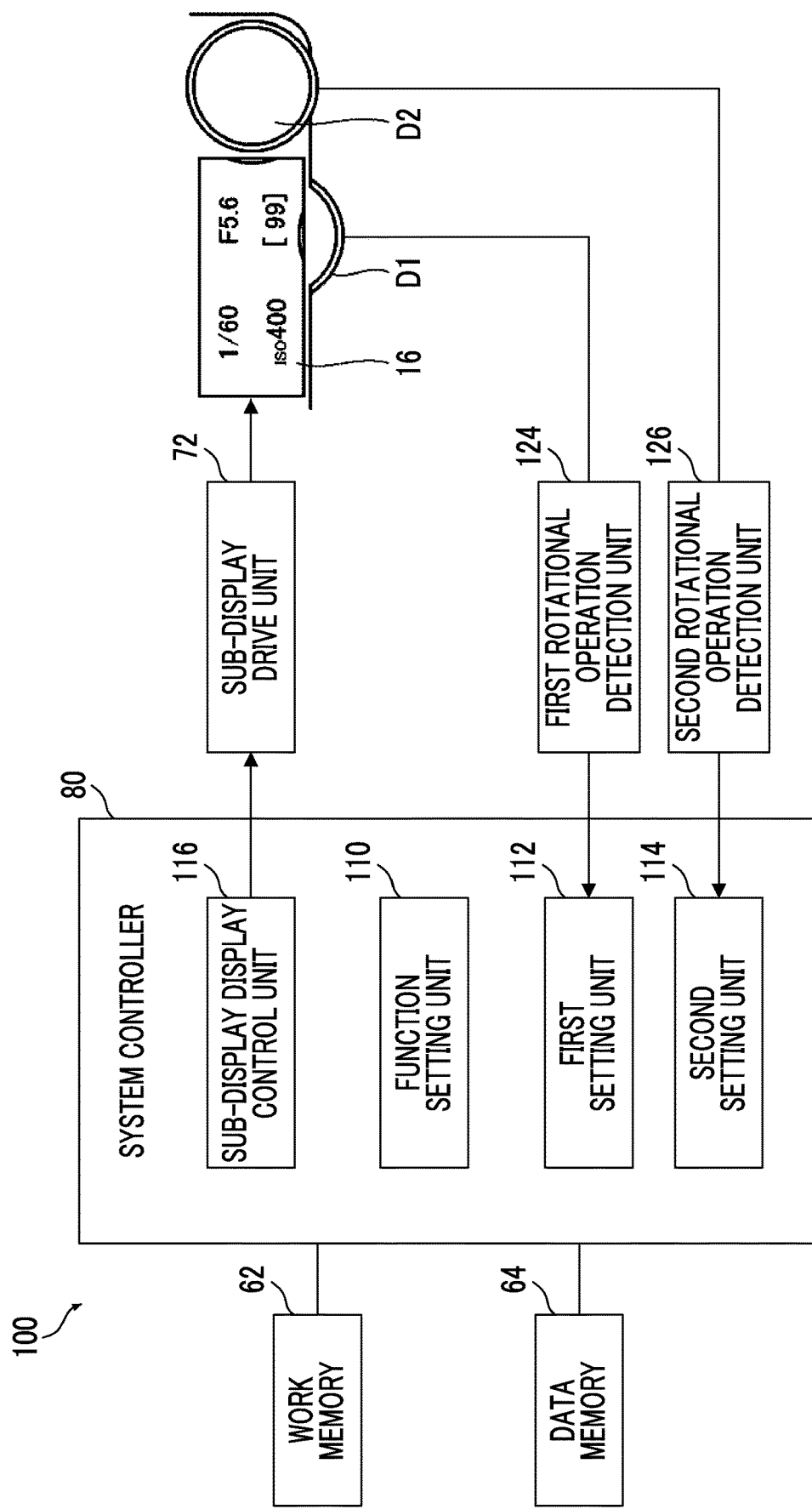
FIG. 15 is a block diagram of a control system related to display on the sub-display.

FIG. 15 is a block diagram of a control system related to display on the sub-display.

A control system 100 related to display on the sub-display 16 includes a function setting unit 110 which sets functions to be allocated to the first operation dial D1 and the second operation dial D2, a first setting unit 112 which sets a function allocated to the first operation dial D1 in response to an operation on the first operation dial D1, a second setting unit 114 which sets a function allocated to the second operation dial D2 in response to an operation on the second operation dial D2, and a sub-display display control unit 116 which controls display on the sub-display 16.

<<Function Setting Unit>>

The function setting unit 110 sets functions to be allocated to the first operation dial D1 and the second operation dial D2.

As described above, the user sets functions to be allocated to the first operation dial D1 and the second operation dial D2 on a predetermined setting screen. The function setting unit 110 allocates the functions set on the predetermined setting screen to the first operation dial D1 and the second operation dial D2. For example, in a case where the function of setting a shutter speed is allocated to the first operation dial D1 and the function of setting an exposure correction value is allocated to the second operation dial D2 on the setting screen, the function setting unit 110 allocates the function of setting a shutter speed to the first operation dial D1 and allocates the function of setting an exposure correction value to the second operation dial D2.

The functions allocated to the first operation dial D1 and the second operation dial D2 are recorded in the data memory 64.

The function of the function setting unit 110 is provided as one of the functions of the system controller 80. In other words, the microcomputer executes a predetermined control program, and thus the system controller 80 provides the function of the function setting unit 110.

<<First Setting Unit>>

The first setting unit 112 performs a process of setting the function allocated to the first operation dial D1 in response to a rotational operation on the first operation dial D1. For example, in a case where the function of setting a shutter speed is allocated to the first operation dial D1, the first setting unit 112 performs a process of setting a shutter speed in response to a rotational operation on the first operation dial D1.

Here, the rotational operation on the first operation dial D1 is detected by a first rotational operation detection unit 124 provided in the first operation dial D1. The first rotational operation detection unit 124 detects a rotational operation direction and a rotational operation amount for the first operation dial D1. The first rotational operation detection unit 124 is configured with, for example, well-known rotation detection means such as a rotary encoder or a rotation brush. A detection result in the first rotational operation detection unit 124 is output to the system controller 80.

The function of the first setting unit 112 is provided as one of the functions of the system controller 80. In other words, the microcomputer executes a predetermined control program, and thus the system controller 80 provides the function of the first setting unit 112.

<<Second Setting Unit>>

The second setting unit 114 performs a process of setting the function allocated to the second operation dial D2 in response to a rotational operation on the second operation dial D2. For example, in a case where the function of setting an exposure correction value is allocated to the second operation dial D2, the second setting unit 114 performs a process of setting an exposure correction value in response to a rotational operation on the second operation dial D2.

Here, the rotational operation on the second operation dial D2 is detected by a second rotational operation detection unit 126 provided in the second operation dial D2. The second rotational operation detection unit 126 detects a rotational operation direction and a rotational operation amount for the second operation dial D2. The second rotational operation detection unit 126 is configured with, for example, well-known rotation detection means such as a rotary encoder or a rotation brush. A detection result in the second rotational operation detection unit 126 is output to the system controller 80.

The function of the second setting unit 114 is provided as one of the functions of the system controller 80. In other words, the microcomputer executes a predetermined control program, and thus the system controller 80 provides the function of the second setting unit 114.

<<Sub-Display Display Control Unit>>

The sub-display display control unit 116 is an example of a display control unit, and controls display on the sub-display 16. The sub-display display control unit 116 acquires information regarding a set content of the digital camera 1 to be displayed on the sub-display 16, and displays the set content on the sub-display 16 in a predetermined format.

The sub-display display control unit 116 displays the image pictures Id1 and Id2 of the respective operation dials on the sub-display 16. As mentioned above, the image pictures Id1 and Id2 of the respective operation dials are displayed to be advanced and retreated between the edge part and the display region of the sub-display 16 in response to operations on the operation dials. A display position of a set content is adjusted in conjunction therewith.

The function of the sub-display display control unit 116 is provided as one of the functions of the system controller 80. In other words, the microcomputer executes a predetermined control program (setting display program), and thus the system controller 80 provides the function of the sub-display display control unit 116.

[Setting Display Method for Sub-Display]

Hereinafter, a description will be made of a setting display method on the sub-display 16 in the digital camera 1 of the present embodiment.

Figure 16:
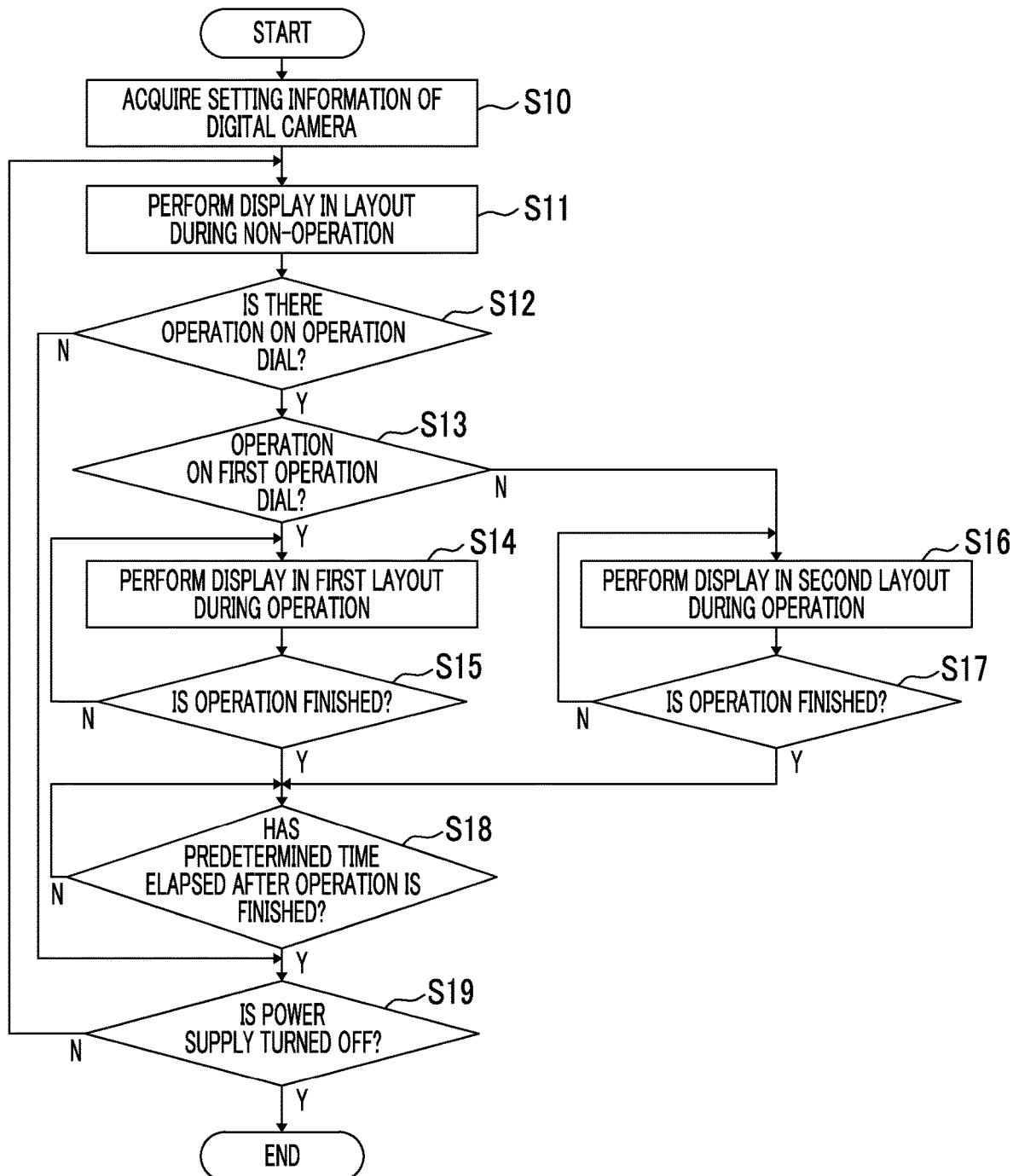
FIG. 16 is a flowchart illustrating process procedures for display on the sub-display.

FIG. 16 is a flowchart illustrating process procedures for display on the sub-display.

In a case where power is supplied to the digital camera 1, the sub-display display control unit 116 acquires setting information of the digital camera 1 (step S10). The acquired information is information displayed on the sub-display 16 as a set content of the camera. In a case of the digital camera 1 of the present embodiment, information regarding a shutter speed, an F number, a sensitivity, and the number of images which can be captured is displayed on the sub-display 16 as the set content of the camera. Therefore, the sub-display display control unit 116 acquires the information regarding a shutter speed, an F number, a sensitivity, and the number of images which can be captured.

In a case where the information required to be displayed on the sub-display 16 is acquired, the sub-display display control unit 116 displays the set contents of the camera and an image picture of each operation dial on the sub-display 16 in a layout during a non-operation (step S11). In the layout during a non-operation, as illustrated in FIG. 7, the set contents Ic of the camera are mainly displayed, and the image picture Id1 of the first operation dial D1 and the image picture Id2 of the second operation dial D2 are partially displayed at the edge part of the sub-display 16.

Thereafter, the sub-display display control unit 116 determines the presence or absence of operations on the first operation dial D1 and the second operation dial D2 on the basis of inputs from the first rotational operation detection unit 124 and the second rotational operation detection unit 126 (step S12).

In a case where it is determined that there is the presence of an operation on the first operation dial D1 or the second operation dial D2, it is determined whether or not the operation has been performed on the first operation dial D1 (step S13).

Here, in a case where it is determined that a rotationally operated operation dial is the first operation dial D1, the set contents of the camera and the image picture of each operation dial are displayed on the sub-display 16 in the first layout during an operation (step S14).

In the first layout during an operation, as illustrated in FIG. 9, the image picture Id1 of the first operation dial D1 appears in the display region, and the set contents Ic of the camera are moved to the margin region so as to be displayed. In this case, the sub-display display control unit 116 advances and displays the image picture Id1 of the first operation dial D1 from the edge part to the display region. In a case where the first operation dial D1 is continuously rotationally operated, the sub-display display control unit 116 rotates the image picture Id1 of the first operation dial D1 in conjunction with the operation.

Thereafter, the sub-display display control unit 116 determines whether or not the operation on the first operation dial D1 is finished on the basis of an input from the first rotational operation detection unit 124 (step S15). In a case where it is determined that the operation on the first operation dial D1 is finished, it is determined whether or not a predetermined time has elapsed from the operation finishing (step S18).

In a case where it is determined that the predetermined time has elapsed from the operation finishing, it is determined whether or not the power supply is turned off (step S19). In a case where the power supply is turned off, the process is finished. On the other hand, in a case where it is determined that the power supply is not turned off, the flow returns to step S11, the set contents of the camera and an image picture of each operation dial on the sub-display 16 are displayed in a layout during a non-operation (step S11).

In a case where it is determined that a rotationally operated operation dial is not the first operation dial D1 in step S13, the set contents of the camera and an image picture of each operation dial on the sub-display 16 are displayed in the second layout during an operation (step S16).

In the second layout during an operation, as illustrated in FIG. 10, the image picture Id2 of the second operation dial D2 appears in the display region, and the set contents Ic of the camera are moved to the margin region so as to be displayed. In this case, the sub-display display control unit 116 advances and displays the image picture Id2 of the second operation dial D2 from the edge part to the display region. In a case where the second operation dial D2 is continuously rotationally operated, the sub-display display control unit 116 rotates the image picture Id2 of the second operation dial D2 in conjunction with the operation.

Thereafter, the sub-display display control unit 116 determines whether or not the operation on the second operation dial D2 is finished on the basis of an input from the second rotational operation detection unit 126 (step S17). In a case where it is determined that the operation on the second operation dial D2 is finished, it is determined whether or not a predetermined time has elapsed from the operation finishing (step S18).

In a case where it is determined that the predetermined time has elapsed from the operation finishing, it is determined whether or not the power supply is turned off (step S19). In a case where the power supply is turned off, the process is finished. On the other hand, in a case where it is determined that the power supply is not turned off, the flow returns to step S11, the set contents of the camera and an image picture of each operation dial on the sub-display 16 are displayed in a layout during a non-operation (step S11).

As mentioned above, the sub-display display control unit 116 controls the sub-display 16 according to operations on the first operation dial D1 and the second operation dial D2.

[Effects]

As described above, according to the digital camera 1, in a case where the operation dial disposed around the sub-display 16 is operated, the image picture Id1 or Id2 thereof appears on the sub-display 16, and thus a content set by the operation dial can be viewed. Consequently, it is possible to easily perform setting using the operation dial.

Since an image picture of an operated operation dial appears from a direction in which the operated operation dial is disposed, it is possible to make the relevance between the operated operation dial and display on the sub-display 16 clear. Consequently, even in a case where a plurality of operation dials are provided, it is possible to provide a favorable operability.

The image pictures Id1 and Id2 of the respective operation dials are retreated during a non-operation, and thus the set contents Ic of the camera can be displayed to be large. Consequently, it is possible to improve the visibility of the set contents Ic of the camera.

During a non-operation, the image pictures Id1 and Id2 of the respective operation dials are not completely hidden but parts thereof are displayed, and thus a user can recognize the presence of the operation dials. Since the parts of the image pictures Id1 and Id2 of the respective operation dials are displayed, display positions and shapes of the image pictures can be easily recognized. Consequently, it is possible to realize a higher operability. In other words, since the display positions and the shapes of the image pictures Id1 and Id2 are recognized, an operation position becomes clear during an operation, and thus a favorable operability can be realized.

Modification Example

Modification Example of Display Form

<In Case where Image Pictures of Plural Operation Dials are Displayed at One Time>

In the above-described embodiment, there is a configuration in which, in a case where either one of the first operation dial D1 and the second operation dial D2 is operated, the image picture of the operated operation dial is advanced from the edge part to the display region so as to be displayed. In this case, only settings of the operated operation dial can be viewed. It is necessary to display both of the image pictures in the display region in order to view both settings.

Figure 17:
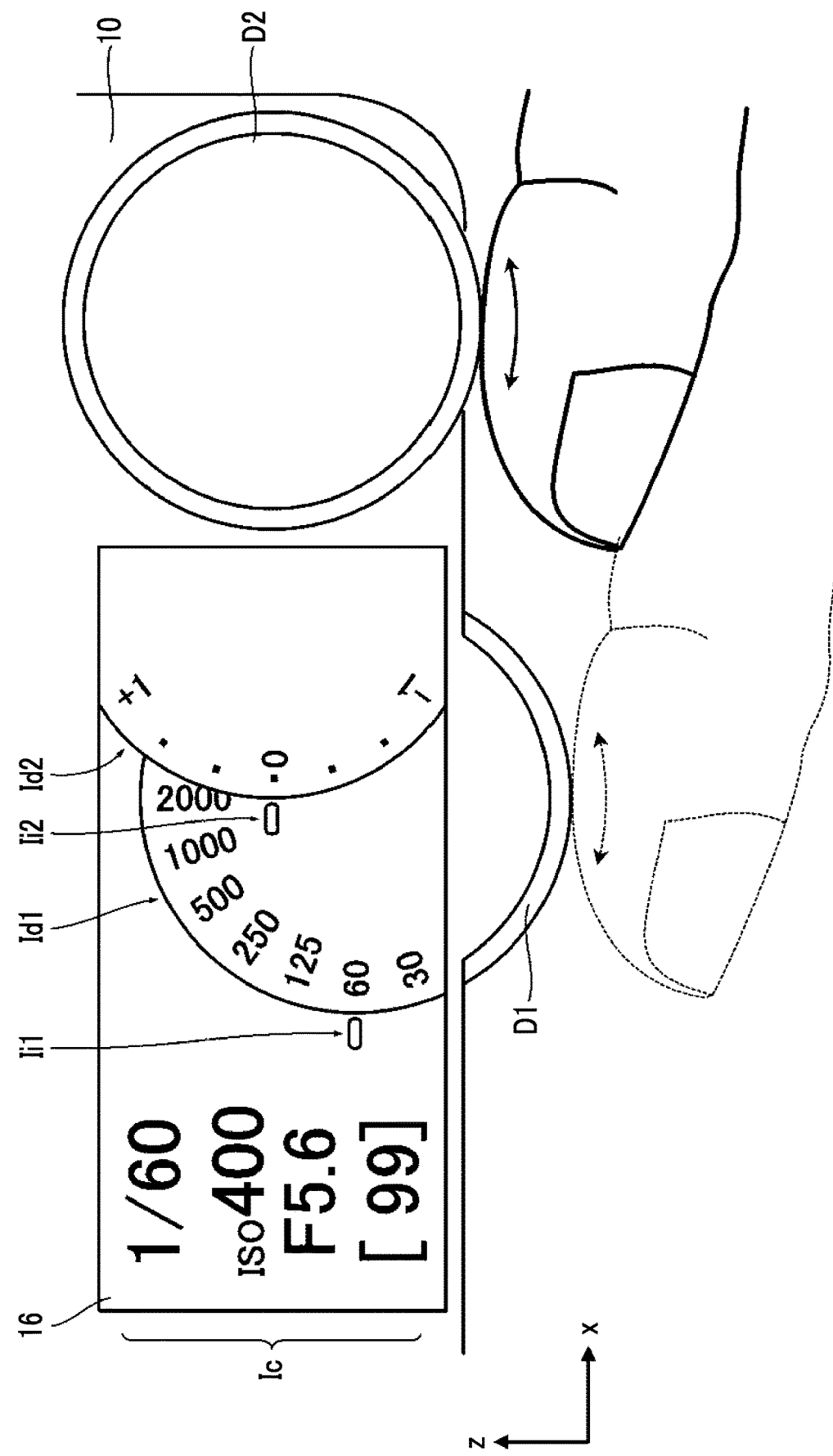
FIG. 17 is a plan view illustrating an example of a case where image pictures of a plurality of operation dials are displayed on the sub-display at one time.

(1) Display Example (1) in Case where Image Pictures of Plural Operation Dials are Displayed at One Time Display Example FIG. 17 is a plan view illustrating an example of a case where image pictures of a plurality of operation dials are displayed at one time on the sub-display.

As illustrated in FIG. 17, in a case where image pictures of a plurality of operation dials are displayed at one time on the sub-display 16, the image pictures are displayed to avoid interference with each other such that at least settings of each operation dial can be viewed.

In the digital camera 1 of the above-described embodiment, the current setting is displayed at the position of nine o'clock of the image picture of each operation dial, and thus the image pictures of the respective operation dials are displayed not to overlap each other at least at the position of nine o'clock.

In the example illustrated in FIG. 17, the image picture Id2 of the second operation dial D2 is disposed to overlap the image picture Id1 of the first operation dial D1. Consequently, in both of the image pictures, portions where settings are displayed can be displayed without being hidden.

The set contents Ic of the camera are displayed in the margin region. In this example, set contents Ic of the camera are displayed in the margin region by changing sizes and a layout thereof.

[Process Procedures for Displaying Image Pictures of Plural Operation Dials at One Time]

In a case where a plurality of operation dials are operated within a predetermined time, image pictures of the operated operation dials may be displayed in the display region of the sub-display 16. For example, in a case where the second operation dial D2 is operated within a predetermined time after the first operation dial D1 is operated, as illustrated in FIG. 17, the image picture Id1 of the first operation dial D1 and the image picture Id2 of the second operation dial D2 are configured to be displayed in the display region of the sub-display 16. Alternatively, in a case where the first operation dial D1 is operated within a predetermined time after the second operation dial D2 is operated, as illustrated in FIG. 17, the image picture Id1 of the first operation dial D1 and the image picture Id2 of the second operation dial D2 are configured to be displayed in the display region of the sub-display 16.

Figure 18:
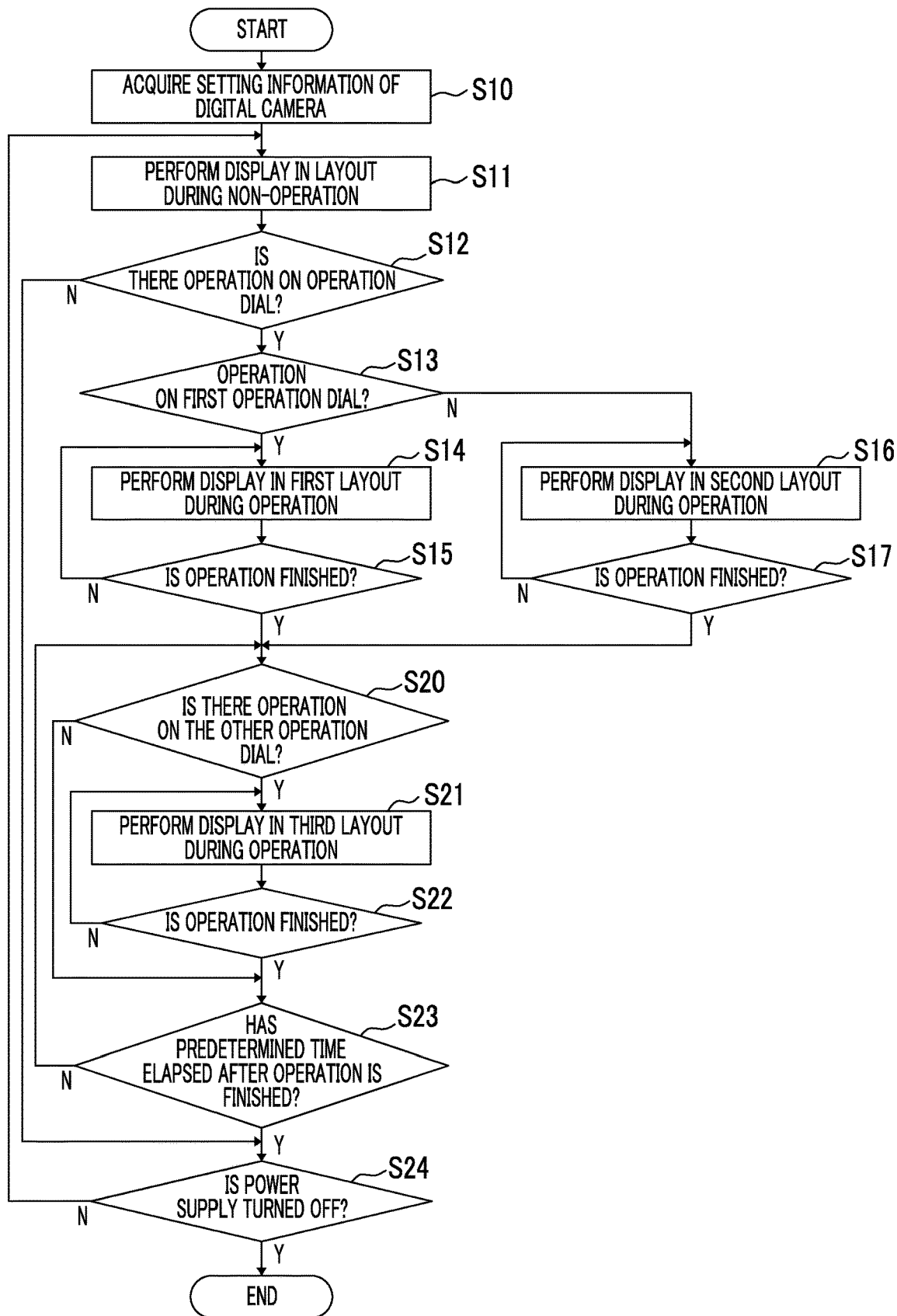
FIG. 18 is a flowchart illustrating process procedures in a case where image pictures of a plurality of operation dials are displayed at one time.

FIG. 18 is a flowchart illustrating procedures in a case where image pictures of operated operation dials are displayed when a plurality of operation dials are operated within a predetermined time.

Process procedures (steps S10 to S17) until an image picture of an operated operation dial is displayed in the display region are the same as the process procedures illustrated in FIG. 16, and, thus, herein, a description will be made of a process after the image picture of the operated operation dial is displayed in the display region.

In a case where the first operation dial D1 or the second operation dial D2 is operated, and an operation thereon is finished, it is determined whether or not the other operation dial is operated (step S20). For example, in a case where the first operation dial D1 is operated, and an operation thereon is finished, it is determined whether or not the second operation dial D2 is operated. In a case where the second operation dial D2 is operated, and an operation thereon is finished, it is determined whether or not the first operation dial D1 is operated.

In a case where the first operation dial D1 is not operated, it is determined whether or not a predetermined time has elapsed from operation finishing (step S23). In a case where it is determined that the predetermined time has elapsed from the operation finishing, it is determined whether or not the power supply is turned off (step S24). In a case where the power supply is turned off, the process is finished. On the other hand, in a case where it is determined that the power supply is not turned off, the flow returns to step S11, the set contents of the camera and an image picture of each operation dial on the sub-display 16 are displayed in a layout during a non-operation (step S11).

On the other hand, in a case where the other operation dial is operated with a predetermined time after the operation finishing, the sub-display display control unit 116 displays the set contents of the camera and an image picture of each operation dial on the sub-display 16 in a third layout during an operation (step S21).

Here, the third layout during an operation is a display layout of the sub-display 16 in a case where both of the image pictures Id1 and Id2 of the first operation dial D1 and the second operation dial D2 are displayed in the display region as illustrated in FIG. 17.

In the third layout during an operation, as illustrated in FIG. 17, the image picture Id1 of the first operation dial D1 and the image picture Id2 of the second operation dial D2 appear in the display region, and the set contents Ic of the camera are moved to the margin region so as to be displayed. In a case where the operation dial is continuously rotationally operated, the image picture of the operation dial is displayed to be rotated in conjunction with the operation.

Thereafter, the sub-display display control unit 116 determines whether or not an operation on the operation dial is finished (step S22). In a case where it is determined that the operation on the operation dial is finished, it is determined whether or not a predetermined time has elapsed from the operation finishing (step S23).

In a case where it is determined that the predetermined time has elapsed from the operation finishing, it is determined whether or not the power supply is turned off (step S24). In a case where the power supply is turned off, the process is finished. On the other hand, in a case where it is determined that the power supply is not turned off, the flow returns to step S11, the set contents of the camera and an image picture of each operation dial on the sub-display 16 are displayed in a layout during a non-operation (step S11).

As mentioned above, in a case where a plurality of operation dials are operated within a predetermined time, image pictures of all of the operated operation dials can be displayed in the display region of the sub-display 16.

(2) Display Example (2) in Case where Image Pictures of Plural Operation Dials are Displayed at One Time In the display example (1), the image pictures Id1 and Id2 of the two operation dials D1 and D2 are displayed on the sub-display 16 so as to avoid interference with each other. In this example, the image pictures are displayed to overlap each other in an operation order. In other words, whenever an operation dial is operated, an image picture of the operated operation dial is displayed to overlie. In this case, an image picture of an operation dial operated last is displayed at the uppermost position.

In a case where two operation dials D1 and D2 are provided on the camera body 10 as in the digital camera 1 of the above-described embodiment, an image picture of an operation dial operated last is displayed on the upper side.

Figure 19:
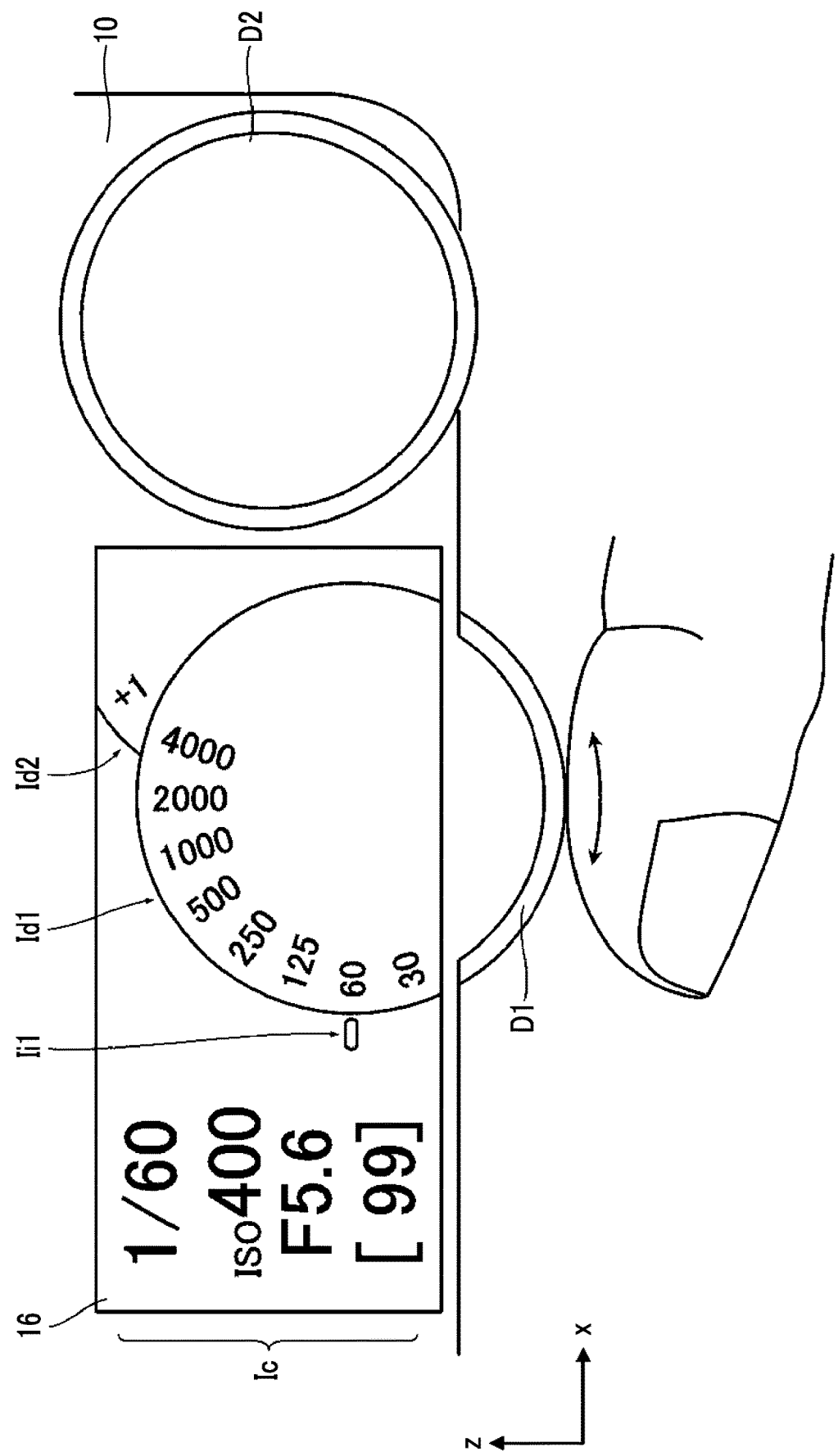
FIG. 19 is a plan view illustrating an example of display on the sub-display in a case where a plurality of operation dials are operated within a predetermined time.
Figure 20:
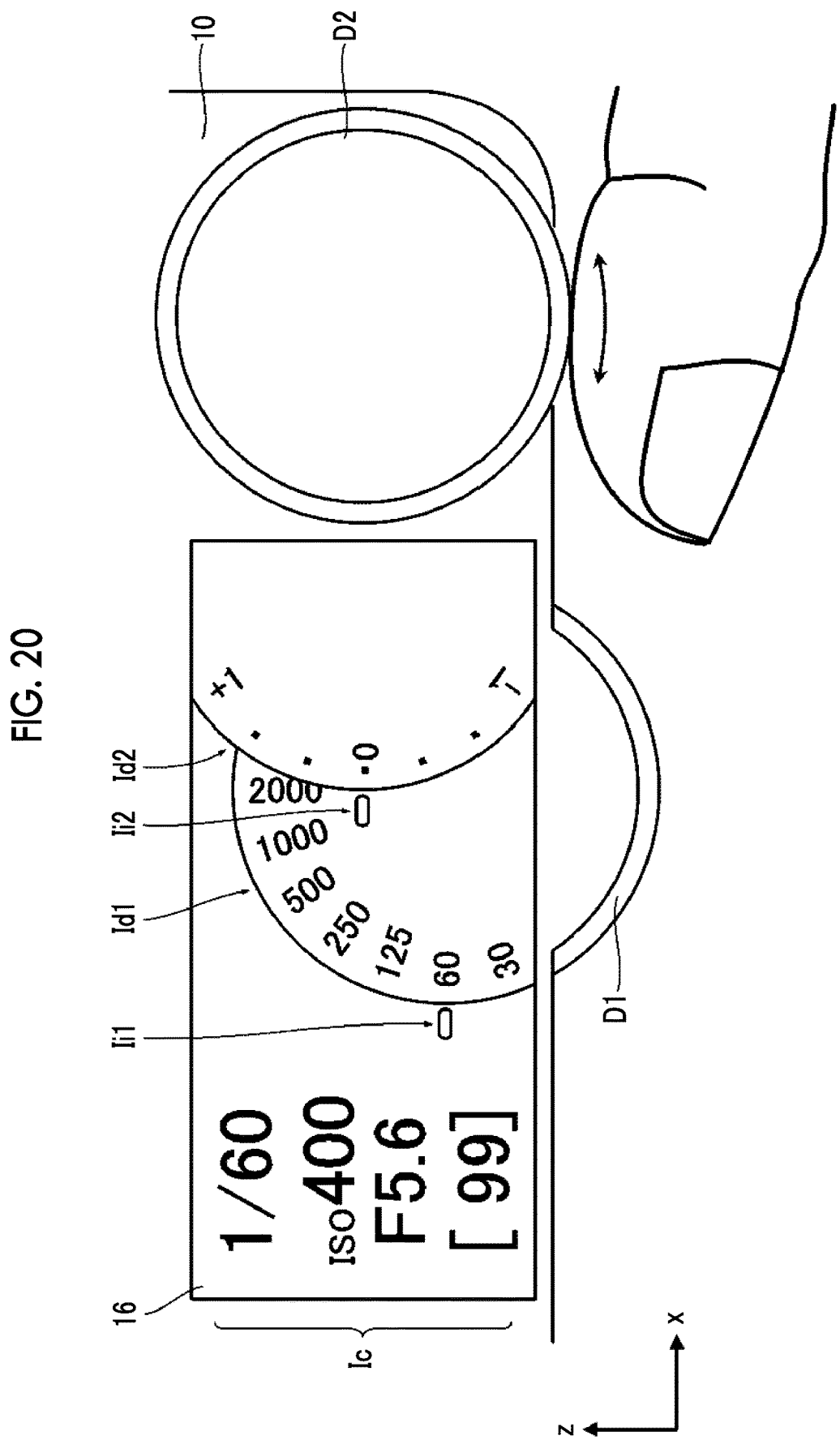
FIG. 20 is a plan view illustrating an example of display on the sub-display in a case where a plurality of operation dials are operated within a predetermined time.

FIGS. 19 and 20 are plan views illustrating an example of display on the sub-display in a case where a plurality of operation dials are operated within a predetermined time. FIG. 19 illustrates display on the sub-display 16 in a case where the first operation dial D1 is operated within a predetermined time after the second operation dial D2 is operated. FIG. 20 illustrates display on the sub-display 16 in a case where the second operation dial D2 is operated within a predetermined time after the first operation dial D1 is operated.

In a case where the first operation dial D1 is operated within a predetermined time after the second operation dial D2 is operated, as illustrated in FIG. 19, the image picture Id1 of the first operation dial D1 is displayed to overlap the image picture Id2 of the second operation dial D2.

In a case where the second operation dial D2 is operated within a predetermined time after the first operation dial D1 is operated, as illustrated in FIG. 20, the image picture Id2 of the second operation dial D2 is displayed to overlap the image picture Id1 of the first operation dial D1.

As mentioned above, an image picture of an operation dial operated last is displayed to overlie at the uppermost position at all times. Consequently, information which is supposed to be most necessary can be preferentially displayed.

<In Case where Image Pictures of Plural Operation Dials are Collectively Displayed>

A display instruction unit which gives an instruction for display of image pictures of all operation dials may be provided, and image pictures of all of the operation dials are displayed in the display region of the sub-display 16 in response to an instruction from the display instruction unit. The display instruction unit may be configured with, for example, a button provided on the camera body.

Figure 21:
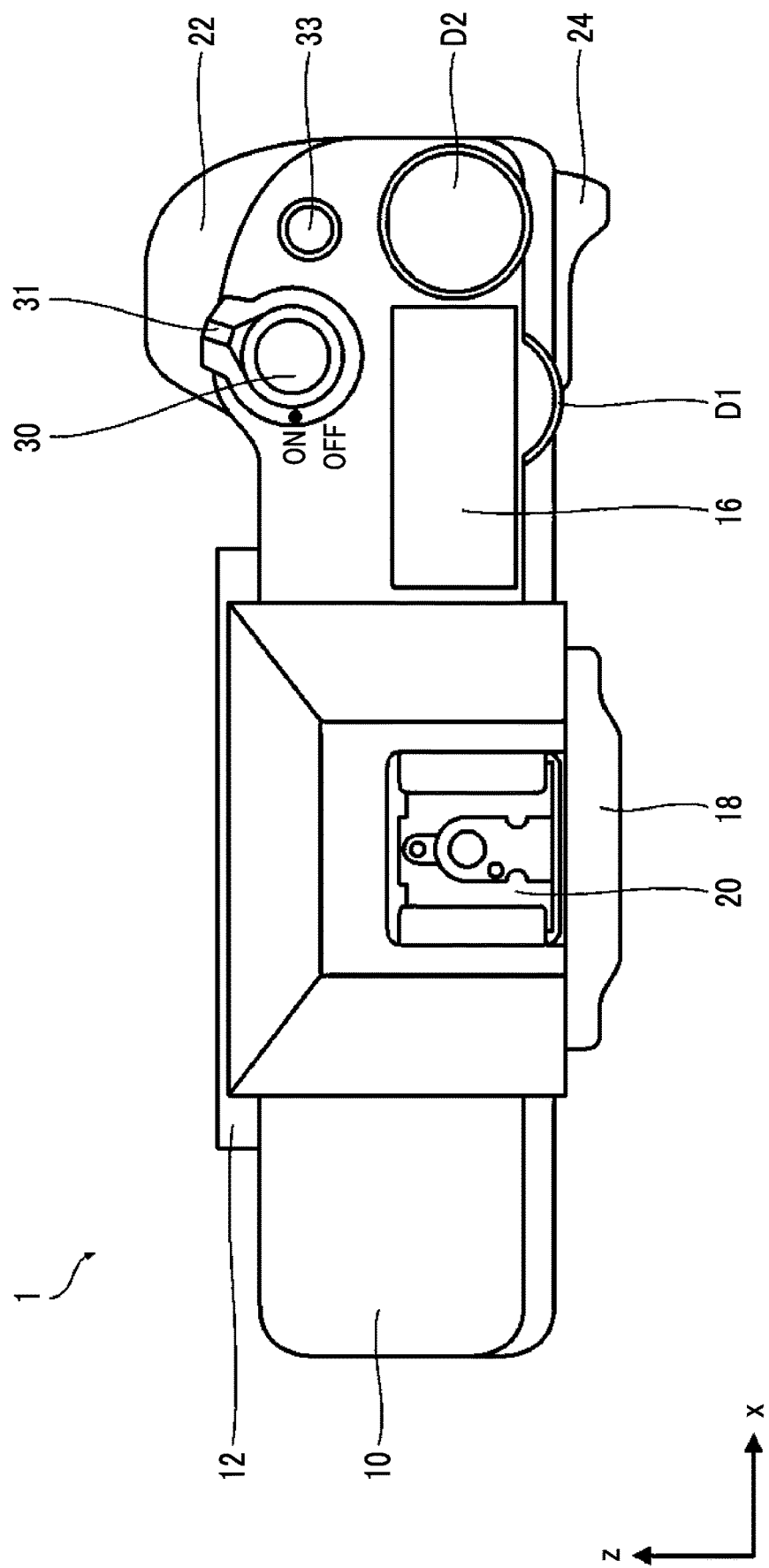
FIG. 21 is a plan view illustrating an exterior configuration of the digital camera comprising a confirmation button as a display instruction unit.

FIG. 21 is a plan view illustrating an exterior configuration of the digital camera comprising a confirmation button as the display instruction unit.

As illustrated in FIG. 21, a confirmation button 33 as the display instruction unit is provided on the top surface of the camera body 10. The confirmation button 33 functions as a button for giving an instruction for display of image pictures of all operation dials. The confirmation button 33 is disposed near the sub-display 16. In a case where the confirmation button 33 is pressed, information regarding the operation is output to the system controller 80.

In a case where the confirmation button 33 is pressed, as illustrated in FIG. 17, the sub-display display control unit 116 displays the set contents of the camera and an image picture of each operation dial on the sub-display 16 in the third layout during an operation.

In a case where the confirmation button 33 is pressed in a state in which display on the sub-display 16 is in the third layout during an operation, the sub-display display control unit 116 displays the set contents of the camera and an image picture of each operation dial on the sub-display 16 in a layout during a non-operation.

Modification Examples of Image Picture of Operation Dial

In the above-described embodiment, an image in which settable items are displayed at a predetermined interval on an identical circumference in a dial plate portion is used as an image picture of an operation dial, but an example of an image picture of an operation dial is not limited thereto.

Modification Example (1)

Figure 22:
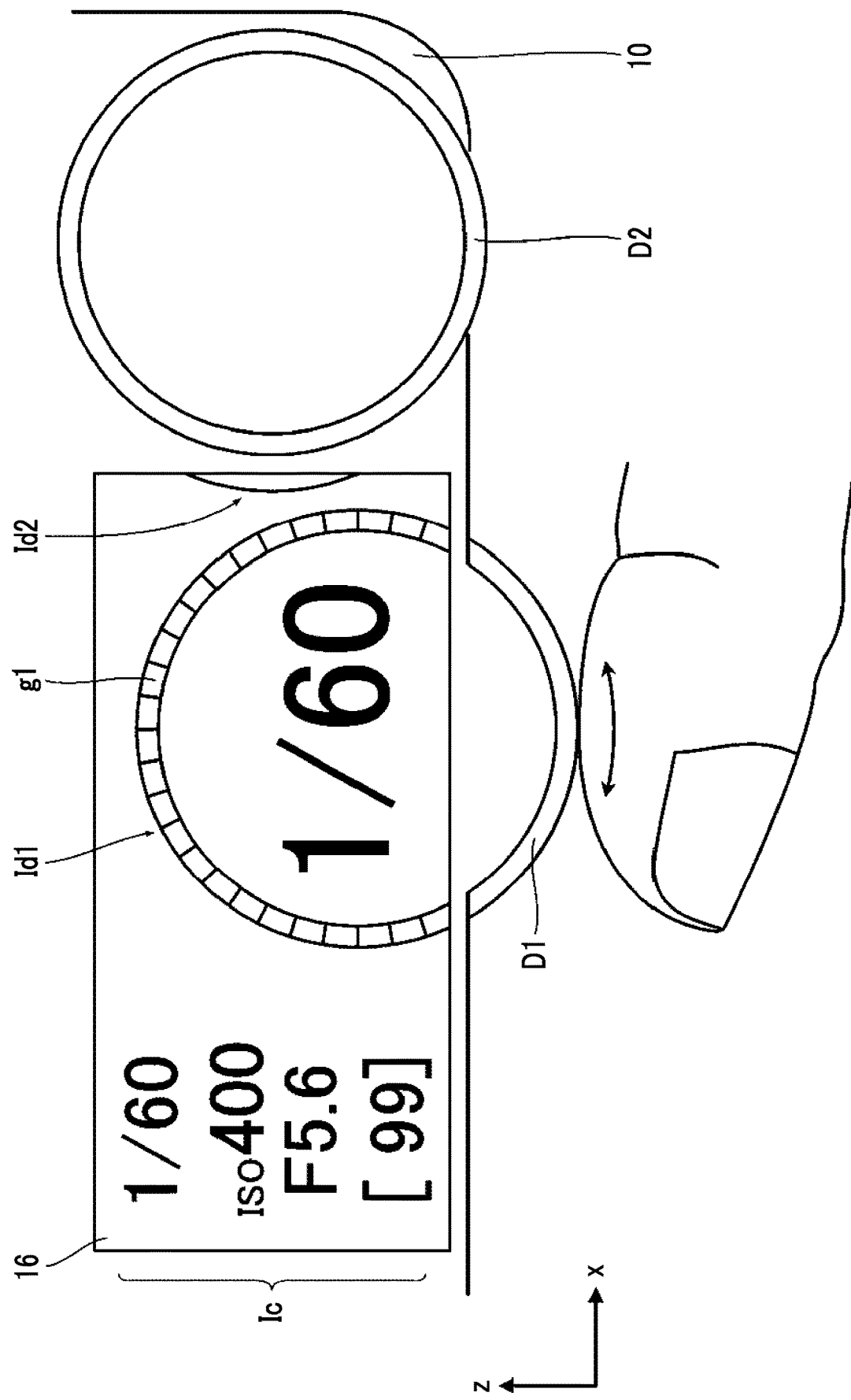
FIG. 22 is a plan view of the sub-display on which another example of an image picture of the operation dial is displayed.
Figure 23:
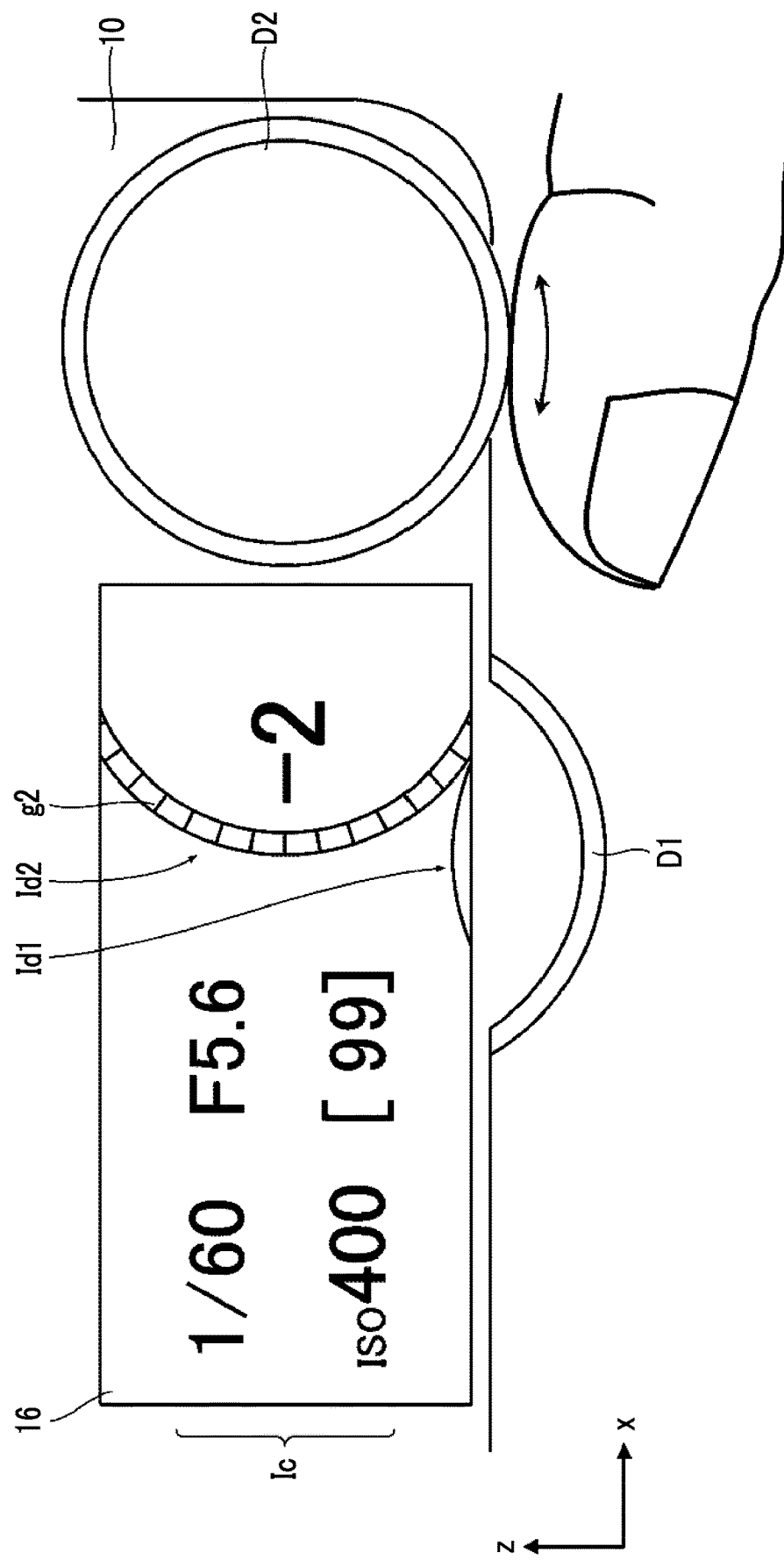
FIG. 23 is a plan view of the sub-display on which still another example of an image picture of the operation dial is displayed.

FIGS. 22 and 23 are plan views of the sub-display on which other examples of image pictures of operation dials are displayed.

The examples illustrated in FIGS. 22 and 23 correspond to an aspect in which the image pictures Id1 and Id2 of the operation dials are configured with circular graphics, and only the currently set items are displayed on dial plate portions inside the circles.

FIG. 22 illustrates an example of a case where the function of setting a shutter speed is allocated to the first operation dial D1, and illustrates an example of a case where the currently set shutter speed is 1/60 seconds. In this case, "1/60" which is the currently set shutter speed is displayed inside (dial plate portion) of the circle determining an outer shape.

FIG. 23 illustrates an example of a case where the function of setting an exposure correction value is allocated to the second operation dial D2, and illustrates an example of a case where the currently set exposure correction value is −2. In this case, "−2" which is the currently set exposure correction value is displayed inside (dial plate portion) of the circle determining an outer shape.

In an image picture with such a configuration, the current setting can be displayed to be large, and thus the setting can be easily viewed.

As in this example, in a case where only the currently set item is displayed in the dial plate portion, an image picture of an indicator is not displayed.

A set value displayed in the dial plate portion is not rotated. In other words, the set value displayed in the dial plate portion is not rotated even in a case where the operation dial is rotationally operated. In this case, a pattern is preferably added to an outer circumferential portion of an image picture of each operation dial such that rotation of the image picture becomes clear.

FIGS. 22 and 23 illustrate examples in which patterns g1 and g2 shaping grooves are added to outer circumferential portions of the image pictures Id1 and Id2 of the respective operation dials D1 and D2. The patterns are configured with lines displayed at predetermined pitches.

Since the pattern g1 or g2 is added to the outer circumferential portion of the image picture Id1 or Id2, in a case where the image picture Id1 or Id2 of the operation dial D1 or D2 is rotated, motion thereof can be clarified. In other words, in a case where image picture Id1 or Id2 is rotated, the pattern g1 or g2 of the outer circumferential portion is moved as animation, and thus rotation of the image picture can be clarified. Consequently, it is possible to provide a more favorable operability.

Figure 24:
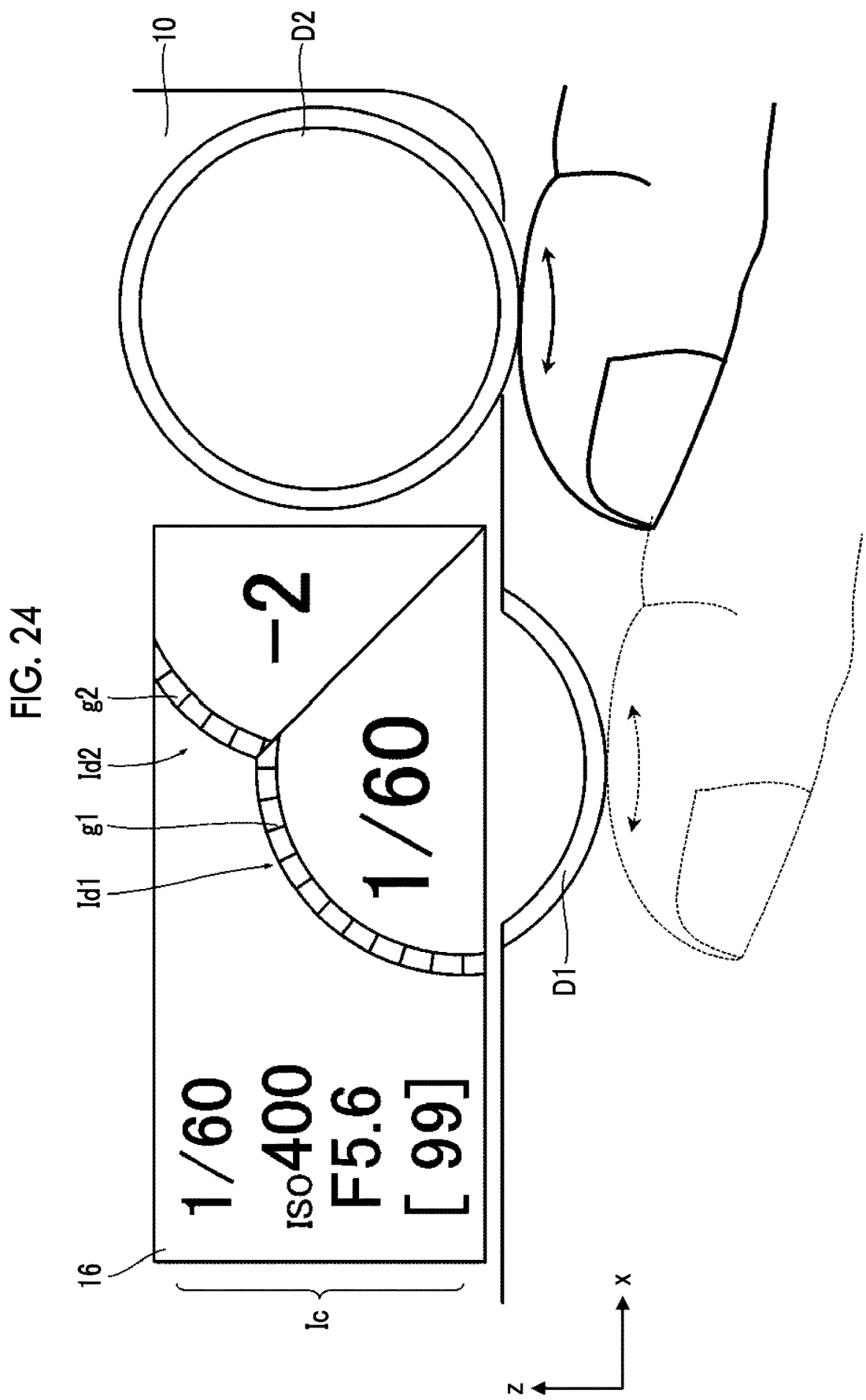
FIG. 24 is a diagram illustrating an example of a case where image pictures of all operation dials are displayed on the sub-display.

FIG. 24 is a diagram illustrating an example of a case where image pictures of all operation dials are displayed on the sub-display in a case where only the currently set items are displayed in the image pictures of the operation dials.

As illustrated in FIG. 24, in a case where image pictures of all operation dials are displayed on the sub-display when only the currently set items are displayed in the image pictures of the operation dials, the image picture of each operation dial are displayed to be recognizable.

In the example illustrated in FIG. 24, the display region is divided such that interference between mutually overlapping portions is prevented.

Modification Example (2)

Figure 25:
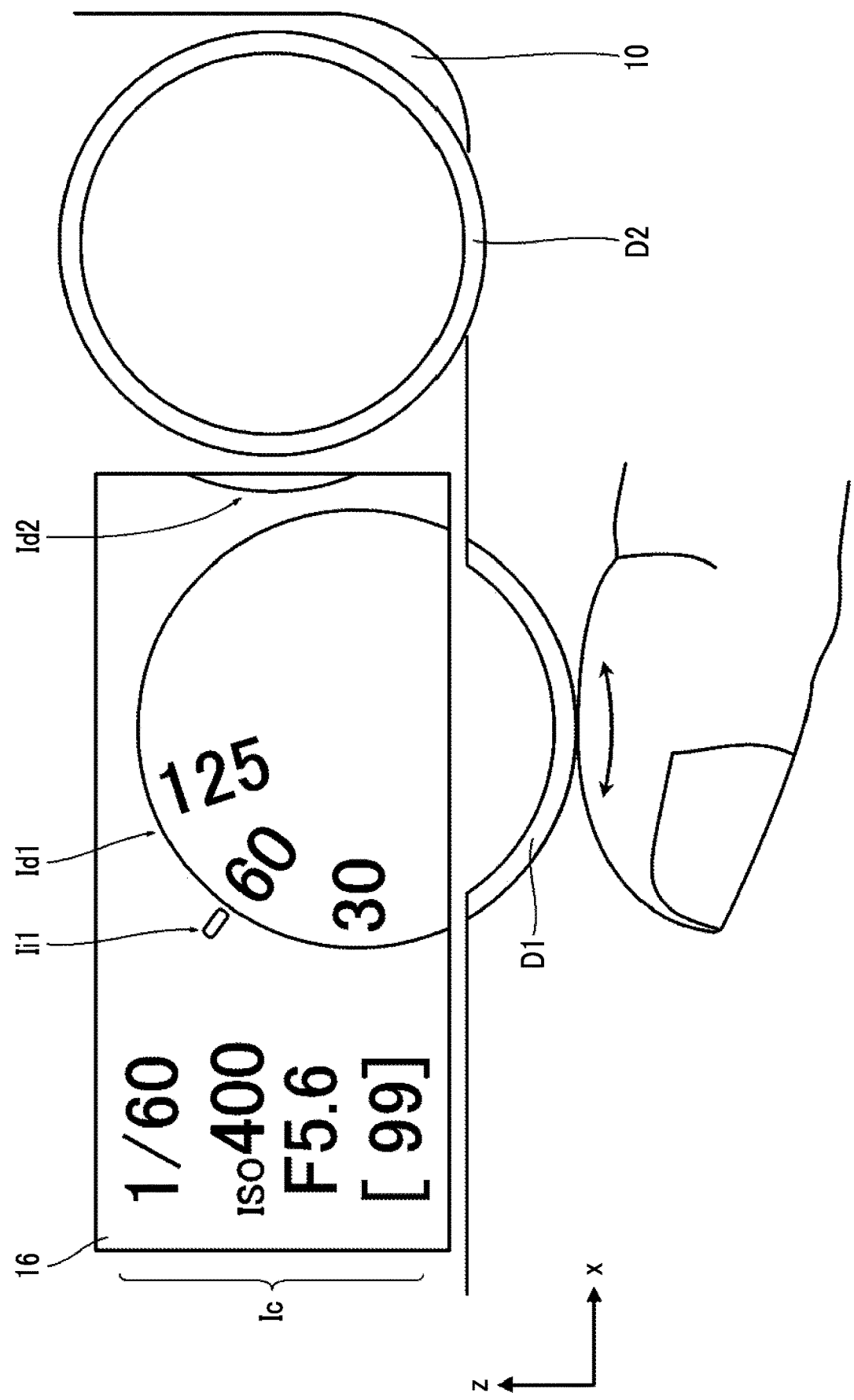
FIG. 25 is a plan view of the sub-display on which still another example of an image picture of the operation dial is displayed.

FIG. 25 is a plan view of the sub-display on which another example of an image picture of an operation dial is displayed.

The example illustrated in FIG. 25 corresponds to an aspect in which the image picture of the operation dial is configured with a circular graphic, and only the currently set item and items within a predetermined range before and after the set item are displayed on a dial plate portion inside the circle.

FIG. 25 illustrates an example of a case where the function of setting a shutter speed is allocated to the first operation dial D1, and illustrates an example of a case where the currently set shutter speed is 1/60 seconds. In this case, "60" (display of an inverse number of 1/60 seconds) which is the currently set shutter speed is displayed inside (dial plate portion) of the circle determining an outer shape, "30" (display of an inverse number of 1/30 seconds) which is a shutter speed set in a case where the first operation dial D1 is rotated clockwise by one click, and "125" (display of an inverse number of 1/125 seconds) which is a shutter speed set in a case where the first operation dial D1 is rotated counterclockwise by one click are displayed at a predetermined interval on an identical circumference.

As mentioned above, an image picture of an operation dial may be configured with a graphic in which the currently set item and items within a predetermined range before and after the set item are displayed in a dial plate portion. In an image picture with such a configuration, an item can be displayed to be large, and thus can be easily viewed. The next setting can be checked, and thus a favorable operability can be provided.

Modification Example of Aspect in which Image
Picture of Operation Dial is Advanced and
Retreated In the above-described embodiment, an image picture of an operation dial is advanced and retreated between the edge part and the display region of the sub-display 16 by changing a display position without changing a size of the image picture of the operation dial, but a method of advancing and retreating the image picture of the operation dial between the edge part and the display region of the sub-display 16 is not limited thereto.

Figure 26:
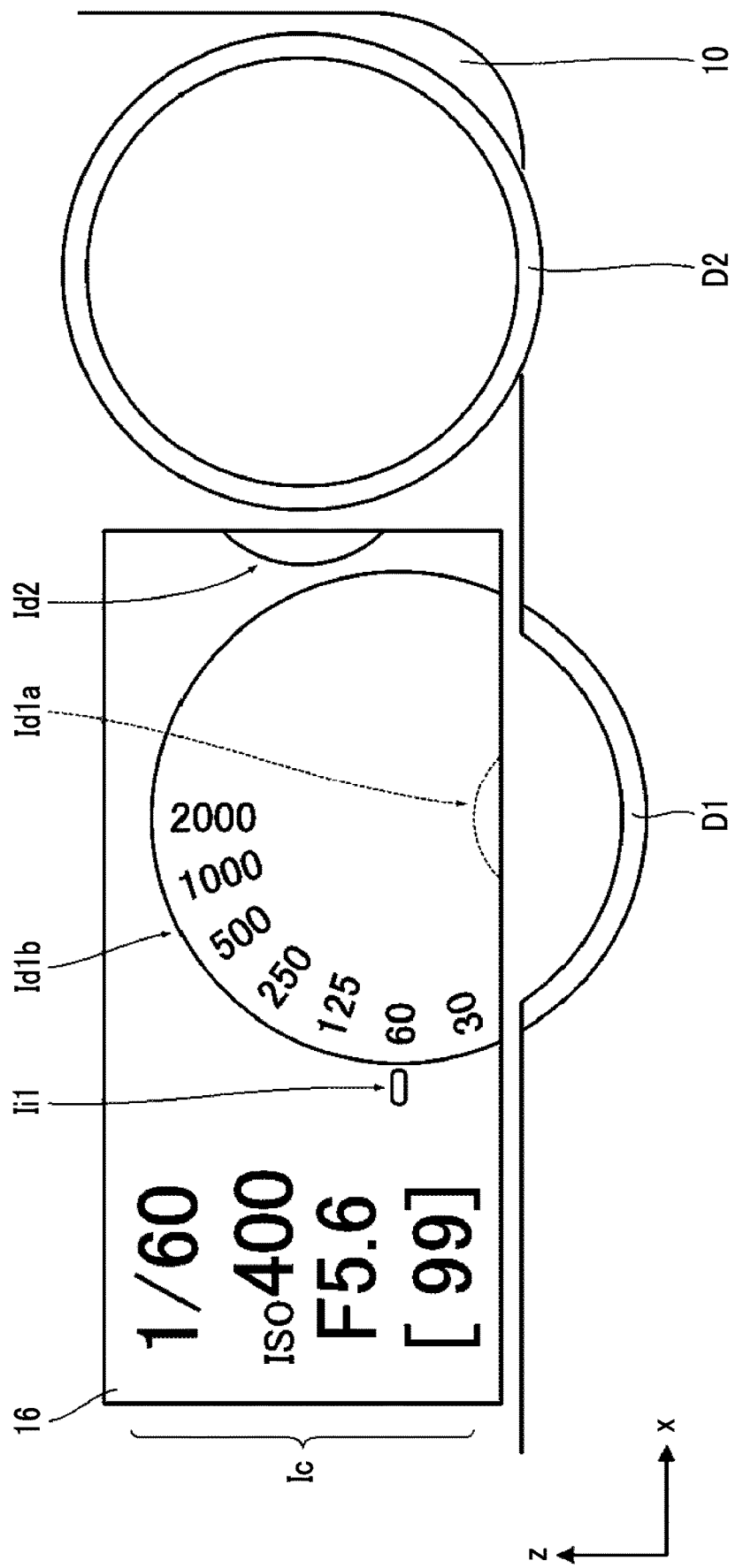
FIG. 26 is a diagram illustrating another example of an aspect in which an image picture of the operation dial is advanced and retreated between an edge part and a display region of the sub-display.

FIG. 26 is a diagram illustrating another example of an aspect in which an image picture of an operation dial is advanced and retreated between the edge part and the display region of the sub-display. Particularly, FIG. 26 illustrates an example of a case where the first operation dial D1 is rotationally operated.

In this example, the image picture of the operation dial is enlarged and reduced, and thus the image picture of the operation dial is advanced and retreated between the edge part and the display region of the sub-display.

In FIG. 26, an image picture Id1a indicated by a dashed line is an image picture of the first operation dial D1 in a case where the image picture is retreated, and an image picture Id1b indicated by a solid line is an image picture of the first operation dial D1 in a case where the image picture is displayed in the display region.

An image picture of an operation dial is displayed to be advanced and retreated between the edge part and the display region of the sub-display 16 by enlarging and reducing an outer diameter thereof.

Other Modification Examples

In the above-described embodiment, an image picture of an operation dial is configured with an image in which a disc-shaped operation dial is viewed from the top, but an image picture of an operation dial is not limited thereto. For example, an image picture of an operation dial may be configured with an image in which a disc-shaped operation dial is viewed in a stereoscopic manner.

Modification Example of Display Form of Set Content of Camera During Operation

In the above-described embodiment, there is a configuration in which, in a case where an operation dial is operated, and an image picture thereof appears in the display region of the sub-display 16, the set contents Ic of the camera are retreated to the margin region. A display form of the set contents Ic of the camera during an operation is not limited thereto.

Figure 27:
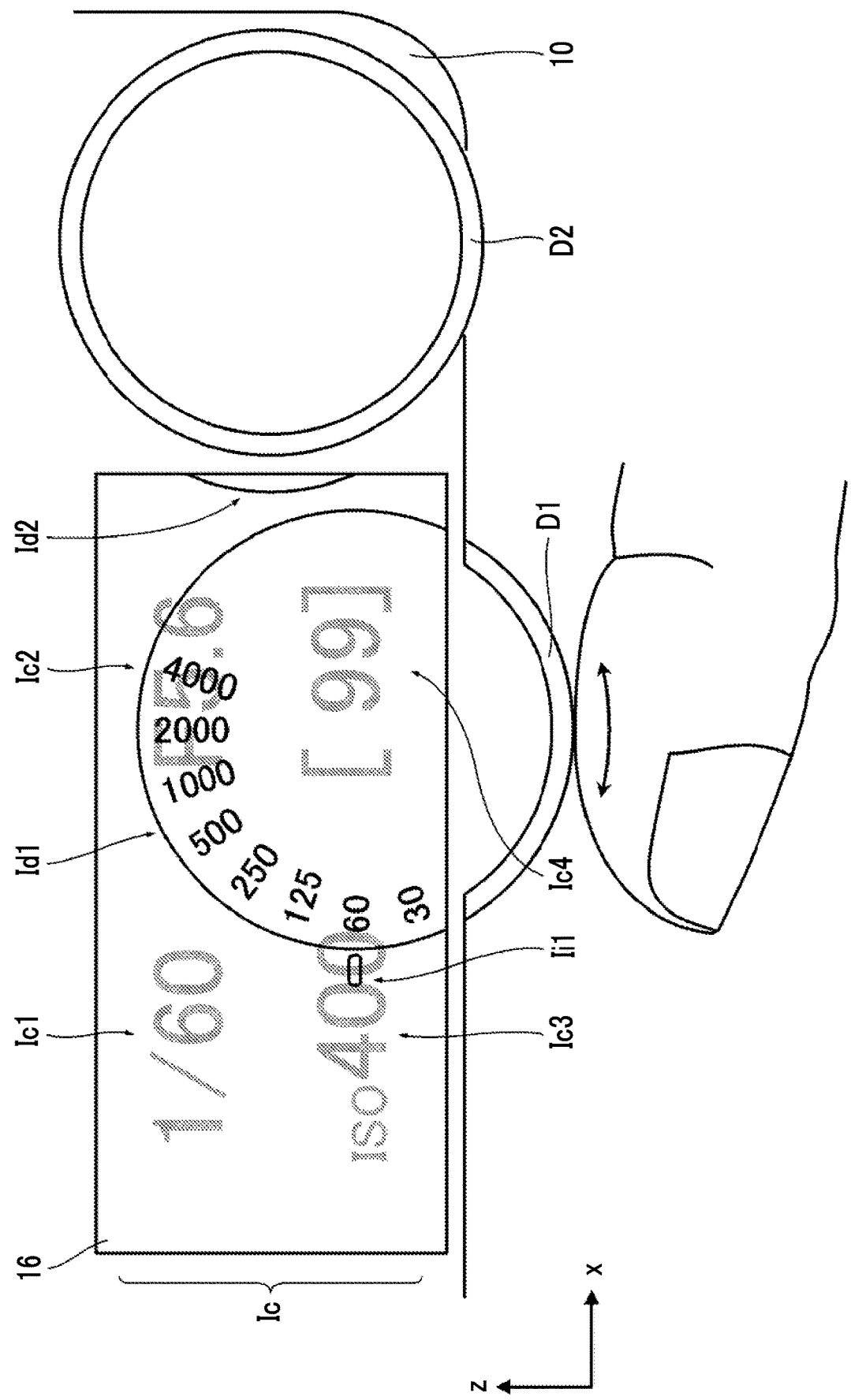
FIG. 27 is a diagram illustrating a modification example of a display form of a set content in the camera during an operation.

FIG. 27 is a diagram illustrating a modification example of a display form of the set contents of the camera during an operation. Particularly, FIG. 27 illustrates an example of a case where the first operation dial D1 is rotationally operated.

In the example illustrated in FIG. 27, during an operation, the set contents Ic of the camera is displayed to be translucent. In this case, the image picture Id1 of the first operation dial D1 appearing in the display region is displayed to overlap the set contents Ic of the camera.

<<Function Allocated to Operation Dial>>

In the above-described embodiment, a description has been made of an example of a case where the function of setting a shutter speed, the function of setting a sensitivity, or the like is allocated to an operation dial, but a function allocated to an operation dial is not limited thereto. A function allocated to an operation dial may be set as appropriate according to a function or the like provided in the camera. For example, in addition thereto, various functions such as a function of setting an imaging mode, a function of setting a volume, and a function of setting the brightness of the main display, may be allocated.

In the above-described embodiment, there is a configuration in which a user sets a function to be allocated to the operation dial, but there may be a configuration of automatically setting a function. A function to be allocated to each operation dial may be set according to a selected imaging mode.

<<Set Contents of Camera Displayed on Sub-Display>>

In the above-described embodiment, information regarding a shutter speed, an F number, a sensitivity, and the number of images which can be captured is displayed on the sub-display 16 as set contents of the camera, but the set contents of the camera displayed on the sub-display 16 are not limited thereto. The set contents of the camera may be set as appropriate by taking into consideration a display space or the like.

The set contents of the camera displayed on the sub-display 16 may be automatically switched to each other according to modes. The set contents of the camera may be freely set by a user.

Modification Example of Display Form

In the above-described embodiment, a part of an image picture of each operation dial is displayed from the edge part of the display unit during a non-operation, but may not be displayed. In other words, only the set contents of the camera may be displayed during a non-operation. In this case, in a case where an operation dial is operated, an image picture of the operated operation dial is displayed on the display unit. Consequently, it is possible to improve the visibility of the set contents of the camera during a non-operation.

Second Embodiment

[Configuration]

Figure 28:
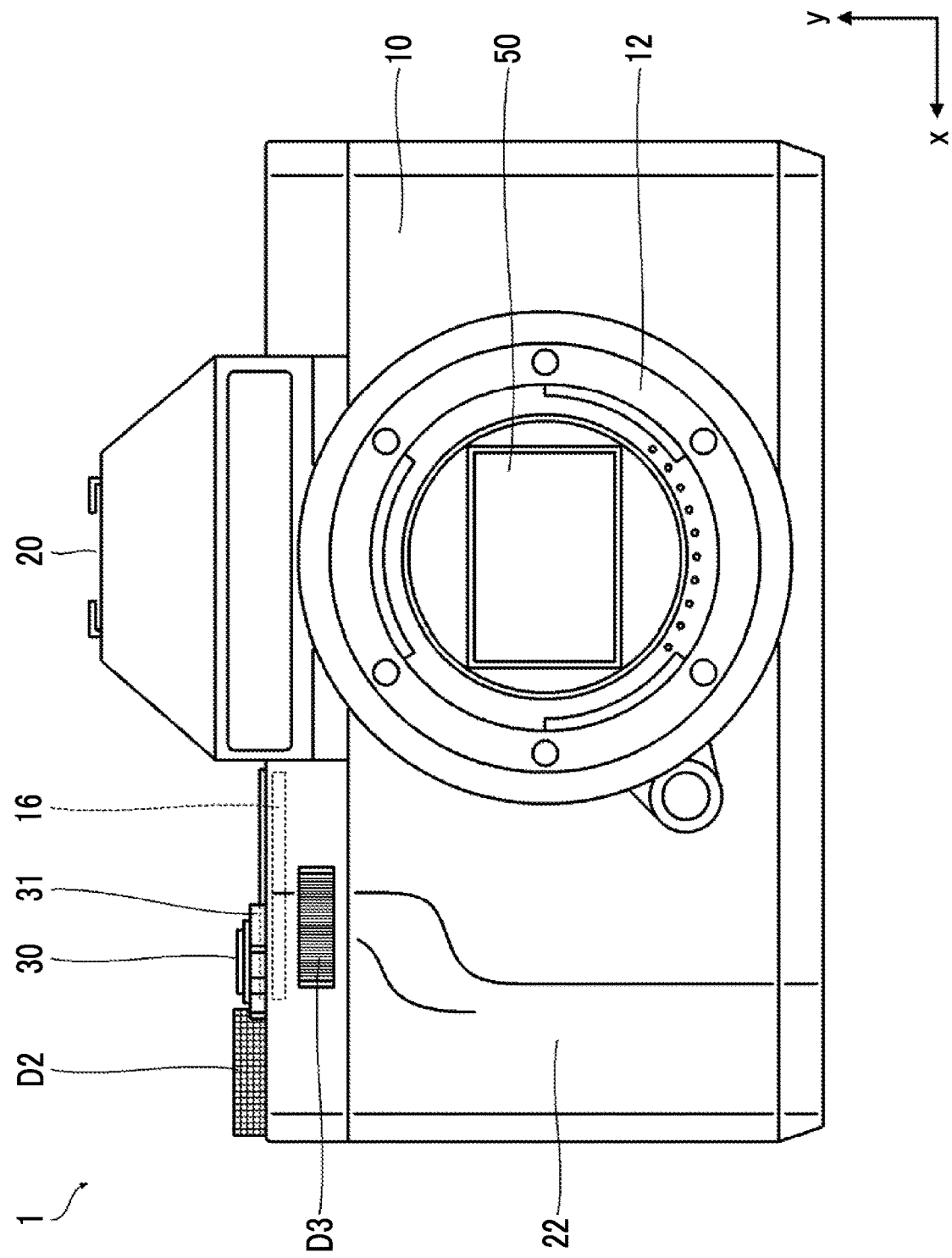
FIG. 28 is a front view of a digital camera according to a second embodiment.
Figure 29:
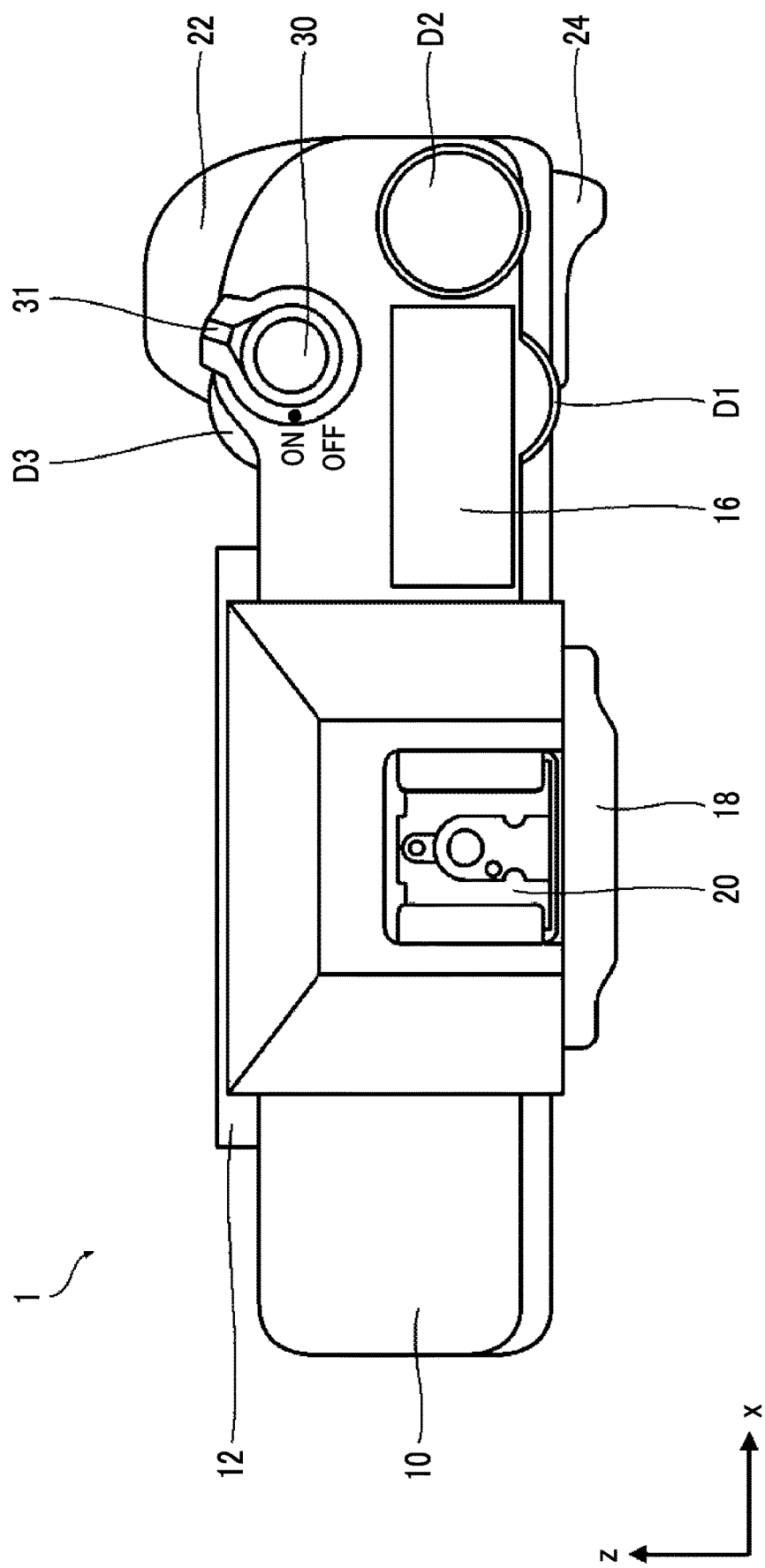
FIG. 29 is a plan view of the digital camera according to the second embodiment.

FIG. 28 is a front view of a digital camera according to a second embodiment. FIG. 29 is a plan view of the digital camera.

The digital camera 1 of the present embodiment comprises three operation dials. The digital camera 1 of the present embodiment is the same as the digital camera 1 of the first embodiment except that the three operation dials are provided. Therefore, herein, a description will be made of only a configuration of a third operation dial which is additionally provided. Hereinafter, the third operation dial which is additionally provided will be simply the third operation dial.

As illustrated in FIGS. 28 and 29, a third operation dial D3 is provided on the front surface side of the camera body 10. The third operation dial D3 is provided to be buried in the camera body 10, and a part thereof is disposed to be exposed from the front surface of the camera body 10. A position where the part of the third operation dial D3 is exposed is an upper part of the grip 22 as illustrated in FIG. 28. The third operation dial D3 is disposed to be operable with the index finger of the hand holding the grip 22.

A position where the third operation dial D3 is disposed is the front side of the sub-display 16 in a plan view as illustrated in FIG. 29.

The third operation dial D3 has a rotation axis orthogonal to the display surface of the sub-display 16, and is provided to be operable in a normal rotation direction and a reverse rotation direction centering on the rotation axis. The third operation dial D3 has a click mechanism, and is configured to undergo click stop at a predetermined angle interval.

[Display on Sub-Display]

A display form of the sub-display 16 in the digital camera 1 of the present embodiment is as follows.

<<Display Form During Non-Operation>>

Figure 30:
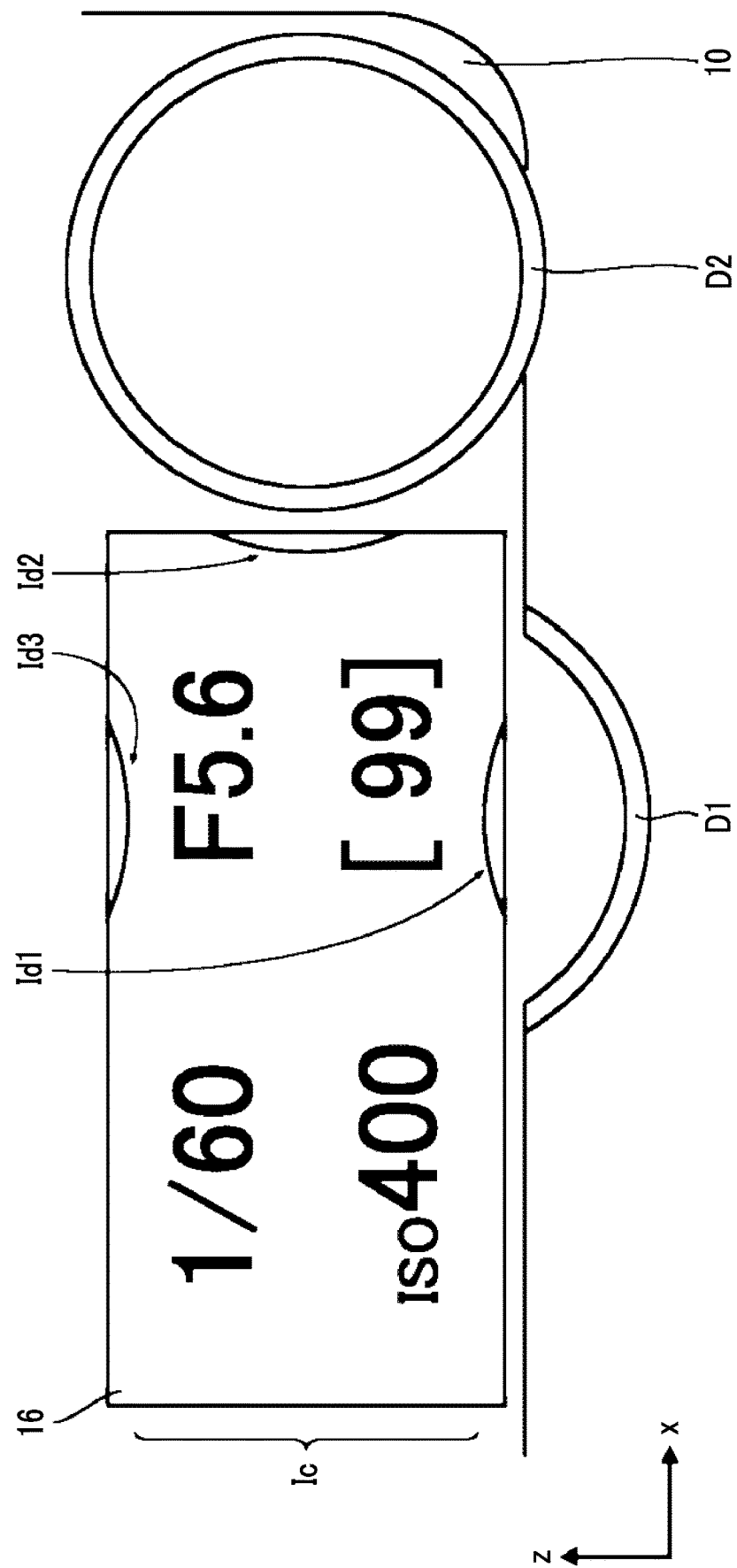
FIG. 30 is a plan view illustrating an example of display on a sub-display during a non-operation.

FIG. 30 is a plan view illustrating an example of display on the sub-display during a non-operation.

As illustrated in FIG. 30, in a case where the first operation dial D1, the second operation dial D2, and the third operation dial D3 are not operated, the set contents Ic of the camera are displayed to be large on the sub-display 16.

As illustrated in FIG. 30, in a case where the first operation dial D1, the second operation dial D2, and the third operation dial D3 are not operated, parts of the image picture Id1 of the first operation dial D1, the image picture Id2 of the second operation dial D2, and an image picture Id3 of the third operation dial D3 are displayed from the edge part of the sub-display 16.

Here, a position where the image picture Id3 of the third operation dial D3 is displayed is the edge part of the sub-display 16 on the front side. The position corresponds to a position where the third operation dial D3 is disposed when viewed from the sub-display 16.

<<Display Form During Operation>>

Figure 31:
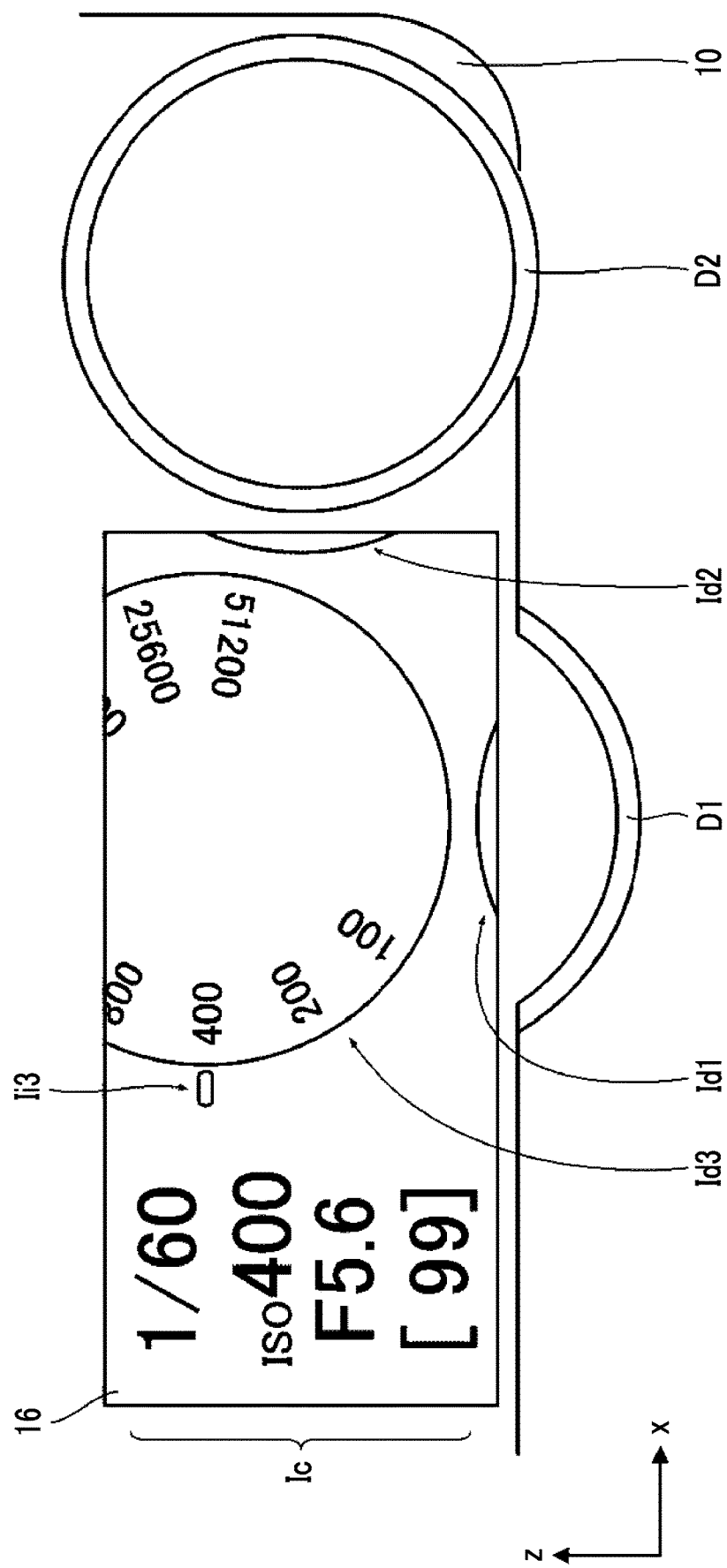
FIG. 31 is a plan view illustrating an example of display on the sub-display in a case where a third operation dial is rotationally operated.

FIG. 31 is a plan view illustrating an example of display on the sub-display in a case where the third operation dial D3 is rotationally operated.

As illustrated in FIG. 31, in a case where the third operation dial D3 is rotationally operated, the hidden image picture Id3 of the third operation dial D3 appears from the edge part, and is displayed along with an image picture Ii3 of an indicator such that an image of a dial plate portion can be visually recognized. The set contents Ic of the camera are displayed to be deviated to the margin region in conjunction with appearing of the image picture Id3 of the third operation dial D3.

FIG. 31 illustrates a display example in a case where the function of setting a sensitivity is allocated to the third operation dial D3. Particularly, FIG. 31 illustrates an example of a case where a sensitivity is set to ISO400. In this case, an image of a dial plate portion in the image picture Id3 is configured with an image in which "400" is located at a position indicated by the image picture Ii3 of the indicator.

The image picture Id3 of the third operation dial D3 is advanced from and retreated in a direction in which the third operation dial D3 is disposed with respect to the sub-display 16. In this example, the image picture is moved along the optical axis in the front-and-rear direction, and thus appears in or disappears from the display region of the sub-display 16.

[Modification Example of Display on Sub-Display]
<in Case where Image Pictures of Plural Operation Dials are Displayed at One Time>

Figure 32:
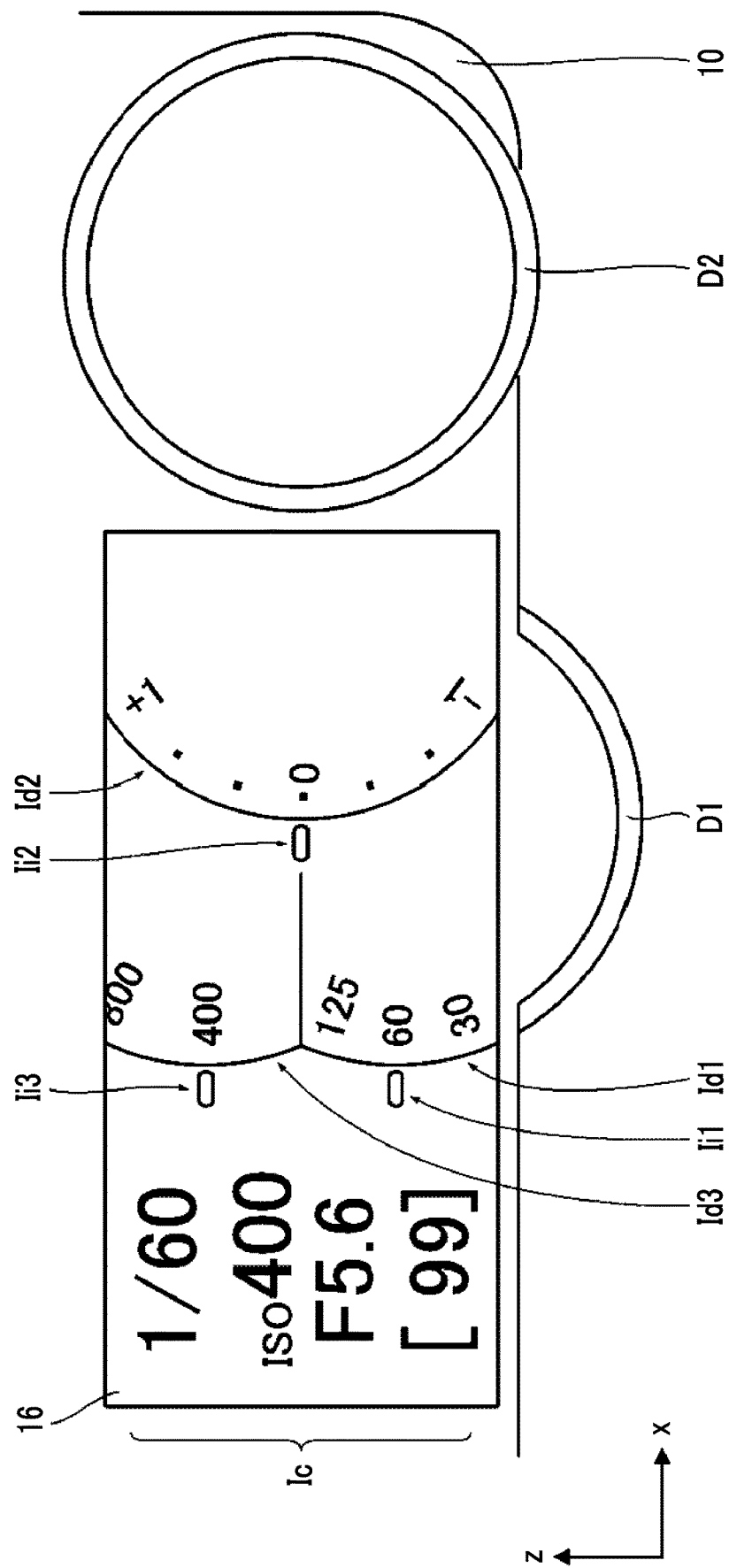
FIG. 32 is a plan view illustrating an example of a case where image pictures of a plurality of operation dials are displayed on the sub-display at one time.

FIG. 32 is a plan view illustrating an example of a case where image pictures of all operation dials are displayed at one time on the sub-display.

As described above, in a case where a plurality of operation dials are operated within a predetermined time, and an instruction for collective display is given, image pictures of a plurality of operation dials are displayed at one time.

In a case where image pictures of a plurality of operation dials are displayed at one time, the image pictures of the respective operation dials are displayed to avoid interference with each other such that at least settings can be viewed.

In the example illustrated in FIG. 32, with respect to a portion where the image picture Id1 of the first operation dial D1 overlaps the image picture Id3 of the third operation dial D3, the display region is divided into two parts, and thus interference is avoided.

Figure 33:
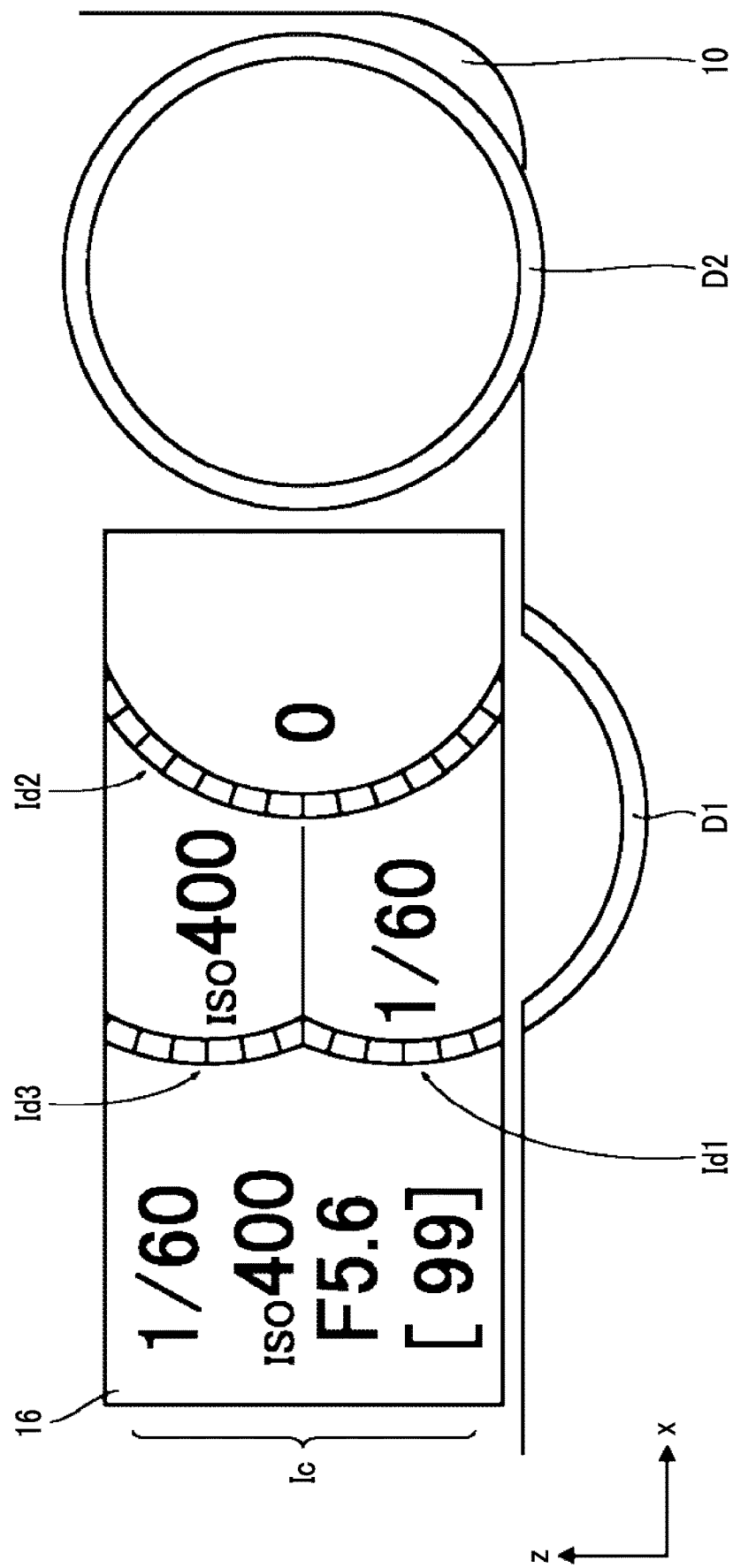
FIG. 33 is a plan view illustrating another example of a case where image pictures of a plurality of operation dials are displayed on the sub-display at one time.

FIG. 33 is a plan view illustrating another example of a case where image pictures of all operation dials are displayed at one time on the sub-display.

FIG. 33 illustrates an example of a case where only the currently set item is displayed in the dial plate portion of the image picture of each operation dial.

In a case where a plurality of operation dials are operated within a predetermined time, an image picture of the operated operation dial is displayed. Alternatively, in a case where a confirmation button is provided, the image picture is displayed in a case where the confirmation button is pressed.

Figure 34:
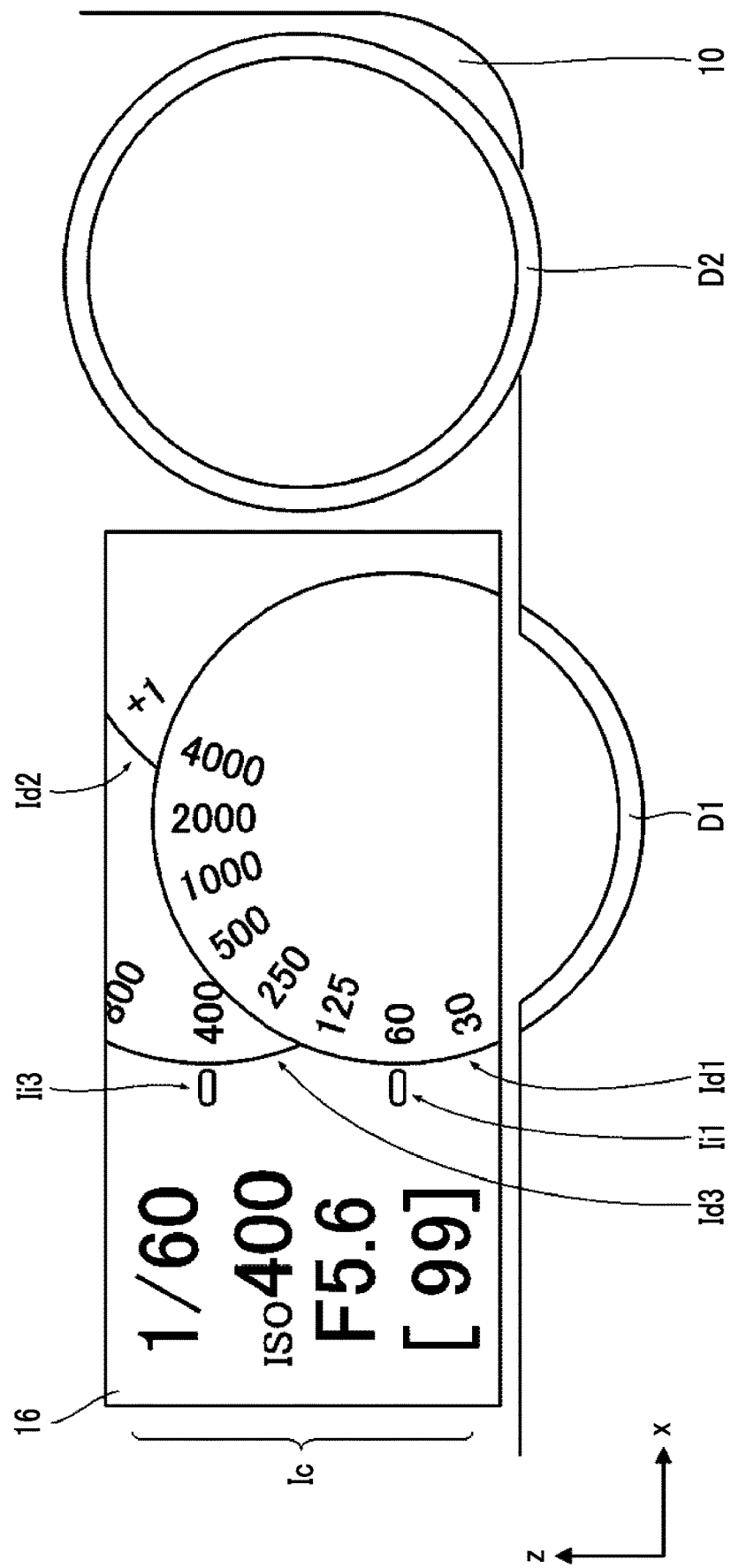
FIG. 34 is a plan view illustrating an example of display on the sub-display in a case where a plurality of operation dials are operated within a predetermined time.

FIG. 34 is a plan view illustrating another example of display on the sub-display in a case where a plurality of operation dials are operated within a predetermined time.

As illustrated in FIG. 34, the image pictures of the operation dials may be displayed to overlap each other. In this case, the image pictures are displayed to overlap each other in an operation order. In other words, the image pictures of the operated operation dials are displayed to sequentially overlap each other. In this case, an image picture of an operation dial operated last is displayed at the uppermost position.

FIG. 34 illustrates an example of a case where the third operation dial D3, the second operation dial D2, and the first operation dial D1 are operated in this order within a predetermined time. In this case, the image picture Id2 of the second operation dial D2 is displayed to overlap the image picture Id3 of the third operation dial D3, and the image picture Id1 of the first operation dial D1 is displayed to overlap the image picture Id2 of the second operation dial D2.

As mentioned above, an image picture of an operation dial operated last is displayed to overlie at the uppermost position at all times, and thus information which is supposed to be most necessary can be preferentially displayed.

<<Number and Layout of Operation Dials>>

In the present embodiment, a description has been made of an example of a case where three operation dials are provided, but the number of operation dials is not limited thereto.

In the above example, a single operation dial is disposed on a single side of the sub-display 16, but two or more operation dials may be disposed on a single side.

Third Embodiment

A digital camera of the present embodiment is different from the digital camera of the first embodiment in terms of a display form of the display unit during a non-operation.

In the digital camera of the present embodiment, a reduced image of each operation dial is displayed on the display unit during a non-operation. In a case where an operation dial is operated, an image picture of the operated operation dial is displayed to be enlarged on the display unit.

A configuration of the camera is same as that of the digital camera 1 of the first embodiment. Therefore, herein, a description will be made of only a display form of the sub-display 16, based on operations on the first operation dial D1 and the second operation dial D2.

[Display on Sub-Display During Non-Operation]

Figure 35:
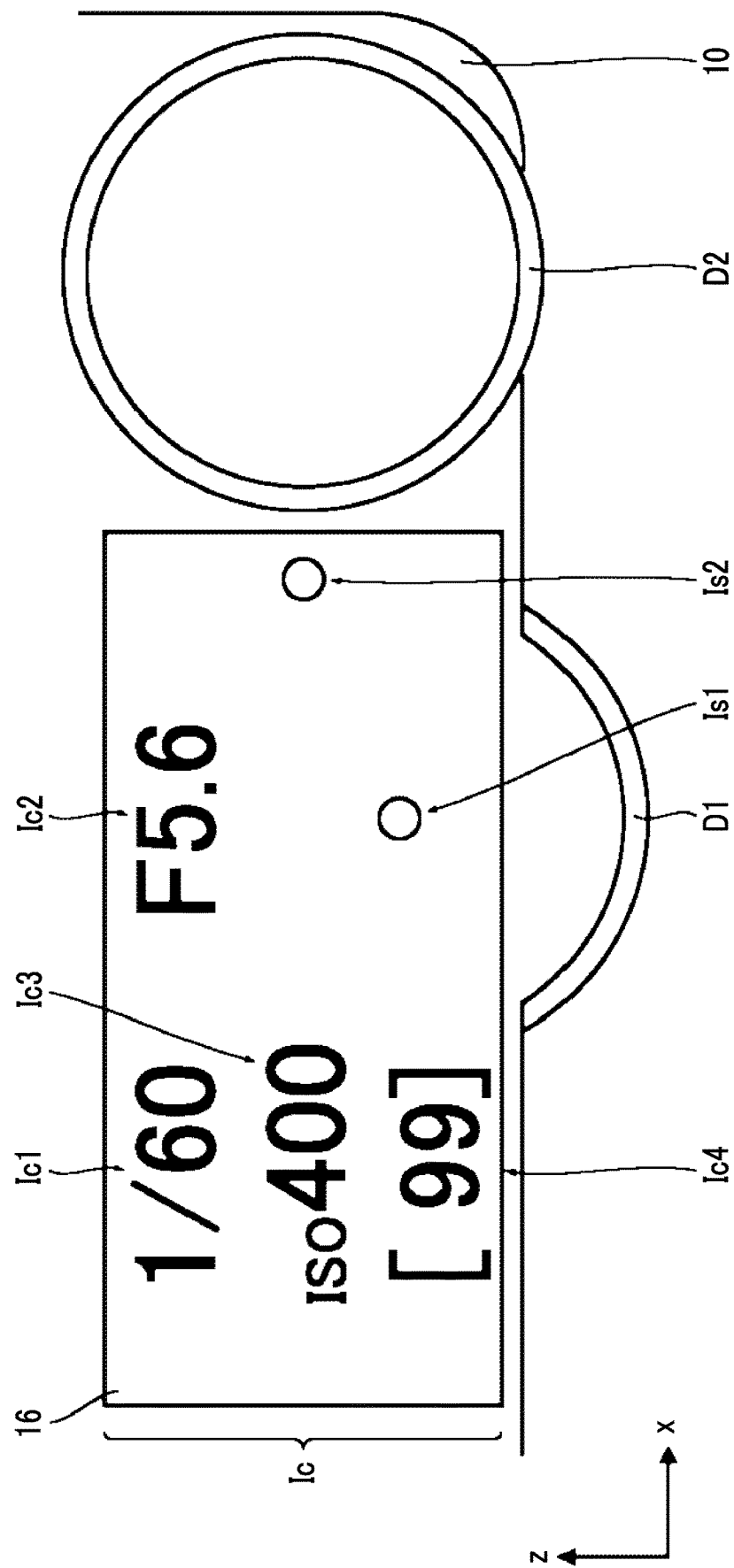
FIG. 35 is a plan view illustrating an example of display on a sub-display during a non-operation of the digital camera.

FIG. 35 is a plan view illustrating an example of display on the sub-display during a non-operation of the digital camera of the present embodiment.

As illustrated in FIG. 35, in a case where the first operation dial D1 and the second operation dial D2 are not operated, the set contents Ic of the camera are displayed to be large on the sub-display 16.

As illustrated in FIG. 35, in a case where the first operation dial D1 and the second operation dial D2 are not operated, a reduced image Is1 of the first operation dial D1 and a reduced image Is2 of the second operation dial D2 are displayed on the sub-display 16. Hereinafter, the reduced images will be referred to as reduced images Is1 and Is2.

The reduced image Is1 of the first operation dial D1 is configured with a graphic having a circular outer shape. The reduced image Is1 of the first operation dial D1 is displayed near the first operation dial D1. In the digital camera of the present embodiment, the reduced image Is1 of the first operation dial D1 is displayed on the same axis as the rotation axis ax1 of the first operation dial D1.

The reduced image Is2 of the second operation dial D2 is configured with a graphic having a circular outer shape. The reduced image Is2 of the second operation dial D2 is displayed near the second operation dial D2.

As mentioned above, during a non-operation, the set contents Ic of the camera and the reduced images Is1 and Is2 of the respective operation dials are displayed on the sub-display 16. The reduced images Is1 and Is2 are displayed near the corresponding operation dials. A reduced image displayed nearest an actual operation dial is a corresponding reduced image. The reduced image displayed nearest an actual operation dial is a reduced image displayed nearest a rotation axis of the actual operation dial.

[Display on Sub-Display During Operation]

(1) In Case where First Operation Dial D1 is Operated

Figure 36:
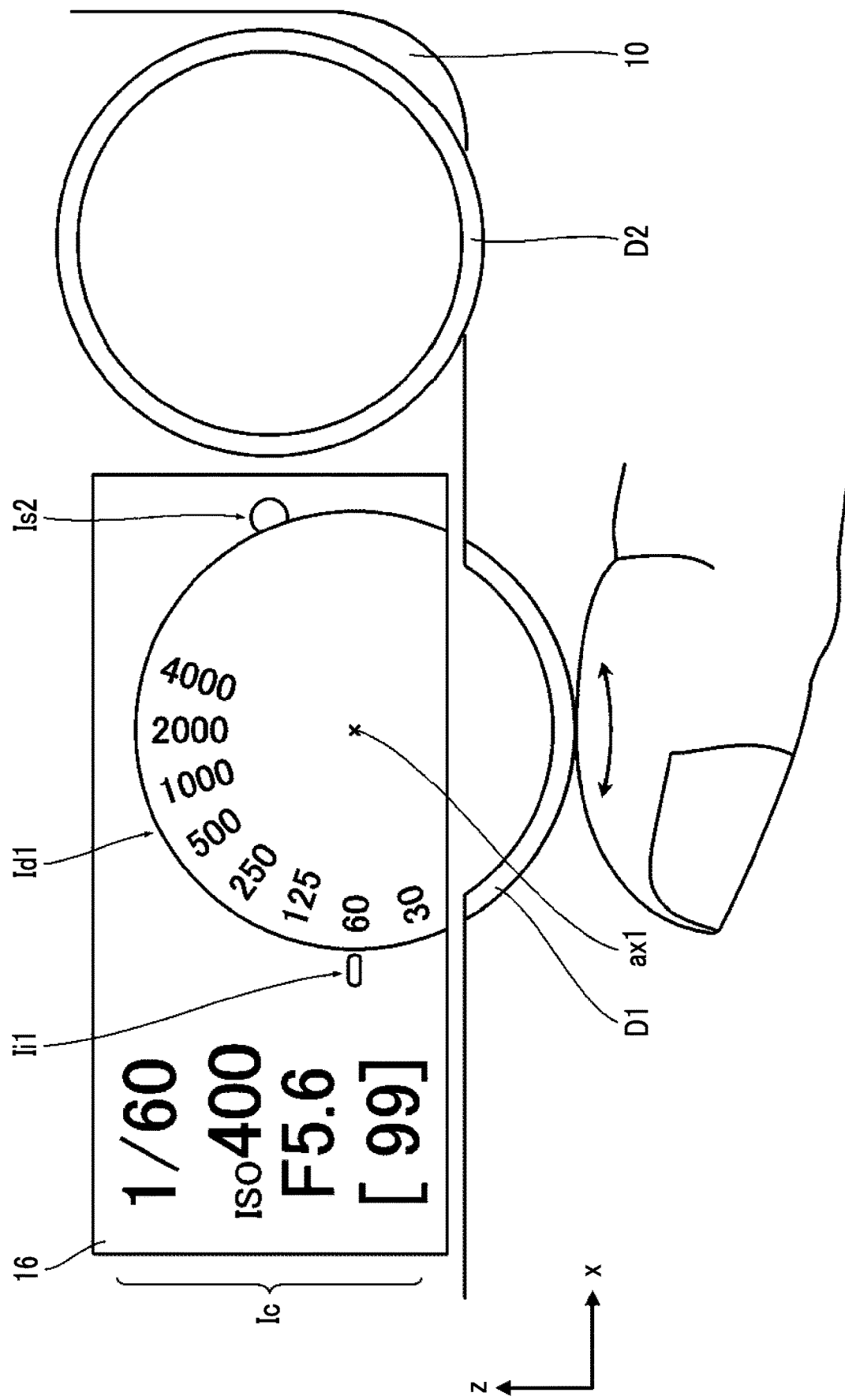
FIG. 36 is a plan view illustrating an example of display on the sub-display in a case where a first operation dial is rotationally operated.

FIG. 36 is a plan view illustrating an example of display on the sub-display in a case where the first operation dial is rotationally operated.

As illustrated in FIG. 36, in a case where the first operation dial D1 is rotationally operated, the image picture Id1 of the first operation dial D1 is displayed on the sub-display 16. The image picture Id1 is displayed as a result of enlarging the reduced image. In this case, the reduced image is enlarged centering on an axis thereof. When the image picture is enlarged, the image picture is continuously enlarged as animation, and is enlarged while being rotated in conjunction with the operation. Consequently, an operation and display can be clearly correlated with each other.

The image picture Id1 of the first operation dial D1 is configured to have the same outer diameter as that of the actual first operation dial D1. As a result, in a case where the image picture Id1 is displayed on the sub-display 16, the hidden portion of the actual first operation dial D1 is complemented by the display on the sub-display 16. In this case, the image picture Id1 of the first operation dial D1 displayed on the sub-display 16 is an image having a circular arc outer shape to which a part of the first operation dial D1 exposed from the camera body 10 extends.

The set contents Ic of the camera are displayed to be deviated to the margin region in conjunction with the display of the image picture Id1 of the first operation dial D1.

In a case where the set contents Ic of the camera are displayed in the margin region, sizes and a layout thereof are changed as necessary. In the example illustrated in FIG. 36, both of the sizes and the layout are changed, and the set contents Ic of the camera are displayed in the margin region.

As mentioned above, in a case where the first operation dial D1 is operated, the reduced image Is1 of the first operation dial D1 is enlarged, and thus the image picture Id1 of the first operation dial D1 is displayed on the sub-display 16. Consequently, it is possible to easily perform setting using the first operation dial D1.

(1) In a Case where Second Operation Dial D2 is Operated

Figure 37:
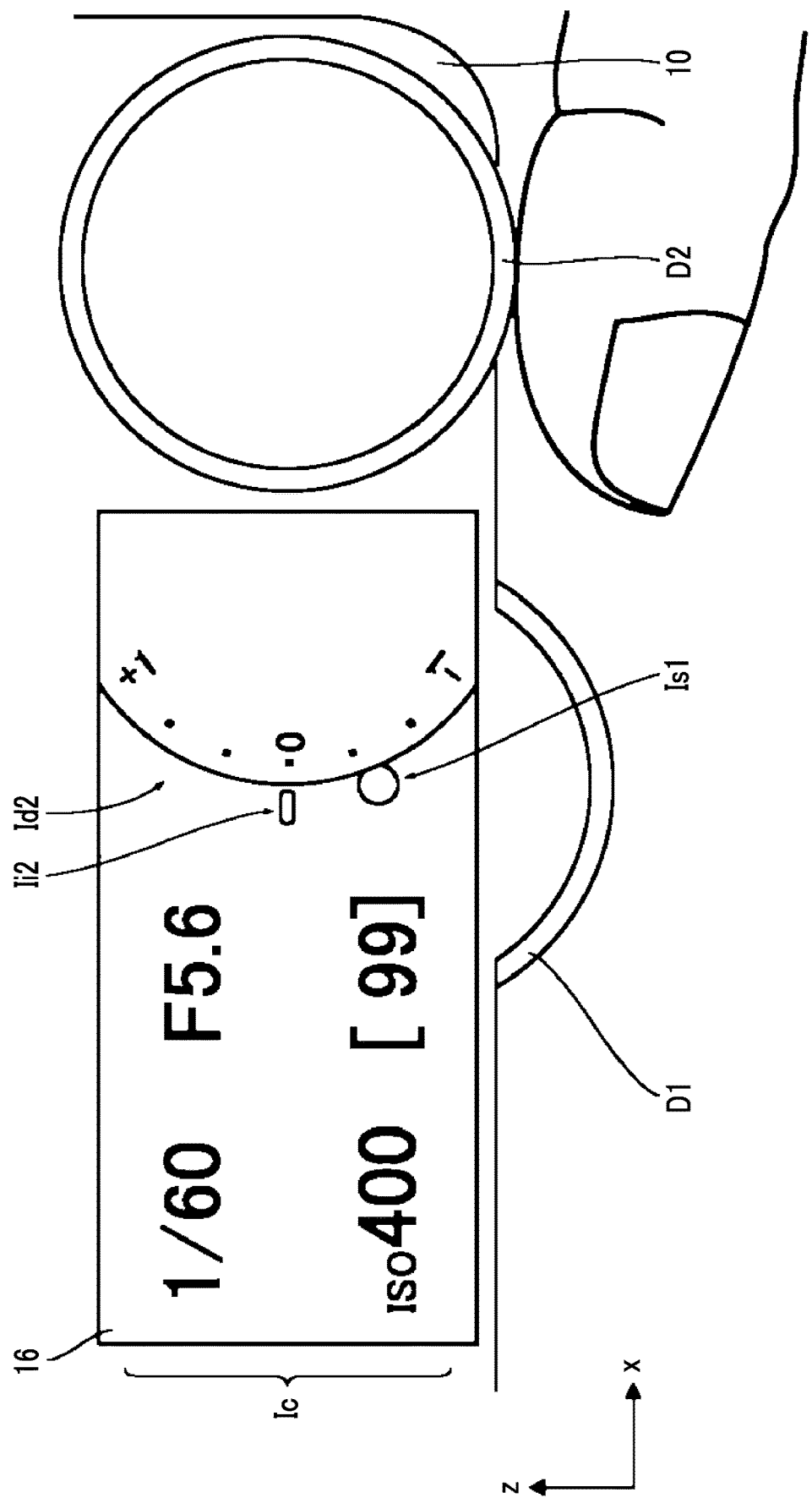
FIG. 37 is a plan view illustrating an example of display on the sub-display in a case where a second operation dial is rotationally operated.

FIG. 37 is a plan view illustrating an example of display on the sub-display in a case where the second operation dial is rotationally operated.

As illustrated in FIG. 37, in a case where the second operation dial D2 is rotationally operated, the image picture Id2 of the second operation dial D2 is displayed. In the same manner as the image picture Id1 of the first operation dial D1, the image picture Id2 is displayed as a result of enlarging the reduced image. In this case, the reduced image is enlarged centering on an axis thereof. When the image picture is enlarged, the image picture is continuously enlarged as animation, and is enlarged while being rotated in conjunction with the operation. Consequently, an operation and display can be clearly correlated with each other.

The set contents Ic of the camera are displayed to be deviated to the margin region in conjunction with the display of the image picture Id2 of the second operation dial D2. In this case, the sizes thereof are changed, and the image picture is displayed.

As mentioned above, in a case where the second operation dial D2 is operated, the reduced image Is2 of the second operation dial D2 is enlarged, and thus the image picture Id2 of the second operation dial D2 is displayed on the sub-display 16. Consequently, it is possible to easily perform setting using the second operation dial D2.

Modification Example

In the above-described embodiment, an image having a circular outer shape is used as a reduced image of each operation dial, but a configuration of a reduced image is not limited thereto. A reduced image may be configured with dots or the like. An outer shape may be a polygonal shape.

In the above-described embodiment, in a case where an image picture of an operated operation dial is displayed on the sub-display 16, a reduced image of an operation dial which is not operated is still displayed on the sub-display 16, but the display of the reduced image of the operation dial which is not operated may be erased.

Fourth Embodiment

A digital camera of the present embodiment comprises a contact detection unit which detects contact with each operation dial. Display on the display unit is controlled according to a detection result in the contact detection unit.

The digital camera of the present embodiment has the same configuration as that of the digital camera of the first embodiment except that means for detecting contact with each operation dial is provided, and thus a description will be made of only a configuration related to contact detection and a configuration related to display on the display unit.

[Configuration]

Figure 38:
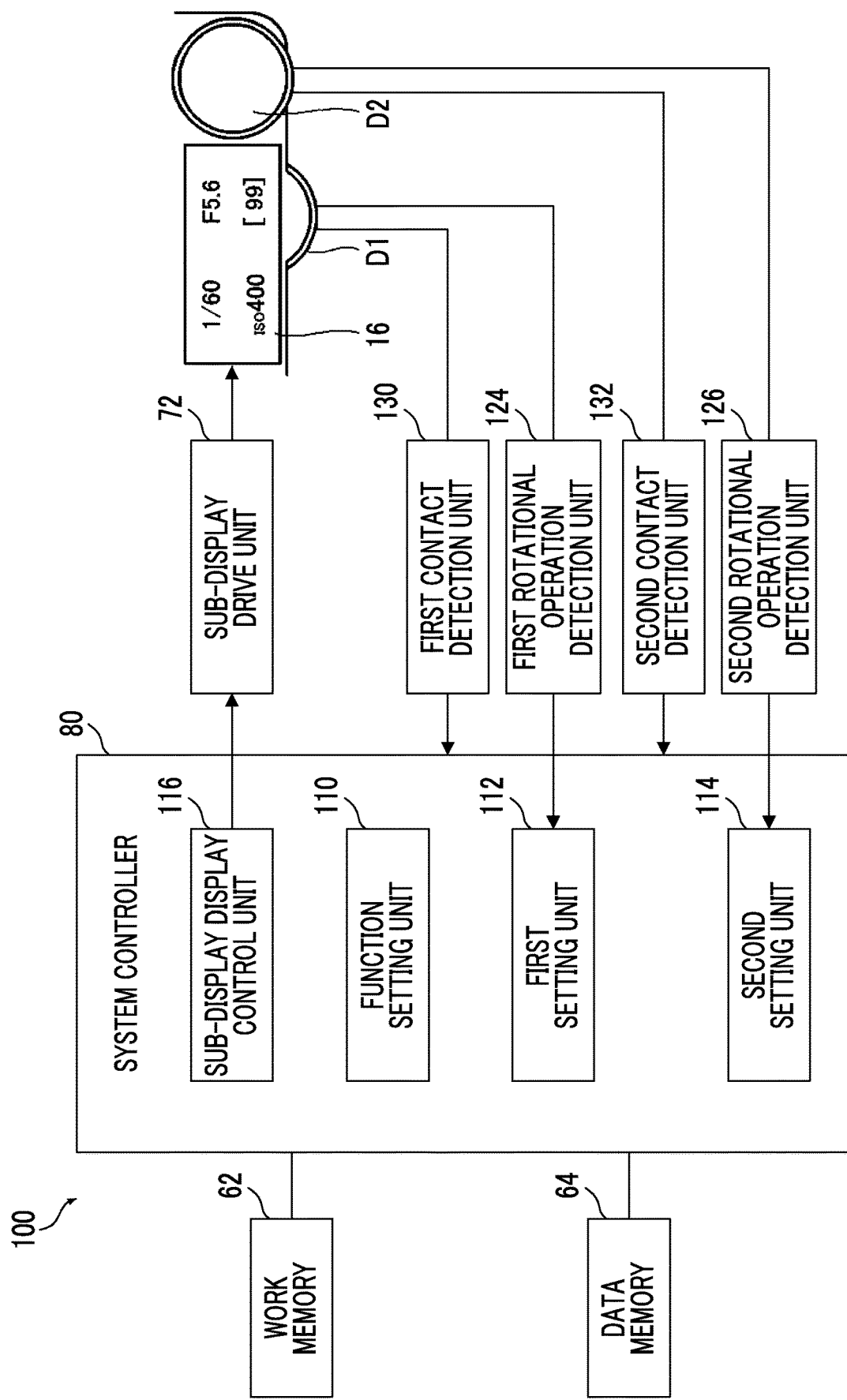
FIG. 38 is a block diagram of a control system related to display on the sub-display.

FIG. 38 is a block diagram of a control system related to display on the sub-display.

The digital camera of the present embodiment is additionally comprising a first contact detection unit 130 which detects contact with the first operation dial D1 and a second contact detection unit 132 which detects contact with the second operation dial D2.

The first contact detection unit 130 is an example of a contact detection unit, and detects contact of the finger with the first operation dial D1. The first contact detection unit 130 is configured with a touch sensor. In a case where contact of the finger with the first operation dial D1 is detected, the first contact detection unit 130 outputs information indicating the contact to the system controller 80.

The second contact detection unit 132 is an example of a contact detection unit, and detects contact with the second operation dial D2. The second contact detection unit 132 is configured with a touch sensor. In a case where contact of the finger with the second operation dial D2 is detected, the second contact detection unit 132 outputs information indicating the contact to the system controller 80.

The sub-display display control unit 116 controls display on the sub-display 16 on the basis of contact detection results from the first contact detection unit 130 and the second contact detection unit 132.

[Display on Sub-Display]

In the digital camera of the present embodiment, in a case where contact of the finger with an operation dial is detected, an image picture of the operation dial with which the contact is detected is displayed on the sub-display 16. In a case where the operation dial with which the contact is detected is rotationally operated, the image picture displayed on the sub-display 16 is rotated in conjunction with the operation. In a case where the finger does not contact an operation dial, only the set contents of the camera are displayed on the sub-display 16. Therefore, in the digital camera of the present embodiment, display on the sub-display 16 is switched during non-contact, during contact, and during an operation. Hereinafter, a description will be made of display on the sub-display 16 in each state.

<<During Non-Contact>>

Figure 39:
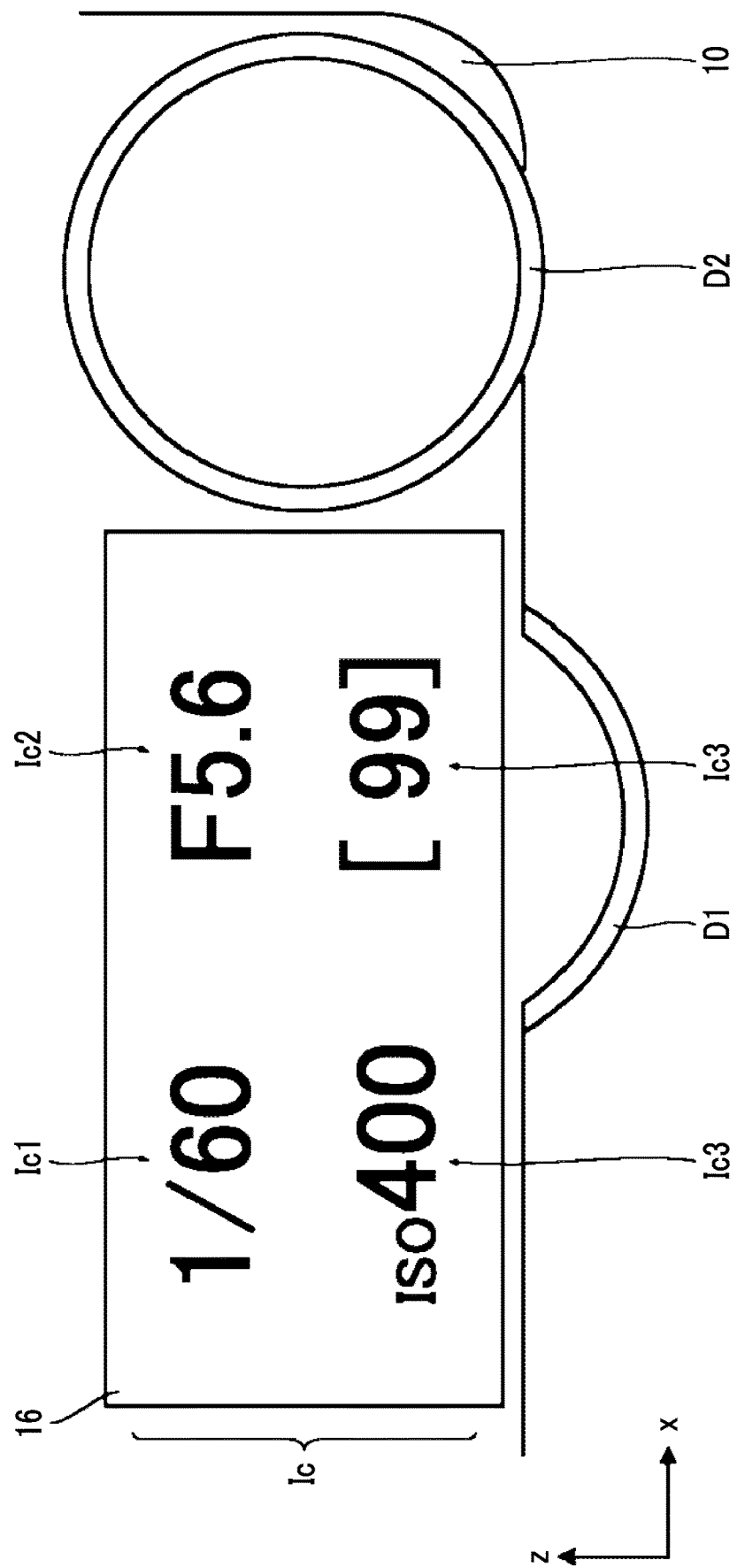
FIG. 39 is a plan view illustrating an example of display on the sub-display during a non-operation.

FIG. 39 is a plan view illustrating an example of display on the sub-display during a non-contact.

The non-contact corresponds to a case where the finger does not contact the first operation dial D1 and the second operation dial D2. In this case, as illustrated in FIG. 39, only the set contents Ic of the camera are displayed on the sub-display 16.

A display layout of the sub-display 16 during non-contact will be referred to as a "layout during non-contact".

<<During Contact>>

(1) In Case of Coming into Contact with First Operation Dial

Figure 40:
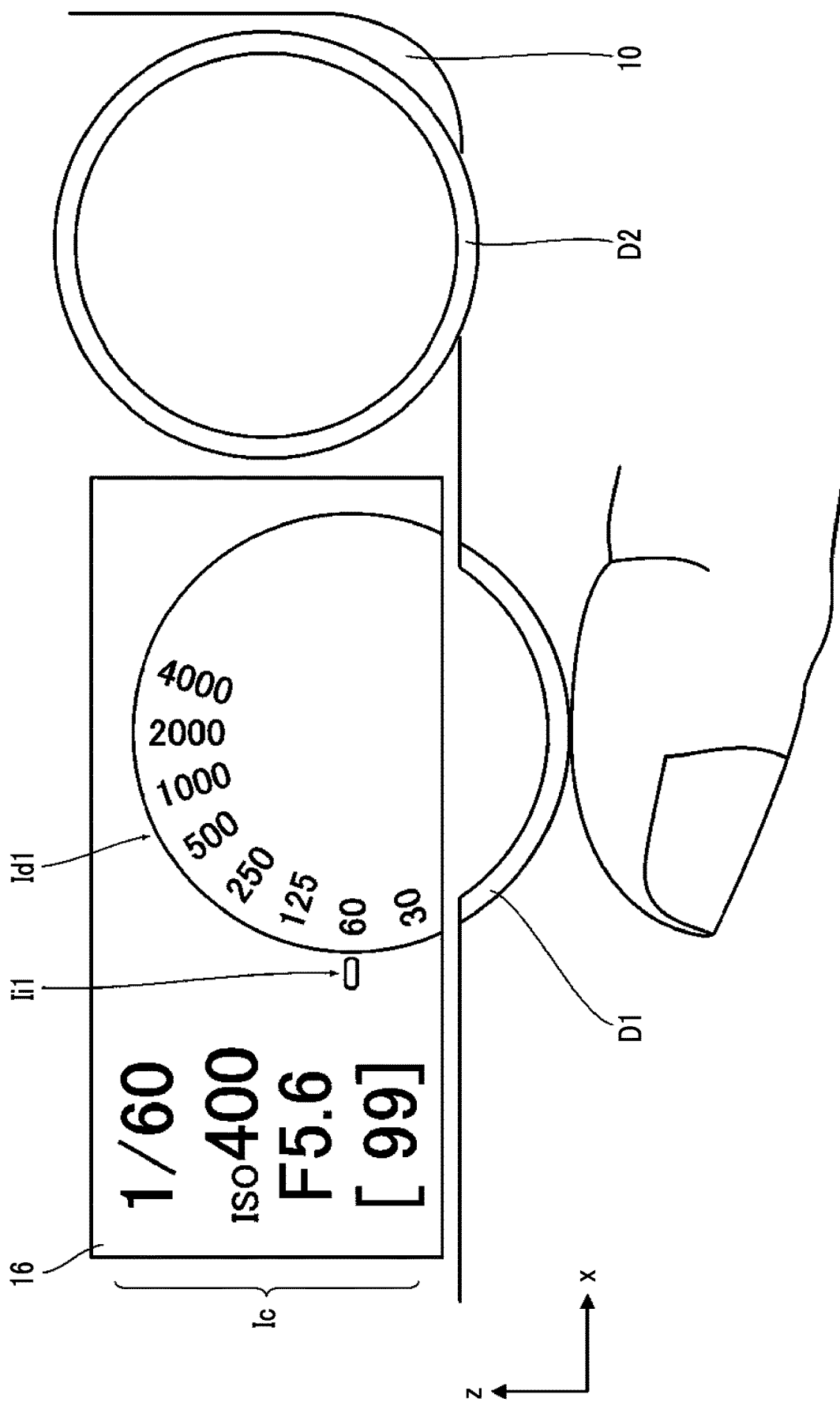
FIG. 40 is a plan view illustrating an example of display on the sub-display in a case where a finger comes into contact with the first operation dial.

FIG. 40 is a plan view illustrating an example of display on the sub-display in a case where the finger comes into contact with the first operation dial.

In a case where the finger comes into contact with the first operation dial D1, the image picture Id1 of the first operation dial D1 is displayed on the sub-display 16. A display aspect of the image picture Id1 of the first operation dial D1 is the same as that in the digital camera of the first embodiment. Therefore, the image picture Id1 of the first operation dial D1 displayed on the sub-display 16 is an image having a circular arc outer shape to which a part of the first operation dial D1 exposed from the camera body 10 extends. Consequently, the hidden portion of the actual first operation dial D1 is complemented by the image picture Id1 displayed on the sub-display 16.

The contact of the finger with the first operation dial D1 is detected by the first contact detection unit 130. A display layout of the sub-display 16 in a case where the finger comes into contact with the first operation dial D1 will be referred to as a "first layout during contact".

(2) In Case of Coming into Contact with Second Operation Dial

Figure 41:
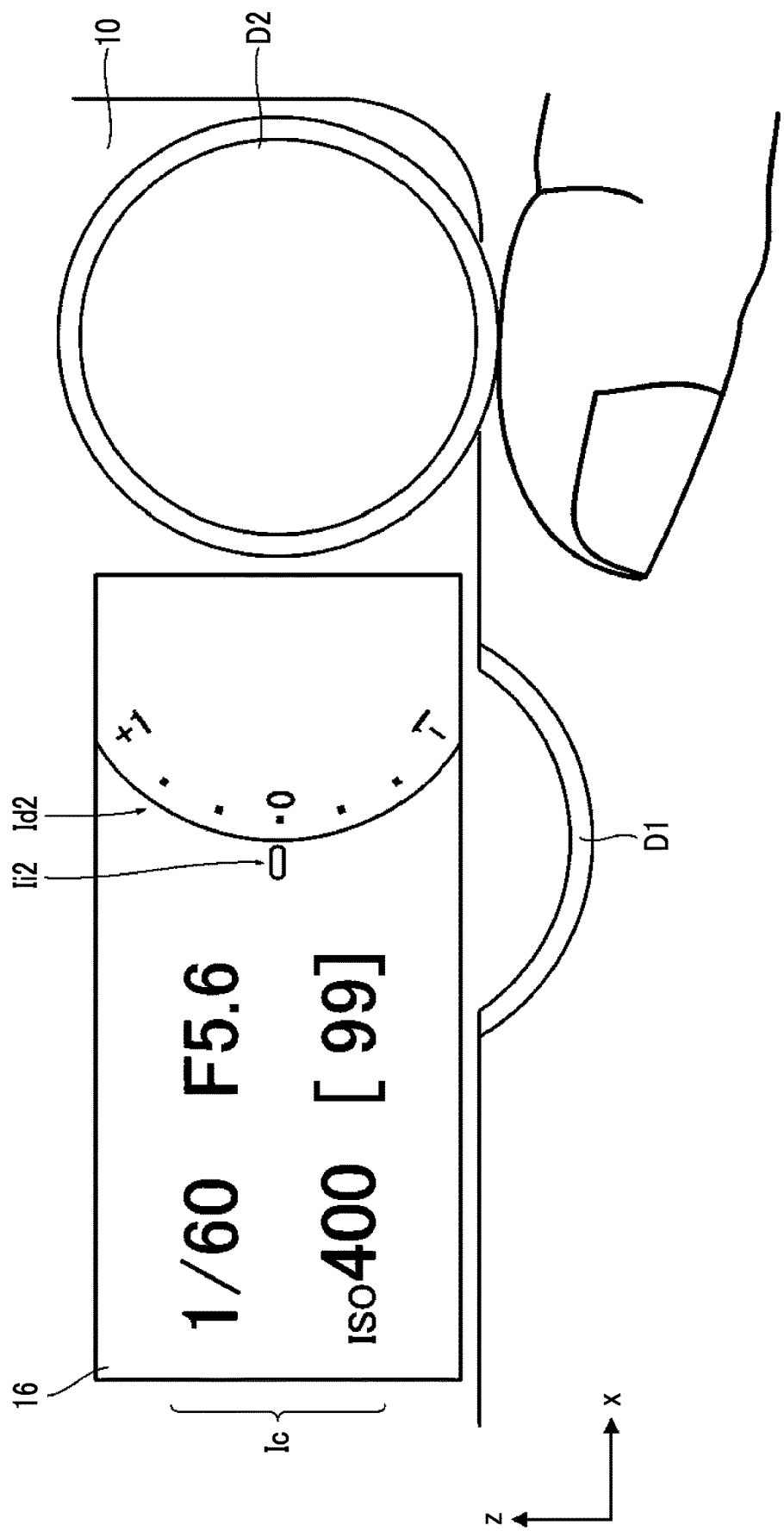
FIG. 41 is a plan view illustrating an example of display on the sub-display in a case where a finger comes into contact with the second operation dial.

FIG. 41 is a plan view illustrating an example of display on the sub-display in a case where the finger comes into contact with the second operation dial.

In a case where the finger comes into contact with the second operation dial D2, the image picture Id2 of the second operation dial D2 is displayed on the sub-display 16. A display aspect of the image picture Id2 of the second operation dial D2 is the same as that in the digital camera of the first embodiment.

The contact of the finger with the second operation dial D2 is detected by the second contact detection unit 132. A display layout of the sub-display 16 in a case where the finger comes into contact with the second operation dial D2 will be referred to as a "second layout during contact".

<<During Operation>>

(1) In Case where First Operation Dial is Rotationally Operated

In a case where the contact of the finger is detected, and then the first operation dial D1 is rotationally operated, the image picture Id1 of the first operation dial D1 is rotated in conjunction with the operation.

(2) In Case where Second Operation Dial is Rotationally Operated

In a case where the contact of the finger is detected, and then the second operation dial D2 is rotationally operated, the image picture Id2 of the second operation dial D2 is rotated in conjunction with the operation.

[Display Method on Sub-Display]

Figure 42:
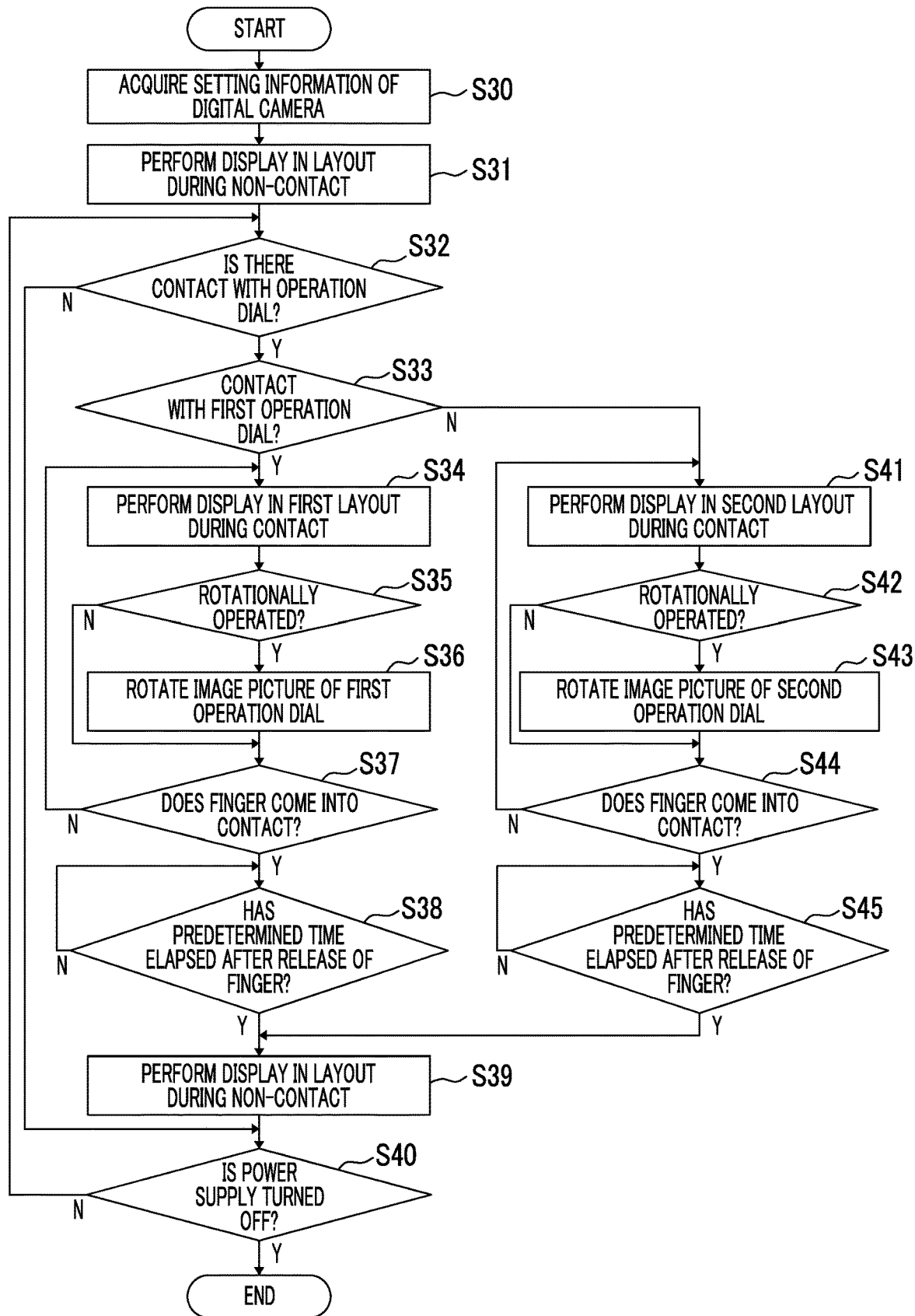
FIG. 42 is a flowchart illustrating process procedures for display on the sub-display.

FIG. 42 is a flowchart illustrating process procedures for display on the sub-display in the digital camera of the present embodiment.

In a case where power is supplied to the digital camera, the sub-display display control unit 116 acquires setting information of the digital camera (step S30). After the setting information is acquired, the sub-display display control unit 116 displays the set contents of the camera on the sub-display 16 in the layout during a non-operation (step S31). In the layout during a non-operation, as illustrated in FIG. 39, only the set contents Ic of the camera are displayed on the sub-display 16.

Thereafter, the sub-display display control unit 116 determines the presence or absence of contact with the first operation dial D1 and the second operation dial D2 object inputs from the first contact detection unit 130 and the second contact detection unit 132 (step S32).

In a case where it is determined that there is contact with the first operation dial D1 or the second operation dial D2, the sub-display display control unit 116 determines whether the contact is contact with the first operation dial D1 (step S33).

Here, in a case where it is determined that the operation dial with which the finger has come into contact is the first operation dial D1, the sub-display display control unit 116 displays the set contents of the camera and the image picture Id1 of the first operation dial D1 on the sub-display 16 in the first layout during contact (step S34). In other words, as illustrated in FIG. 40, the image picture Id1 of the first operation dial D1 is displayed on the sub-display 16, and the set contents Ic of the camera are displayed in the margin region. In this case, the sub-display display control unit 116 advances and displays the image picture Id1 of the first operation dial D1 from the edge part to the display region of the sub-display 16.

Thereafter, the sub-display display control unit 116 determines whether or not the first operation dial D1 is rotationally operated on the basis of an input from the first rotational operation detection unit 124 (step S35). In a case where rotational operation is performed, the image picture Id1 of the first operation dial D1 displayed on the sub-display 16 is rotated (step S36). This rotation is performed in conjunction with the operation.

Next, the sub-display display control unit 116 determines whether or not the finger is released from the first operation dial D1 on the basis of an input from the first contact detection unit 130 (step S37). In a case where it is determined that the finger is released, it is determined whether or not a predetermined time has elapsed from the release of the finger (step S38). In a case where it is determined that a predetermined time has elapsed from the release of the finger, the sub-display display control unit 116 displays the set contents of the camera on the sub-display 16 in the layout during a non-operation (step S39).

Next, the sub-display display control unit 116 determines whether or not the power supply is turned off (step S40). In a case where the power supply is turned off, the process is finished. On the other hand, in a case where it is determined that the power supply is not turned off, the flow returns to step S32, and the presence or absence of contact with the first operation dial D1 and the second operation dial D2 is determined (step S32).

In a case where it is determined in step S33 that the operation dial with which the contact is detected is not the first operation dial D1, the sub-display display control unit 116 displays the set contents Ic of the camera and the image picture Id2 of the second operation dial D2 in the second layout during contact (step S41). In other words, as illustrated in FIG. 41, the image picture Id2 of the second operation dial D2 is displayed on the sub-display 16, and the set contents Ic of the camera are displayed in the margin region. In this case, the sub-display display control unit 116 advances and displays the image picture Id2 of the second operation dial D2 from the edge part to the display region of the sub-display 16.

Thereafter, the sub-display display control unit 116 determines whether or not the second operation dial D2 is rotationally operated on the basis of an input from the second rotational operation detection unit 126 (step S42). In a case where rotational operation is performed, the image picture Id2 of the second operation dial D2 displayed on the sub-display 16 is rotated (step S43). This rotation is performed in conjunction with the operation.

Next, the sub-display display control unit 116 determines whether or not the finger is released from the second operation dial D2 on the basis of an input from the second contact detection unit 132 (step S44). In a case where it is determined that the finger is released, it is determined whether or not a predetermined time has elapsed from the release of the finger (step S45). In a case where it is determined that a predetermined time has elapsed from the release of the finger, the sub-display display control unit 116 displays the set contents of the camera on the sub-display 16 in the layout during a non-operation (step S39).

Next, the sub-display display control unit 116 determines whether or not the power supply is turned off (step S40). In a case where the power supply is turned off, the process is finished. On the other hand, in a case where it is determined that the power supply is not turned off, the flow returns to step S32, and the presence or absence of contact with the first operation dial D1 and the second operation dial D2 is determined (step S32).

As mentioned above, in the digital camera of the present embodiment, contact with an operation dial is detected, and an image picture of the operation dial with which the contact is detected is displayed on the sub-display 16. Consequently, the relevance between each operation dial provided on the camera body and display on the sub-display can be clarified, and thus it is possible to ensure a favorable operability. It is possible to ensure the visibility of the set contents Ic of the camera during non-contact of an operation dial.

Modification Examples

Modification Example of Display Form During Non-Contact

In the above-described embodiment, only the set contents Ic of the camera are displayed on the sub-display 16 during non-contact, but, in the same manner as in the first embodiment, a part of an image picture of each operation dial may be displayed from the edge part during non-contact. In this case, in a case where contact is detected, an image picture of an operation dial with which the contact is detected may be advanced from the edge part to the display region so as to be displayed. In a case where rotational operation is performed, the image picture is rotated in conjunction with the operation. A part of an image picture of an operation dial is displayed on the display unit during non-contact, and thus a display position and a shape of the image picture can be easily recognized, so that a higher operability can be realized.

Similarly, a reduced image may be displayed during non-contact in the same manner as in the digital camera of the third embodiment. In this case, in a case where contact is detected, a reduced image of an operation dial with which the contact is detected is enlarged, and the enlarged image picture is displayed on the sub-display 16. In a case where rotational operation is performed, the image picture is rotated in conjunction with the operation.

Modification Example of Display Form During Contact

In the above-described embodiment, there is a configuration in which, in a case where an image picture of an operation dial with which contact is detected is displayed, the image picture is advanced from the edge part to the display region of the sub-display so as to be displayed, but a display form of displaying an image picture is not limited thereto. For example, an image picture may be displayed while being enlarged from a dot state.

Fifth Embodiment

In the digital camera of the above-described embodiment, in a case where contact with an operation dial is detected, an image picture of the operation dial with which the contact is detected is displayed on the display unit.

In a digital camera of the present embodiment, in a case where contact with an operation dial is detected, a part of an image picture of the operation dial with which the contact is detected is displayed from the edge part of the sub-display. In a case where the image picture is rotationally operated, the image picture is advanced from the edge part to the display region so as to be displayed.

A configuration of the digital camera is the same as that of the digital camera of the fourth embodiment, and, thus, herein, a description will be made of only display on the sub-display 16.

[Display on Sub-Display]

<<During Non-Contact>>

Display on the sub-display 16 during non-operation is the same as in the fourth embodiment. In other words, only the set contents Ic of the camera are displayed on the sub-display 16 (refer to FIG. 39).

<<During Contact>>

(1) In Case of Coming into Contact with First Operation Dial

Figure 43:
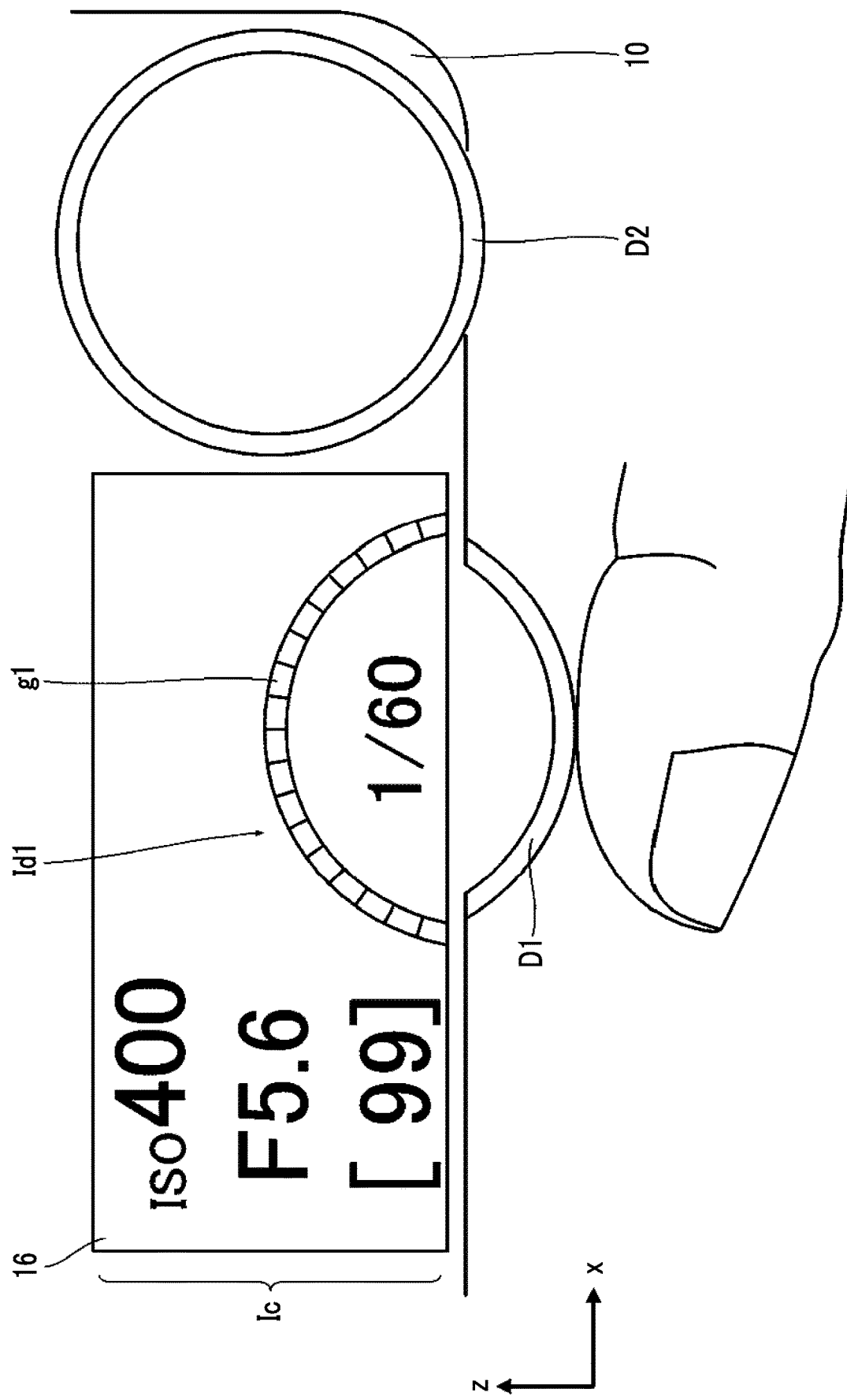
FIG. 43 is a plan view illustrating an example of display on the sub-display in a case where a finger comes into contact with the first operation dial.

FIG. 43 is a plan view illustrating an example of display on the sub-display in a case where the finger comes into contact with the first operation dial.

In a case where the finger comes into contact with the first operation dial D1, a part of the image picture Id1 of the first operation dial D1 is displayed from the edge part of the sub-display 16.

Here, the image picture is configured with an image in which the current set value is displayed in a dial plate portion as illustrated in FIG. 43.

FIG. 43 illustrates an example of a case where the function of setting a shutter speed is allocated to the first operation dial D1, and illustrates an example of a case where the currently set shutter speed is 1/60 seconds. In this case, "1/60" which is the currently set shutter speed is displayed inside (dial plate portion) of the circle determining an outer shape.

(2) In Case of Coming into Contact with Second Operation Dial

Figure 44:
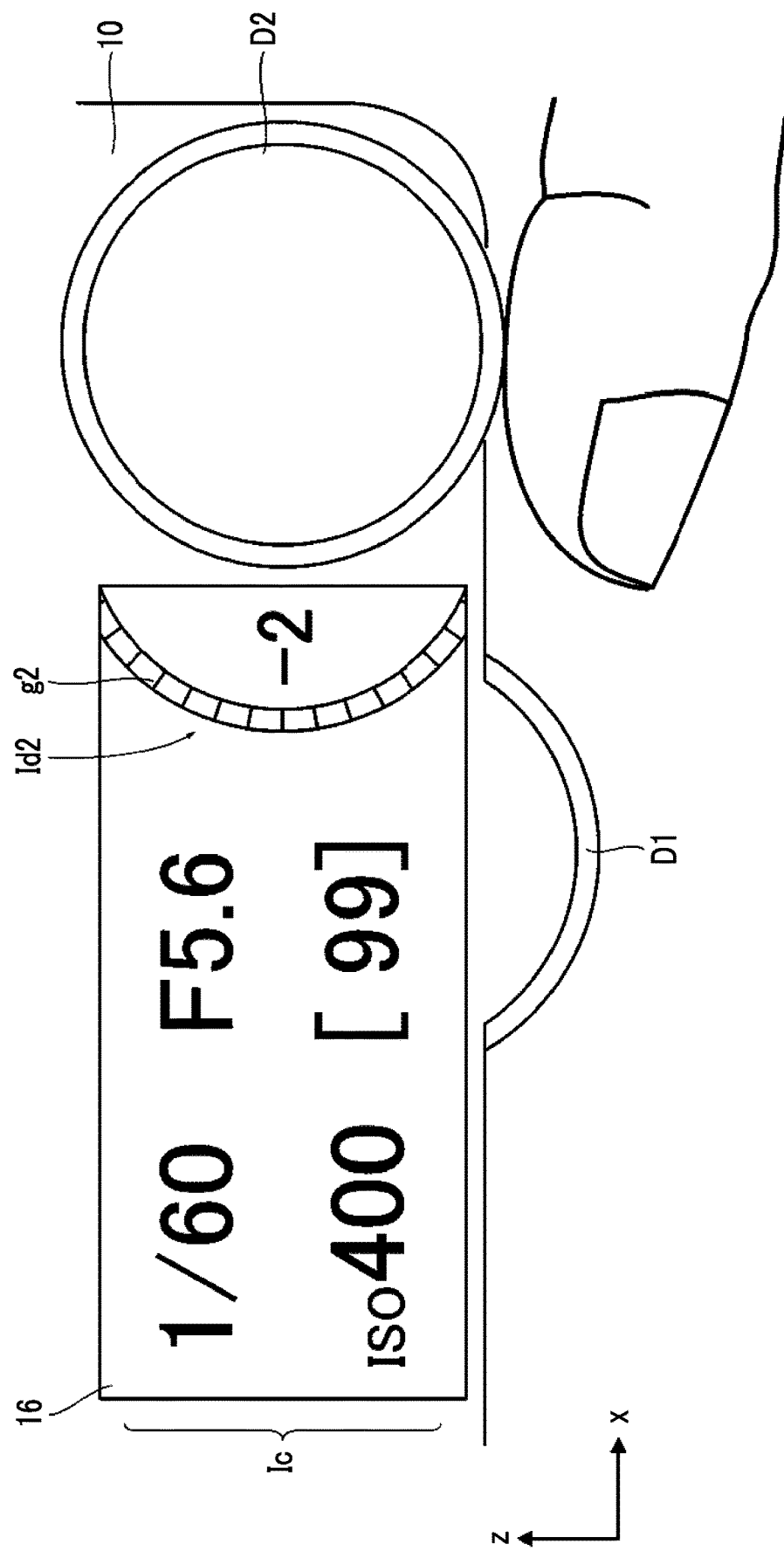
FIG. 44 is a plan view illustrating an example of display on the sub-display in a case where a finger comes into contact with the second operation dial.

FIG. 44 is a plan view illustrating an example of display on the sub-display in a case where the finger comes into contact with the second operation dial.

In a case where the finger comes into contact with the second operation dial D2, a part of the image picture Id2 of the second operation dial D2 is displayed from the edge part of the sub-display 16.

FIG. 44 illustrates an example of a case where the function of setting an exposure correction value is allocated to the second operation dial D2, and illustrates an example of a case where the currently set exposure correction value is −2. In this case, "−2" which is the currently set exposure correction value is displayed inside (dial plate portion) of the circle determining an outer shape.

<<During Operation>>

(1) In Case where First Operation Dial is Rotationally Operated

Figure 45:
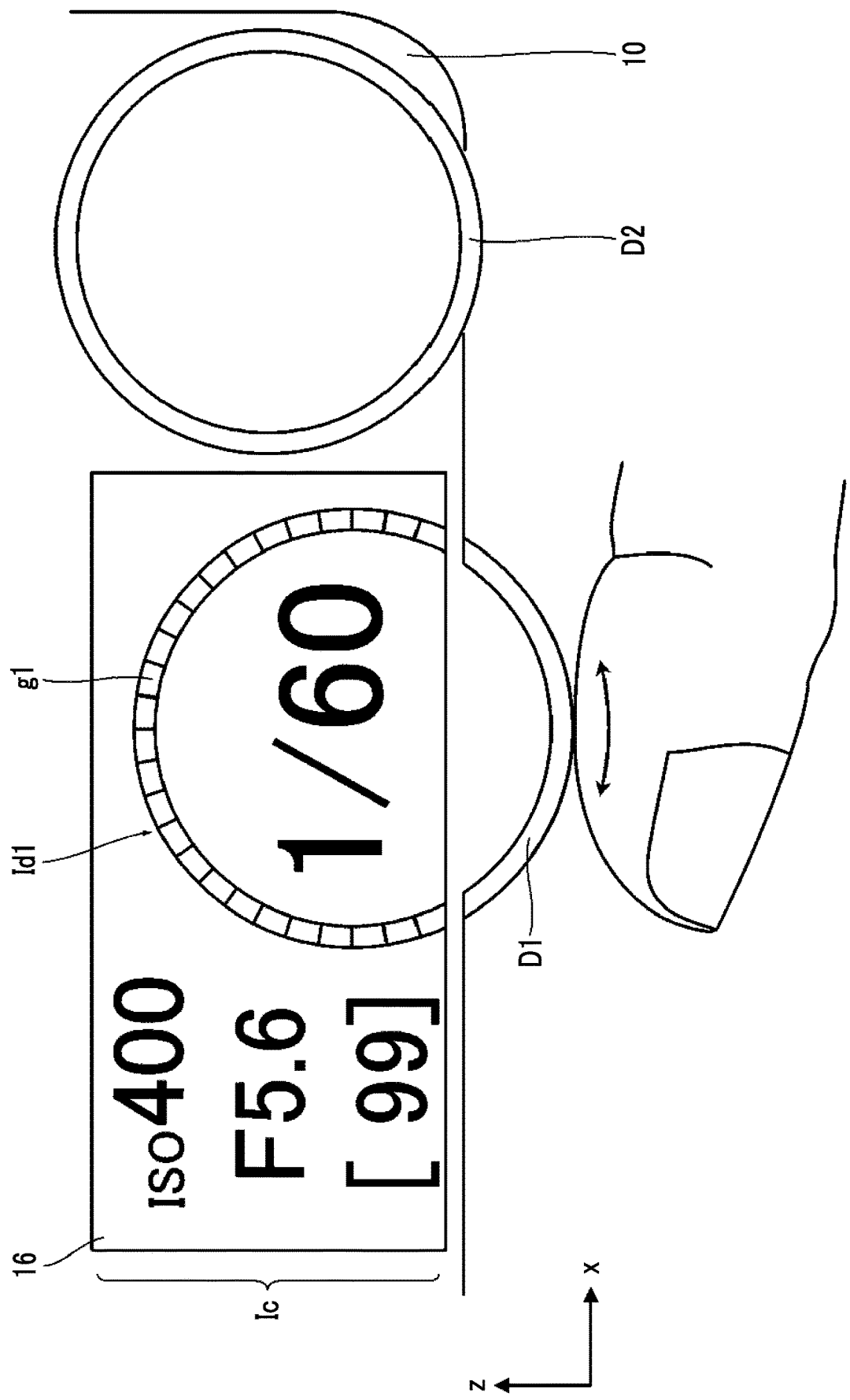
FIG. 45 is a plan view illustrating an example of display on the sub-display in a case where the first operation dial is rotationally operated.

FIG. 45 is a plan view illustrating an example of display on the sub-display in a case where the first operation dial is rotationally operated.

In a case where the first operation dial D1 is rotationally operated, the image picture Id1 of the first operation dial D1 is advanced from the edge part to the display region of the sub-display 16 so as to be displayed. In this case, the image picture is advanced to the display region while the outer circumferential portion is rotated in conjunction with the operation.

(2) In Case where Second Operation Dial is Rotationally Operated

Figure 46:
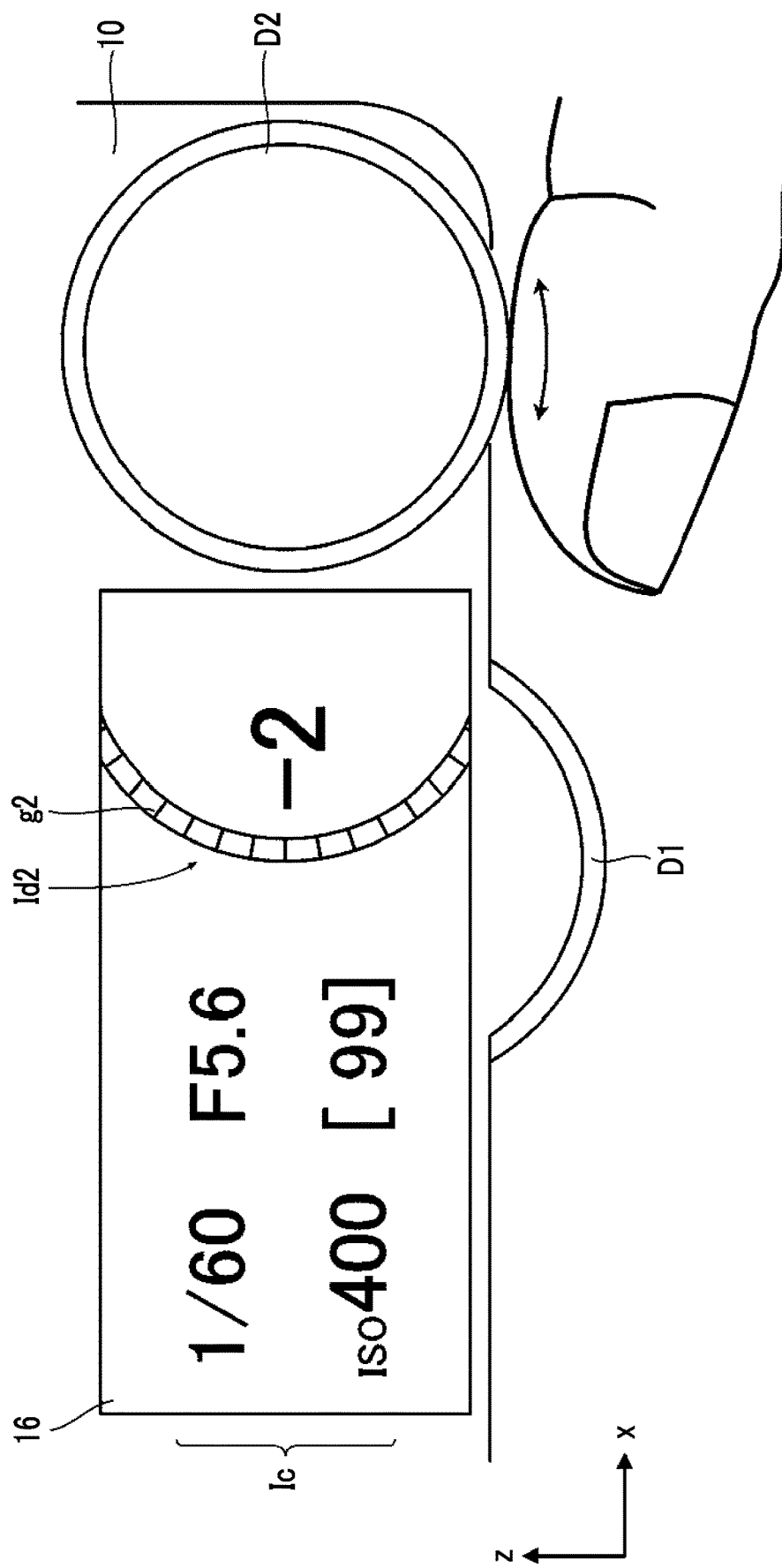
FIG. 46 is a plan view illustrating an example of display on the sub-display in a case where the second operation dial is rotationally operated.

FIG. 46 is a plan view illustrating an example of display on the sub-display in a case where the second operation dial is rotationally operated.

In a case where the second operation dial D2 is rotationally operated, the image picture Id2 of the second operation dial D2 is advanced from the edge part to the display region of the sub-display 16 so as to be displayed. In this case, the image picture is advanced to the display region while the outer circumferential portion is rotated in conjunction with the operation.

As mentioned above, in the digital camera of the present embodiment, in a case where contact is detected, a part of an image picture of an operation dial with which contact is detected is displayed from the edge part of the sub-display, and thus information regarding a set value displayed in a dial plate can be recognized. Consequently, information regarding an item which is set by using an operation dial and the current set value can be easily recognized.

In a case where a set value of a function allocated to an operation dial is displayed in a dial plate portion of an image picture thereof, and the set value is displayed as a set content of the camera on the sub-display 16, display of the item may be deleted in conjunction with display of the image picture. For example, in the above-described embodiment, information regarding a shutter speed, an F number, a sensitivity, and the number of images which can be captured is displayed as set contents of the camera. In this case, in a case where the function of setting a shutter speed, an F number, or a sensitivity is allocated to an operation dial, display of the item is deleted from items displayed as set contents of the camera in conjunction with display of an image picture thereof. In the above-described embodiment, since the function of setting a shutter speed is allocated to the first operation dial D1, in a case where the image picture Id1 of the first operation dial D1 is displayed, information regarding a shutter speed is deleted from items displayed as the set contents Ic of the camera (refer to FIGS. 43 and 45). Consequently, a display space of the sub-display 16 can be effectively used by preventing display of overlapping information.

Modification Example

In the above-described embodiment, in a case where contact is detected, a part of an image picture of an operation dial with which contact is detected is displayed from the edge part of the sub-display, but, in a case where contact is detected, a reduced image of the operation dial may be displayed on the sub-display 16.

Figure 47:
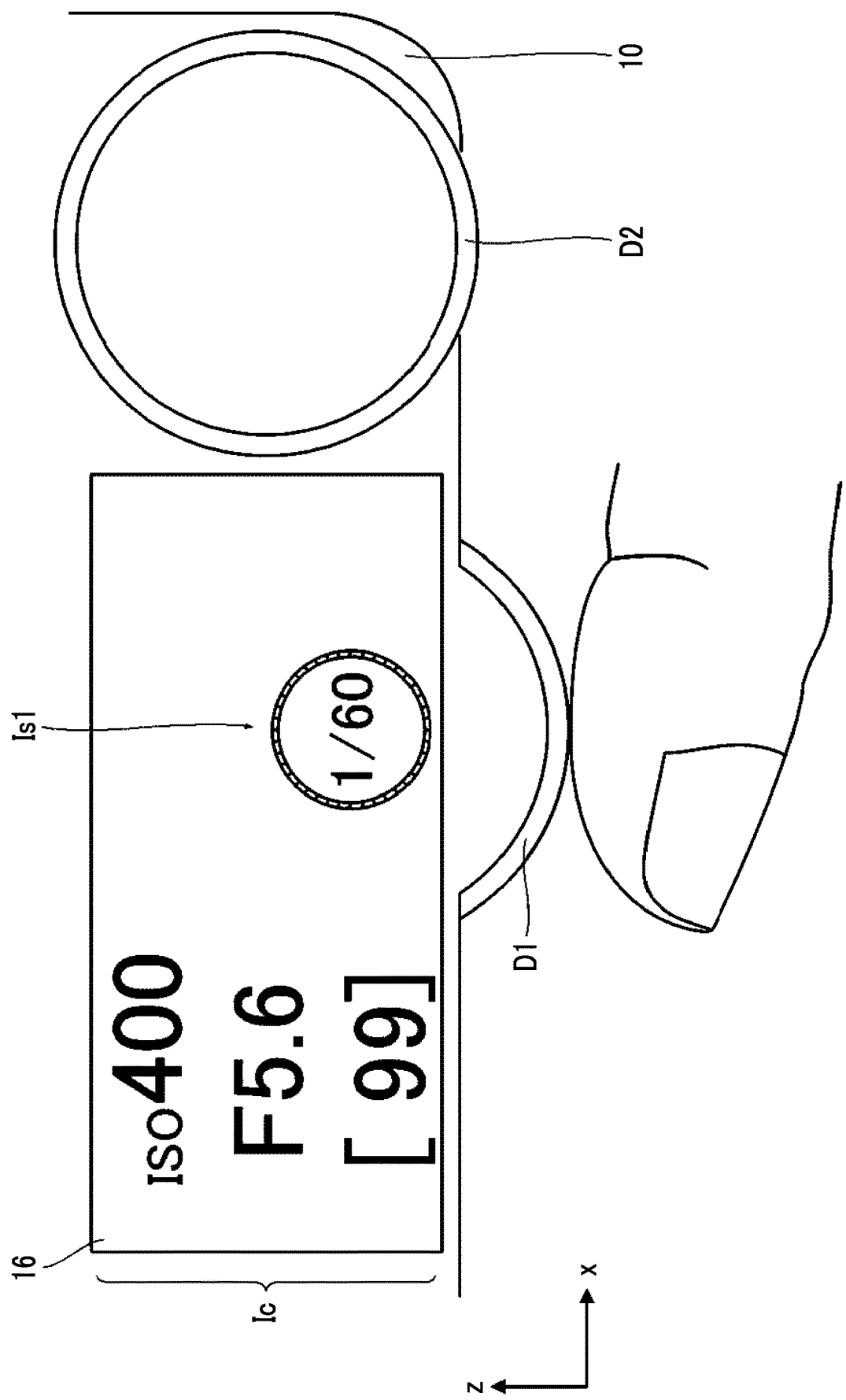
FIG. 47 is a plan view illustrating an example of display on the sub-display in a case where a reduced image is displayed when contact is detected.

FIG. 47 is a plan view illustrating an example of display on the sub-display in a case where contact is detected and a reduced image of the operation dial is displayed.

FIG. 47 illustrates a display example in a case where contact of the finger with the first operation dial D1 is detected. As illustrated in FIG. 47, in a case where contact of the finger with the first operation dial D1 is detected, the reduced image Is1 of the first operation dial D1 is displayed on the sub-display 16. In this case, the current set value is displayed in the dial plate portion. Consequently, information regarding an item which is set by using an operation dial and the current set value can be easily recognized.

Sixth Embodiment

A digital camera of the present embodiment comprises means for locking an operation dial, and display on the display unit is switched according to a lock state of the operation dial. The digital camera of the present embodiment is the same as the digital camera of the first embodiment except that the locking means is provided. Therefore, herein, a description will be made of only a configuration related to locking of an operation dial and display on the sub-display related to the locking.

Figure 48:
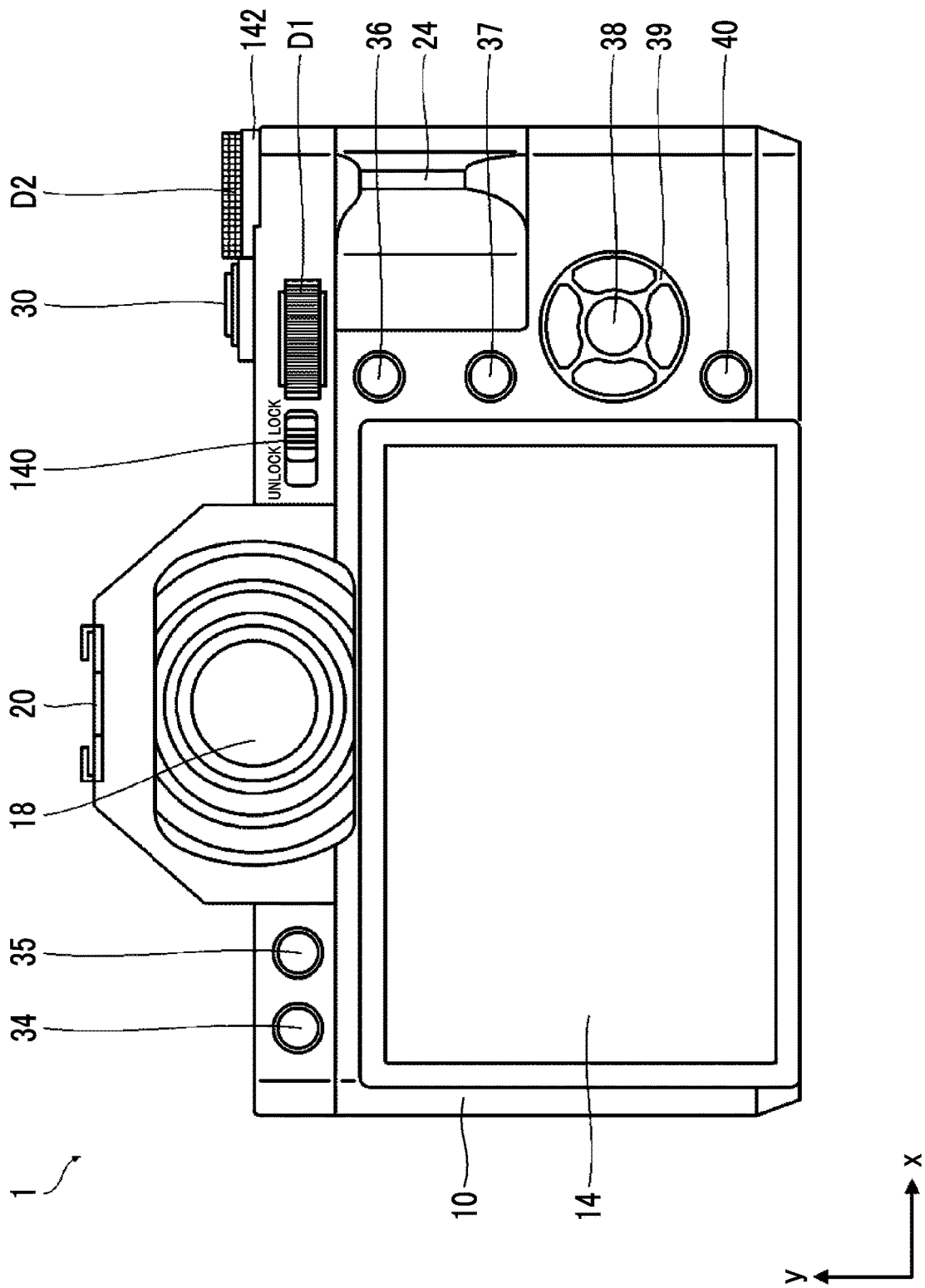
FIG. 48 is a rear view illustrating an exterior configuration of the digital camera.
Figure 49:
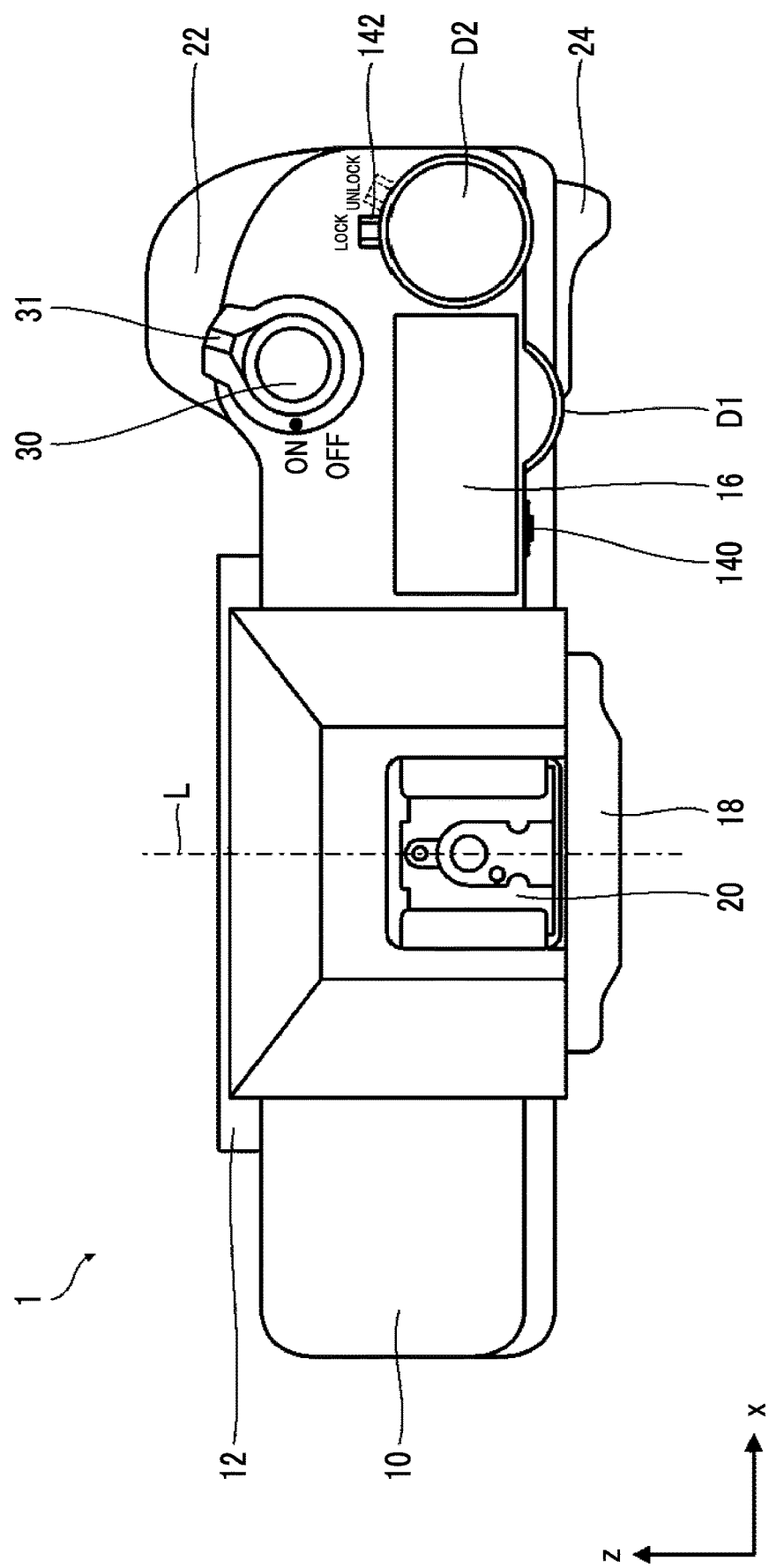
FIG. 49 is a plan view illustrating an exterior configuration of the digital camera.

FIG. 48 is a rear view illustrating an exterior configuration of the digital camera of the present embodiment. FIG. 49 is a plan view illustrating an exterior configuration of the digital camera of the present embodiment.

As illustrated in FIGS. 48 and 49, the digital camera 1 of the present embodiment comprises a first operation dial lock switch 140 which electronically locks the first operation dial D1 and a second operation dial lock lever 142 which electronically locks the second operation dial D2.

As illustrated in FIG. 48, the first operation dial lock switch 140 is disposed near the first operation dial D1. The first operation dial lock switch 140 is configured with a slidable switch. In a case where the first operation dial lock switch 140 is located at a lock position, the first operation dial D1 is electronically locked. In a case where the first operation dial lock switch 140 is located at an unlock position, the first operation dial D1 is electronically unlocked.

As illustrated in FIG. 49, the second operation dial lock lever 142 is disposed coaxially with the second operation dial D2. The second operation dial lock lever is configured with a rotary lever. In a case where the second operation dial lock lever 142 is located at a lock position, the second operation dial D2 is electronically locked. In a case where the second operation dial lock lever 142 is located at an unlock position, the second operation dial D2 is electronically unlocked.

Figure 50:
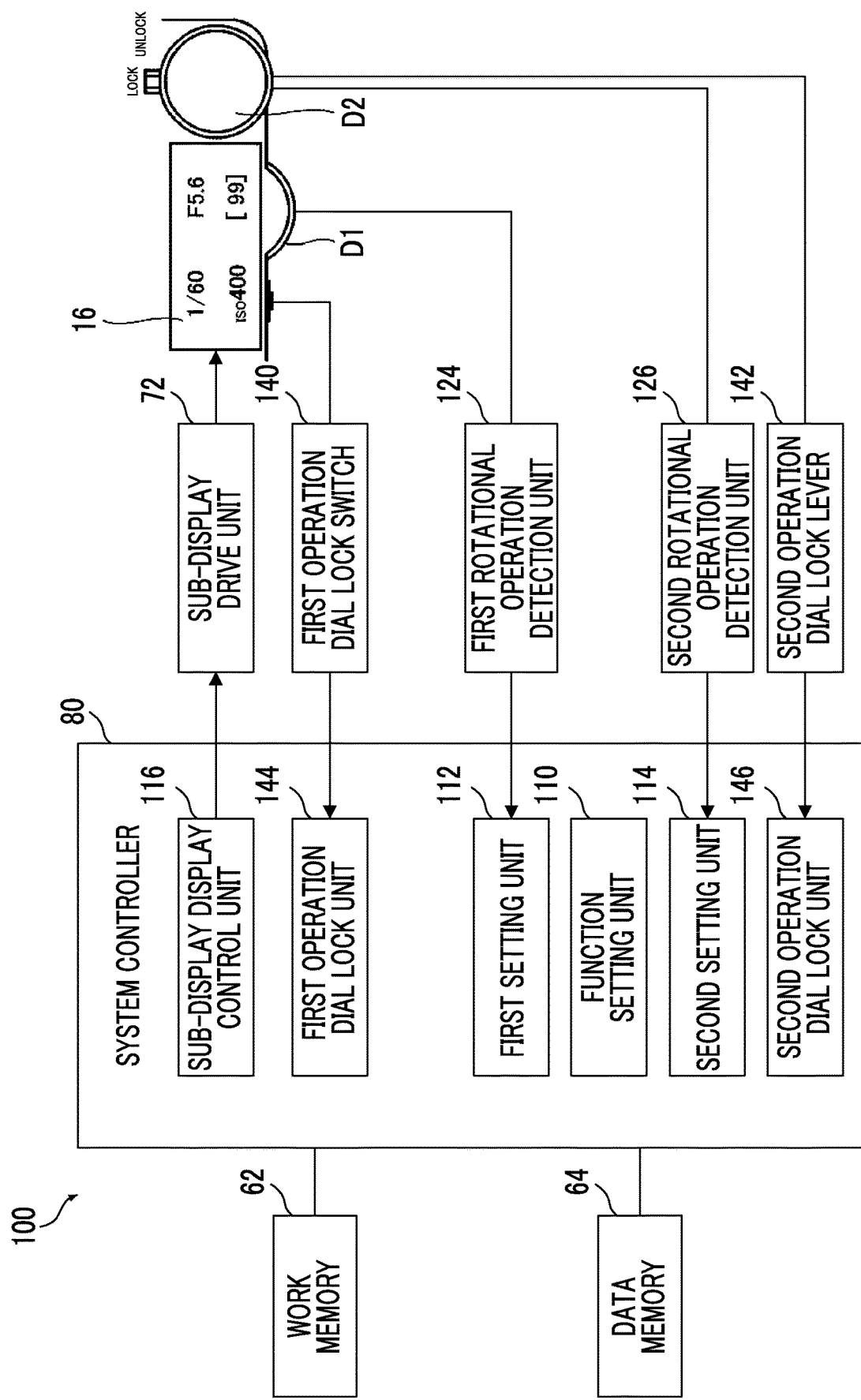
FIG. 50 is a block diagram of a control system related to display on the sub-display.

FIG. 50 is a block diagram of a control system related to display on the sub-display.

The digital camera of the present embodiment comprises a first operation dial lock unit 144 which electronically locks the first operation dial D1 on the basis of operation information from the first operation dial lock switch 140, and a second operation dial lock unit 146 which electronically locks the second operation dial D2 on the basis of operation information from the second operation dial lock lever 142.

In a case where the first operation dial lock switch 140 is set at the lock position, the first operation dial lock unit 144 electronically locks the first operation dial D1. In a case where the first operation dial D1 is electronically locked, even if the first operation dial D1 is operated, the operation is invalidated. In other words, even if the first operation dial D1 is rotationally operated, a setting is not changed.

The function of the first operation dial lock unit 144 is provided as one of the functions of the system controller 80. In other words, the microcomputer executes a predetermined control program, and thus the system controller 80 provides the function of the first operation dial lock unit 144.

A lock unit of the first operation dial D1 is configured with both of the first operation dial lock switch 140 and the first operation dial lock unit 144.

In a case where the second operation dial lock lever 142 is set at the lock position, the second operation dial lock unit 146 electronically locks the second operation dial D2.

The function of the second operation dial lock unit 146 is provided as one of the functions of the system controller 80. In other words, the microcomputer executes a predetermined control program, and thus the system controller 80 provides the function of the second operation dial lock unit 146.

A lock unit of the second operation dial D2 is configured with both of the second operation dial lock lever 142 and the second operation dial lock unit 146.

The sub-display display control unit 116 controls display on the sub-display 16 according to lock states of the first operation dial D1 and the second operation dial D2.

[Display on Sub-Display]

In the digital camera of the present embodiment, in a case where an operation dial is unlocked, a part of an image picture of the operation dial is displayed from the edge part of the sub-display 16. In a case where the operation dial is operated, the image picture of the operated operation dial appears in the display region from the edge part.

<<During Locking>>

Figure 51:
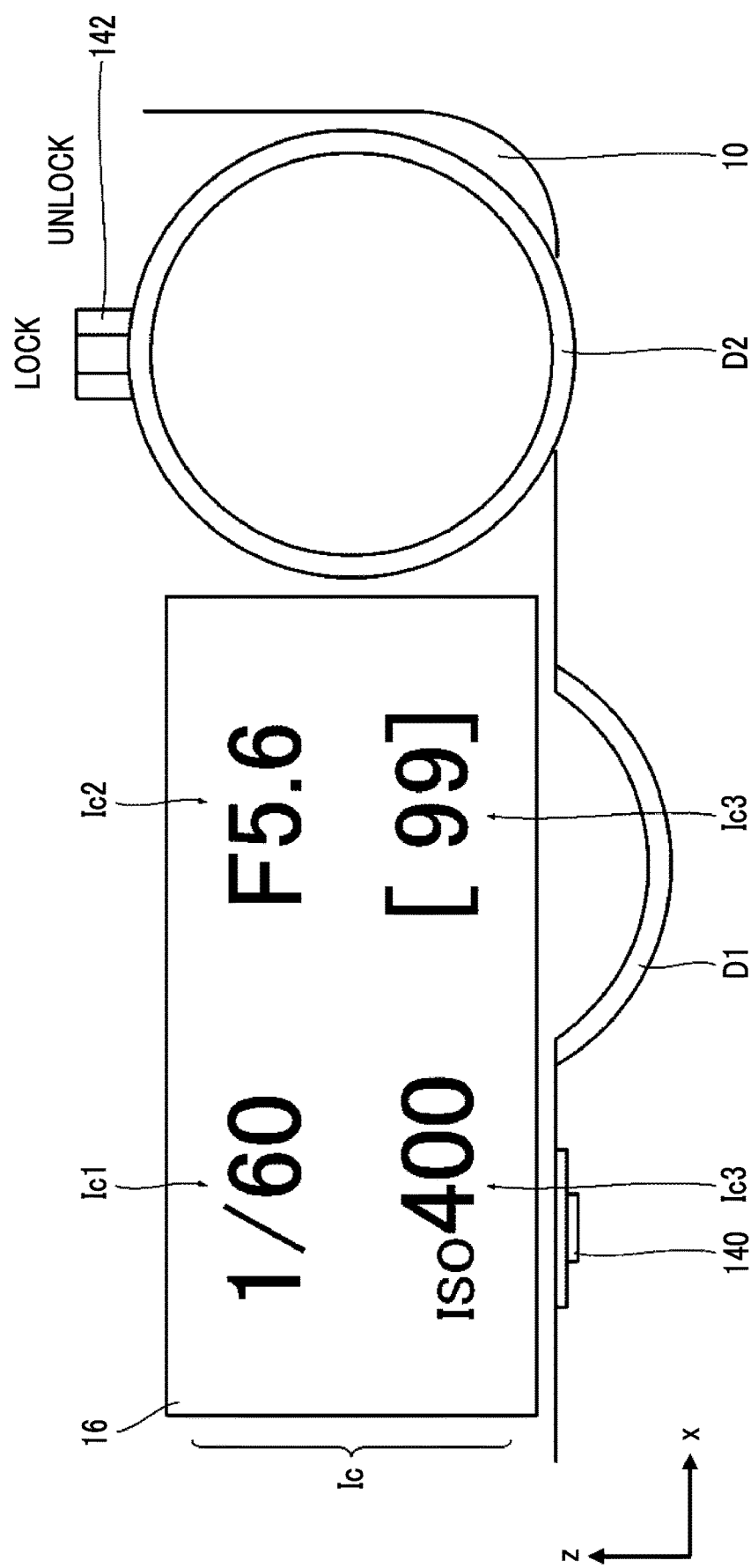
FIG. 51 is a plan view illustrating an example of display on the sub-display in a case where both of the first operation dial and the second operation dial are locked.

FIG. 51 is a plan view illustrating an example of display on the sub-display in a case where both of the first operation dial and the second operation dial are locked.

In a case where both of the first operation dial D1 and the second operation dial D2 are locked, the image pictures of the operation dials are not displayed on the sub-display 16. In other words, in this case, only the set contents Ic of the camera are displayed on the sub-display 16.

In a case where an operation dial is locked, even if the operation dial is rotationally operated, the operation is invalid, and a set value is not changed. In this case, a predetermined error message may be displayed on the sub-display 16.

<<In Case of Unlocking>>

Figure 52:
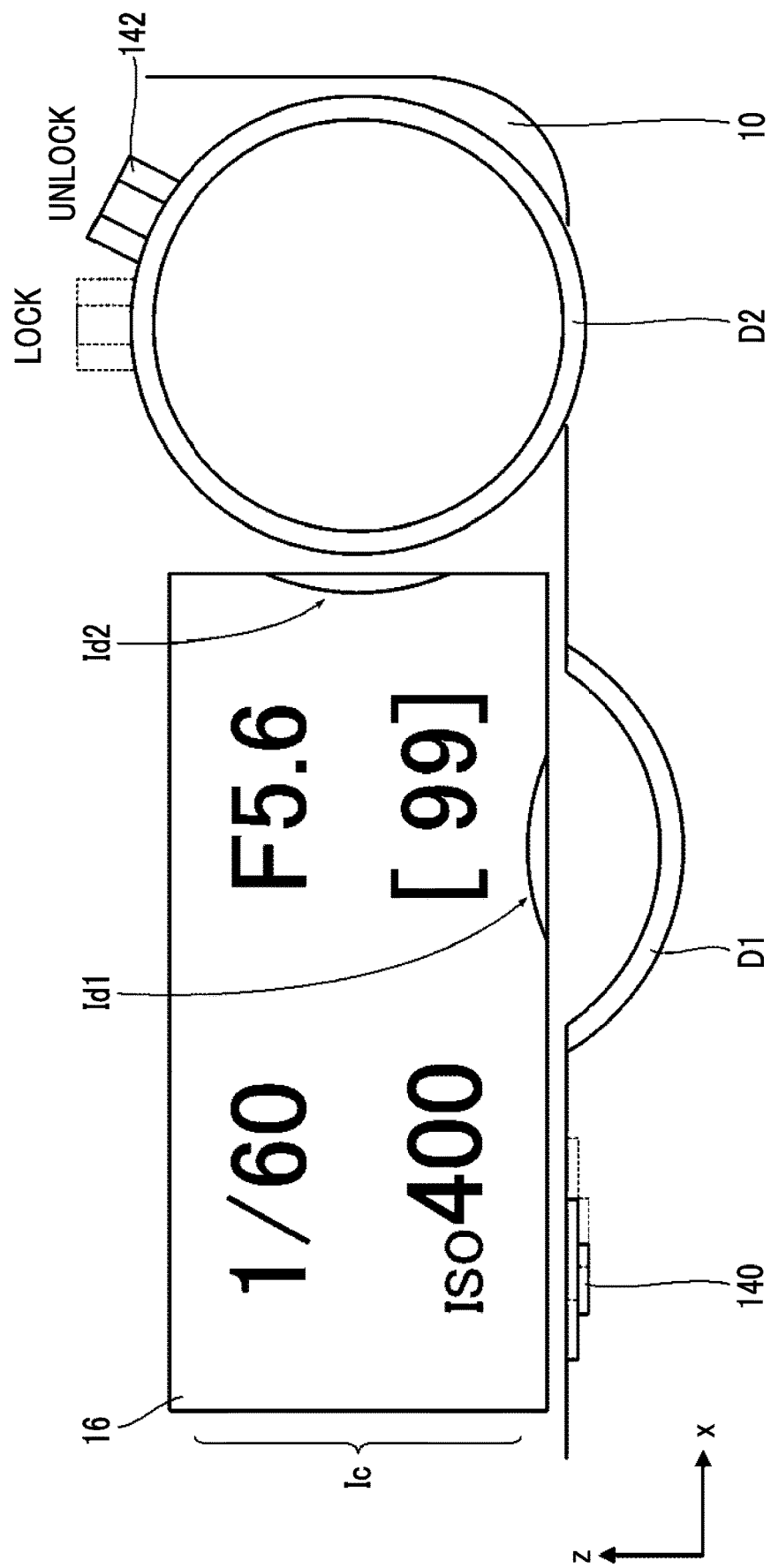
FIG. 52 is a plan view illustrating an example of display on the sub-display in a case where the first operation dial and the second operation dial are unlocked.

FIG. 52 is a plan view illustrating an example of display on the sub-display in a case where the first operation dial and the second operation dial are unlocked.

In a case where the first operation dial D1 and the second operation dial D2 are unlocked, a part of the image picture Id1 of the first operation dial D1 and a part of the image picture Id2 of the second operation dial D2 are displayed from the edge part of the sub-display 16.

In a case where only the first operation dial D1 is unlocked, only the image picture Id1 of the first operation dial D1 is displayed from the edge part of the sub-display 16. Similarly, in a case where only the second operation dial D2 is unlocked, only the image picture Id2 of the second operation dial D2 is displayed from the edge part of the sub-display 16.

<<In Case of Operation>>

(1) In Case where First Operation Dial is Rotationally Operated

Figure 53:
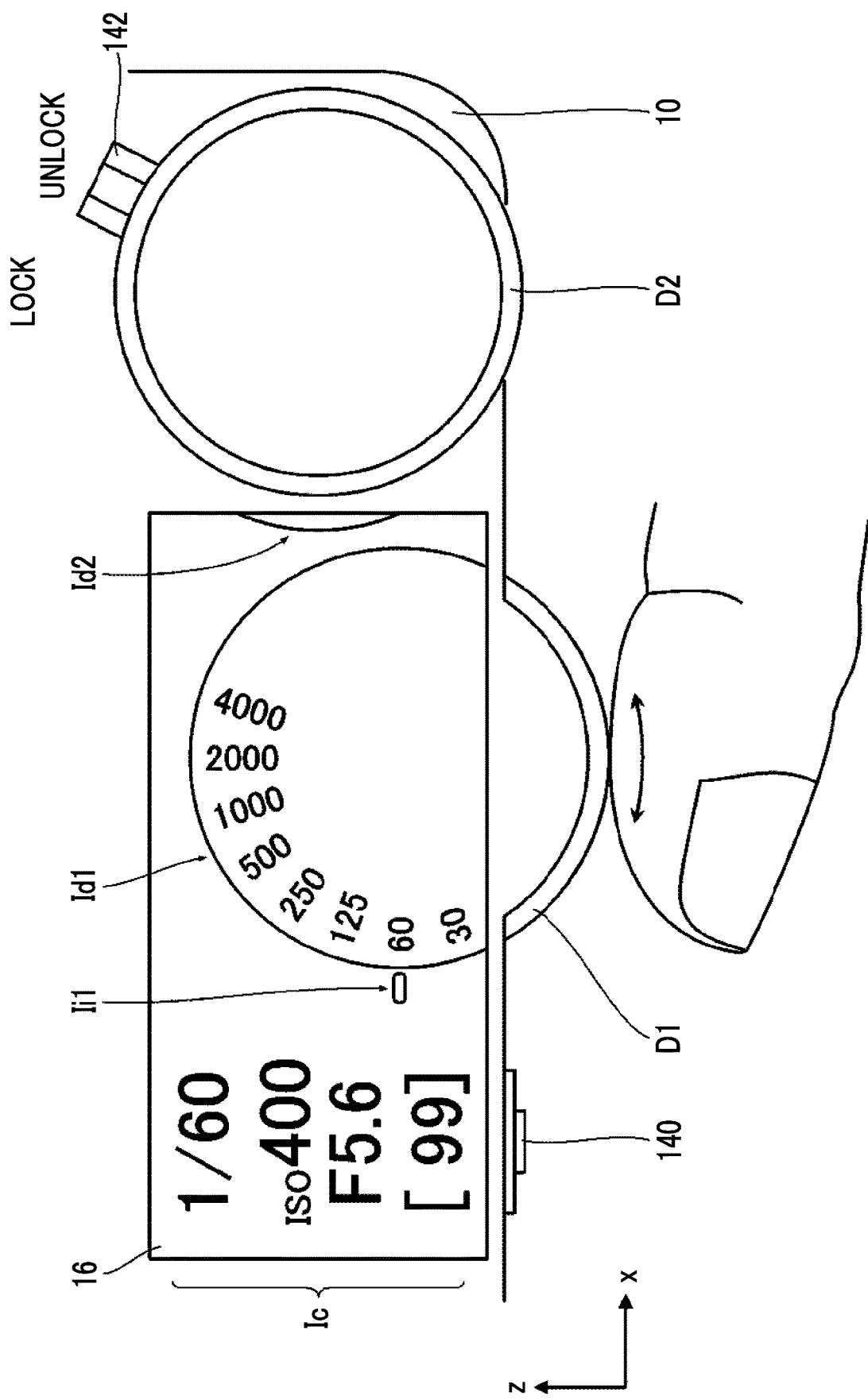
FIG. 53 is a plan view illustrating an example of display on the sub-display in a case where the first operation dial is unlocked and is operated.

FIG. 53 is a plan view illustrating an example of display on the sub-display in a case where the first operation dial is unlocked and is operated.

In a case where the unlocked first operation dial D1 is rotationally operated, the image picture Id1 of the first operation dial D1 is advanced from the edge part to the display region of the sub-display 16 so as to be displayed. In this case, the image picture Id1 is displayed from the edge part while being rotated in conjunction with the operation.

(2) In Case where Second Operation Dial is Rotationally Operated

Figure 54:
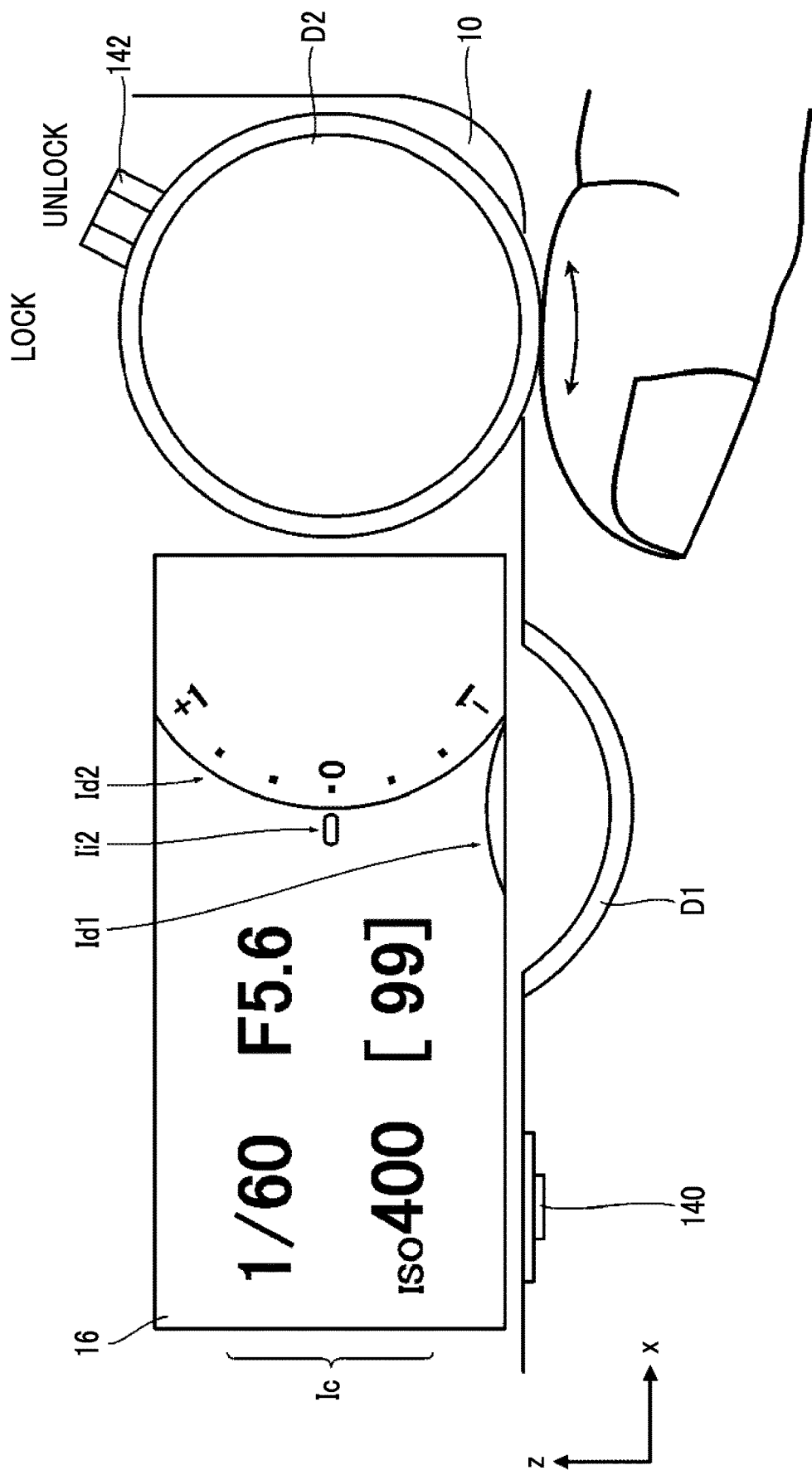
FIG. 54 is a plan view illustrating an example of display on the sub-display in a case where the second operation dial is unlocked and is operated.

FIG. 54 is a plan view illustrating an example of display on the sub-display in a case where the second operation dial is unlocked and is operated.

In a case where the unlocked second operation dial D2 is rotationally operated, the image picture Id2 of the second operation dial D2 is advanced from the edge part to the display region of the sub-display 16 so as to be displayed. In this case, the image picture Id2 is displayed from the edge part while being rotated in conjunction with the operation.

As mentioned above, according to the digital camera of the present embodiment, only in a case where locking is canceled, an image picture of an operation dial is displayed on the sub-display 16. Consequently, an image picture of an operation dial can be displayed on the sub-display 16 only in a necessary case, and thus it is possible to effectively use the display region of the sub-display 16.

Modification Example

In the above-described embodiment, there is a configuration in which, in a case where an operation dial is unlocked, a part of an image picture of the unlocked operation dial is displayed from the edge part of the sub-display, but a reduced image of the operation dial may be displayed.

Seventh Embodiment

A digital camera of the present embodiment additionally comprises a contact detection unit which detects contact with each operation dial with respect to the digital camera of the sixth embodiment. Display on the display unit is controlled according to a detection result in the contact detection unit. Here, a description will be made of only a configuration related to contact detection and a configuration related to display on the display unit.

[Configuration]

Figure 55:
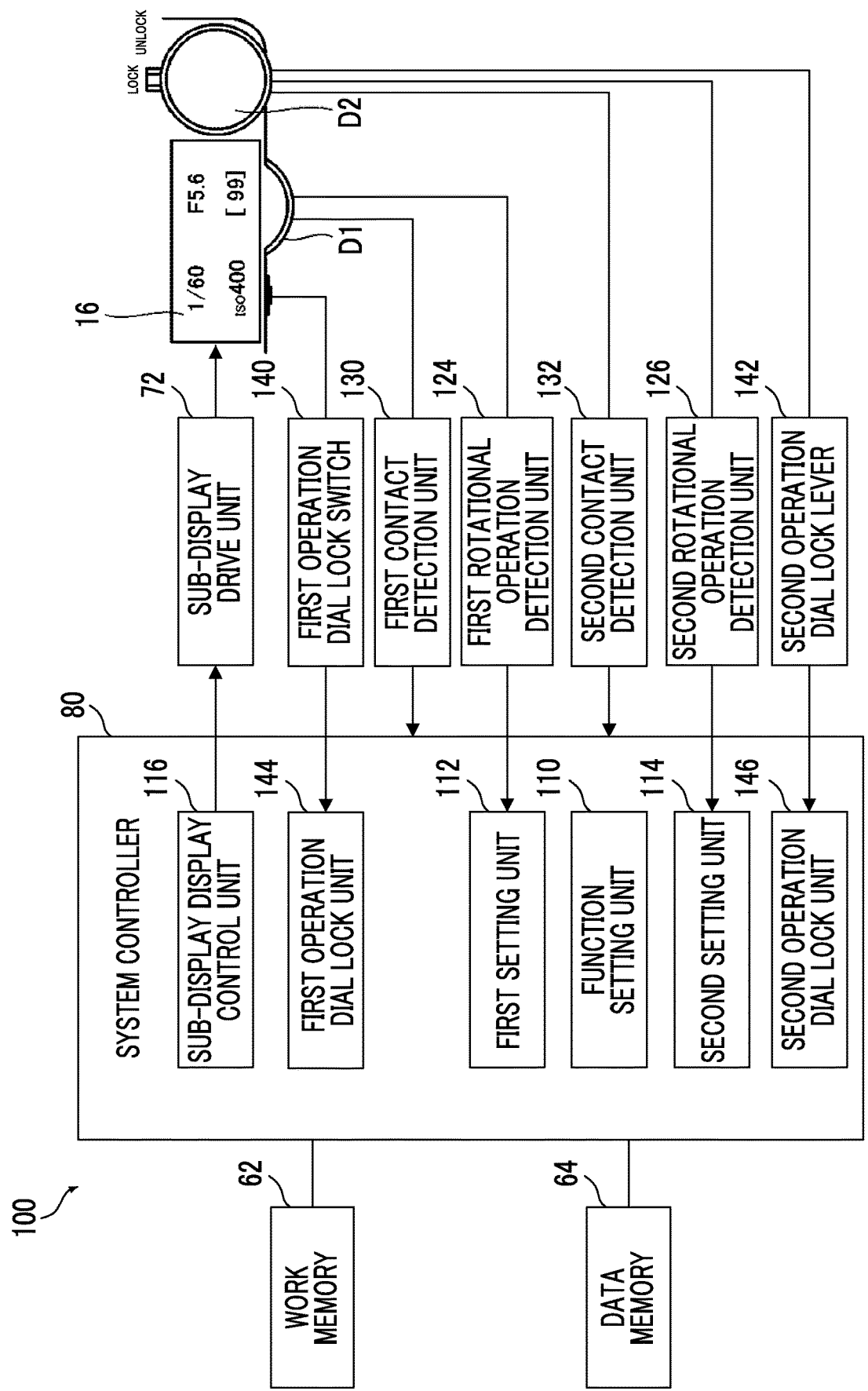
FIG. 55 is a block diagram of a control system related to display on the sub-display.

FIG. 55 is a block diagram of a control system related to display on the sub-display.

The digital camera of the present embodiment additionally comprises a first contact detection unit 130 which detects contact with the first operation dial D1 and a second contact detection unit 132 which detects contact with the second operation dial D2.

Configurations of the first contact detection unit 130 and the second contact detection unit 132 are the same as those of the first contact detection unit 130 and the second contact detection unit 132 provided in the digital camera of the fourth embodiment. Both of the first contact detection unit 130 and the second contact detection unit 132 are configured with touch sensors, and, in a case where contact is detected, information indicating the contact is output to the system controller 80.

The sub-display display control unit 116 controls display on the sub-display 16 on the basis of a lock state of the first operation dial D1, a lock state of the second operation dial D2, and contact detection results from the first contact detection unit 130 and the second contact detection unit 132.

[Display on Sub-Display]

In the digital camera of the present embodiment, in a case where an operation dial is unlocked, a part of an image picture of the operation dial is displayed from the edge part of the sub-display 16. In a case where contact with an operation dial is detected, an image picture of the operation dial with which the contact is detected appears in the display region from the edge part. In a case where the operation dial with which the contact is detected is rotationally operated, the image picture is rotated in conjunction with the rotation.

<<During Locking>>

In a case where both of the first operation dial D1 and the second operation dial D2 are locked, image pictures of the operation dials are not displayed on the sub-display 16 (refer to FIG. 51). In other words, in this case, only the set contents Ic of the camera are displayed on the sub-display 16.

In a case where an operation dial is locked, even if the operation dial is rotationally operated, the operation is invalid, and a set value is not changed. In this case, a predetermined error message may be displayed on the sub-display 16.

<<In Case of Unlocking>>

In a case where the first operation dial D1 and the second operation dial D2 are unlocked, a part of the image picture Id1 of the first operation dial D1 and a part of the image picture Id2 of the second operation dial D2 are displayed from the edge part of the sub-display 16 (refer to FIG. 52).

In a case where only the first operation dial D1 is unlocked, only the image picture Id1 of the first operation dial D1 is displayed from the edge part of the sub-display 16. Similarly, in a case where only the second operation dial D2 is unlocked, only the image picture Id2 of the second operation dial D2 is displayed from the edge part of the sub-display 16.

<<During Contact>>

(1) In Case of Contact with Unlocked First Operation Dial

In a case where the finger comes into contact with the unlocked first operation dial D1, the image picture Id1 of the first operation dial D1 is advanced from the edge part to the display region so as to be displayed (refer to FIG. 53).

(2) In Case of Contact with Unlocked Second Operation Dial

In a case where the finger comes into contact with the unlocked second operation dial D2, the image picture Id2 of the second operation dial D2 is advanced from the edge part to the display region so as to be displayed (refer to FIG. 54).

<<During Operation>>

(1) In Case where First Operation Dial is Rotationally Operated

In a case where the unlocked first operation dial D1 is rotationally operated, the image picture Id1 of the first operation dial D1 is rotated in conjunction with the operation.

(2) In Case where Second Operation Dial is Rotationally Operated

In a case where the unlocked second operation dial D2 is rotationally operated, the image picture Id2 of the second operation dial D2 is rotated in conjunction with the operation.

As mentioned above, in the digital camera of the present embodiment, in a case where an operation dial is unlocked, a part of an image picture of the operation dial is displayed from the edge part of the sub-display 16. In a case where the finger comes into contact with an unlocked operation dial, an image picture thereof is advanced from the edge part to the display region so as to be displayed. Consequently, an image picture of an operation dial can be displayed on the sub-display 16 only in a necessary case, and thus it is possible to effectively use the display region of the sub-display 16.

Modification Example

Modification Example (1)

In the above-described embodiment, in a case where the first operation dial D1 and the second operation dial D2 are unlocked, a part of the image picture Id1 of the first operation dial D1 and a part of the image picture Id2 of the second operation dial D2 are displayed from the edge part of the sub-display 16, but only the set contents Ic of the camera may be displayed on the sub-display 16.

In this case, in a case where contact with an operation dial is detected, a part of an image picture of the operation dial with which the contact is detected is displayed from the edge part of the sub-display 16. Alternatively, the image picture of the operation dial with which the contact is detected is directly displayed on the sub-display 16. In a case where a part of the image picture is displayed from the edge part, setting information may be displayed in a dial plate portion in the same manner as in the fifth embodiment.

Modification Example (2)

In the above-described embodiment, there is a configuration in which, in a case where an operation dial is unlocked, a part of an image picture of the unlocked operation dial is displayed from the edge part of the sub-display, but a reduced image of the operation dial may be displayed on the sub-display.

Other Embodiments

Other Embodiments of Display Unit

In the above-described embodiment, the sub-display configuring the display unit is configured with a reflective LCD, but a display configuring the display unit is not limited thereto. For example, the display may be configured with, for example, a self-light emitting display such as an electronic paper, a memory liquid crystal display, or an organic electroluminescent (EL) display.

The electronic paper is a thin display which has a thickness in the same level as paper, and visibility, and in which a display content is rewritten. The memory liquid crystal display is a liquid crystal display having a function in which a content displayed on a screen can be maintained even if a power supply is turned off. Both of the displays can ensure a favorable visibility even in an environment in which surroundings are bright. Display on a display unit can be recognized even in a case where a power supply of a camera is turned off.

In a case where the sub-display is configured with an LCD, the sub-display is configured with a reflective LCD, and thus a favorable visibility can be ensured even in a bright environment. In a case where a display is configured with a reflective LCD, an illumination lamp is preferably provided.

Other Examples of Means for Locking Operation Dial

In the above-described embodiment, there is a configuration in which an operation dial is electronically locked, but the operation dial may be mechanically locked.

In a case where an operation dial is electronically locked, a method of giving an instruction for locking or unlocking is not limited to the methods of the above-described embodiment. For example, in a case of an operation dial on which a pushing operation is possible, locking and unlocking instructions may be given through a pushing operation.

Other Examples of Means for Detecting Contact

In the above-described embodiment, a touch sensor is used as means for detecting contact with an operation dial, but means for detecting contact with an operation dial is not limited thereto. For example, there may be a configuration in which an optical sensor detects that the finger comes close to an operation dial by a predetermined distance such that contact of the finger with the operation dial is indirectly detected.

Other Embodiments of Camera

A case where the present invention is applied to a digital camera has been described by way of example in the above-described embodiment, but the application of the present invention is not limited thereto. The present invention can be applied to a camera using a silver halide film likewise. The present invention may also be applied to an electronic device in which a rotary operation dial is built.

A case where the present invention is applied to a lens-interchangeable camera has been described by way of example in the above-described embodiment, but the present invention may also be applied to a camera, which is integrated with a lens, likewise.

A case where the present invention is applied to a non-reflex camera has been described by way of example in the above-described embodiment, but the present invention may also be applied to a reflex camera likewise.

EXPLANATION OF REFERENCES

1: digital camera
2: lens
2a: lens drive unit
10: camera body
12: lens mount
14: main display
16: sub-display
18: electronic view finder
20: hot shoe
22: grip
24: thumb rest
30: shutter button
31: power supply lever
32: mode dial
33: confirmation button
34: reproduction button
35: erase button
36: AF lock button
37: AE lock button
38: menu/OK button
39: selector button
40: display/back button
50: image sensor
52: image sensor drive unit
54: shutter
56: shutter drive unit
58: analog signal processing section
60: image data input unit
62: work memory
64: data memory
66: digital signal processing section
68: recording control unit
70: main display drive unit
72: sub-display drive unit
74: operation unit
78: memory card
80: system controller
100: control system related to display on sub-display
110: function setting unit
112: first setting unit
114: second setting unit
116: sub-display display control unit
124: first rotational operation detection unit
126: second rotational operation detection unit
D1: first operation dial
D2: second operation dial
D3: third operation dial
Ic: set contents of digital camera
Ic1: shutter speed information
Ic2: F number information
Ic3: sensitivity information
Ic4: information regarding number of images which can be captured
Id: image picture of operation dial
Id1: image picture of the first operation dial
Id1a: image picture of first operation dial
Id1b: image picture of first operation dial
Id2: image picture of second operation dial
Id3: image picture of third operation dial
Ii: image picture of indicator
Ii1: image picture of indicator
Ii2: image picture of indicator
Ii3: image picture of indicator
L: optical axis
ax1: rotation axis of first operation dial
ax2: rotation axis of second operation dial
1b: counterclockwise rotation direction of first operation dial
1f: clockwise rotation direction of first operation dial 2b: counterclockwise rotation direction of second operation dial
2f: clockwise rotation direction of second operation dial
S10 to S24: procedures of display process on sub-display

The invention claimed is:

1. A camera comprising:
a display;
an operation dial that is disposed around the display;
another operation dial; and
a system controller that controls display on the display,
wherein, in a case where the operation dial and the another operation dial are operated, the system controller displays the set content of the camera and an image picture of the operated operation dial on the display, and
wherein the system controller displays image pictures of the operation dials to overlap each other on the display,
wherein, in case in which the operation dial is operated last, the system controller displays preferentially an image picture of the operation dial than an image picture of the another operation dial, and
wherein, in case in which the another operation dial is operated last, the system controller displays preferentially the image picture of the another operation dial than the image picture of the operation dial.

2. The camera according to claim 1,
wherein, in a case where the operation dial is operated, the system controller rotates an image picture of the operation dial in conjunction with the operation on the operation dial.

3. The camera according to claim 2,
wherein the system controller locks the operation dial, and
wherein, in a case where the operation dial is unlocked, the system controller displays a reduced image of the operation dial on the display.

4. The camera according to claim 3,
wherein the system controller locks the operation dial, and
wherein, in a case where the operation dial is unlocked, the system controller displays a part of an image picture of the operation dial from the edge part of the display.

5. The camera according to claim 2,
wherein the system controller locks the operation dial, and
wherein, in a case where the operation dial is unlocked, the system controller displays a part of an image picture of the operation dial from the edge part of the display.

6. The camera according to claim 2,
wherein the operation dial which is disposed such that a part of an outer circumference of the operation dial is exposed from an outer surface of a camera body.

7. The camera according to claim 2,
wherein the operation dial which is disposed such that a part of an outer circumference of the operation dial is exposed from an outer surface of a camera body, and
wherein, in a case where an image picture of the operation dial is displayed on the display, the system controller displays an image having a circular arc outer shape of a part of the operation dial.

8. The camera according to claim 1,
wherein, in a case where the operation dial is not operated, the system controller displays a reduced image of the operation dial on the display along with the set content of the camera, and
wherein, in a case where an operation dial is operated, the system controller enlarges a reduced image of the operated operation dial, so as to display an image picture of the operated operation dial on the display.

9. The camera according to claim 8,
wherein the system controller locks the operation dial, and
wherein, in a case where the operation dial is unlocked, the system controller displays a reduced image of the operation dial on the display.

10. The camera according to claim 8,
wherein the operation dial which is disposed such that a part of an outer circumference of the operation dial is exposed from an outer surface of a camera body, and
wherein, in a case where an image picture of the operation dial is displayed on the display, the system controller displays an image having a circular arc outer shape of a part of the operation dial.

11. The camera according to claim 1,
wherein the system controller locks the operation dial, and
wherein, in a case where the operation dial is unlocked, the system controller displays a reduced image of the operation dial on the display.

12. The camera according to claim 1,
wherein, in a case where the operation dial is not operated, the system controller displays a part of the image picture of each operation dial from an edge part of the display along with the set content of the camera, and
wherein, in a case where an operation dial is operated, the system controller advances and displays an image picture of the operated operation dial on the display from the edge part.

13. The camera according to claim 1,
wherein the system controller locks the operation dial, and
wherein, in a case where the operation dial is unlocked, the system controller displays a part of an image picture of the operation dial from the edge part of the display.

14. The camera according to claim 1,
wherein, in a case where the operation dial is operated within a predetermined time, the system controller displays image pictures of the operation dial on the display.

15. The camera according to claim 1,
wherein, in a case where the operation dial is not operated, the system controller displays a set content of the camera on the display.

16. The camera according to claim 1,
wherein the system controller instructs image pictures of both of the operation dials to be displayed, and
wherein the system controller displays the image pictures of both of the operation dials on the display in response to an instruction from the system controller.

17. The camera according to claim 1,
wherein the system controller is configured with a microcomputer.

18. The camera according to claim 1,
wherein the operation dial which is disposed such that a part of an outer circumference of the operation dial is exposed from an outer surface of a camera body.

19. The camera according to claim 1,
wherein the operation dial which is disposed such that a part of an outer circumference of the operation dial is exposed from an outer surface of a camera body, and
wherein, in a case where an image picture of the operation dial is displayed on the display, the system controller displays an image having a circular arc outer shape of a part of the operation dial.

20. The camera according to claim 1,
wherein in a view from a side viewing the display, the operation dial is disposed at a first side respect to the display, and
wherein the image picture of the operation dial is displayed at the first side than the image picture of the another operation dial on the display.

* * * * *